US012802399B2

(12) United States Patent
Noda

(10) Patent No.: US 12,802,399 B2
(45) Date of Patent: Nov. 17, 2026

(54) INFORMATION PROCESSING APPARATUS, INFORMATION PROCESSING METHOD, AND PROGRAM

(71) Applicant: FUJIFILM Corporation, Tokyo (JP)

(72) Inventor: Shimpei Noda, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 454 days.

(21) Appl. No.: 17/933,666

(22) Filed: Sep. 20, 2022

(65) Prior Publication Data

US 2023/0019620 A1 Jan. 19, 2023

Related U.S. Application Data

(63) Continuation of application No. PCT/JP2020/040103, filed on Oct. 26, 2020.

(30) Foreign Application Priority Data

Mar. 30, 2020 (JP) ................................ 2020-061596

(51) Int. Cl.
*G06V 10/764* (2022.01)
*G06V 10/62* (2022.01)
(Continued)

(52) U.S. Cl.
CPC ............ *G06V 10/764* (2022.01); *G06V 10/62* (2022.01); *G06V 10/761* (2022.01); *G06V 20/30* (2022.01)

(58) Field of Classification Search
CPC ...... G06V 10/70; G06V 10/764; G06V 10/62; G06V 20/30; G06V 10/761; G06V 20/35;
(Continued)

(56) References Cited

U.S. PATENT DOCUMENTS 8,495,016 B2 * 7/2013 Shimada .............. H04N 1/2166 707/626
8,861,804 B1 * 10/2014 Johnson ................ G06F 16/587 382/218

(Continued)

FOREIGN PATENT DOCUMENTS

CN 104519218 A 4/2015
CN 110838102 A * 2/2020 ........... G06T 7/0004

(Continued)

OTHER PUBLICATIONS

ESpacenet English Translation of JP-4650034-B2 Description (Year: 2020).*

(Continued)

*Primary Examiner* — Sumati Lefkowitz
*Assistant Examiner* — Anthony J Rodriguez
(74) *Attorney, Agent, or Firm* — Studebaker Brackett PLLC

(57) ABSTRACT

An information processing apparatus creates a dated image data list by classifying a plurality of dated image data, associates the dated image data list with a specific user, acquires the dated image data for a subject, which is similar to a subject of dateless image data, from the dated image data list, and derives a date to be added to the dateless image data, based on the date added to the acquired dated image data. The plurality of dated image data are image data of a plurality of users including the specific user. The dated image data list is created by classifying the plurality of dated image data for each subject. The dated image data list for a subject, which is similar to a subject of the dated image data, is associated with the specific user.

19 Claims, 61 Drawing Sheets

(51) Int. Cl.
*G06V 10/74* (2022.01)
*G06V 20/30* (2022.01)

(58) Field of Classification Search
CPC ........ G06V 20/36; G06V 20/38; G06V 20/39; G06V 40/16; G06V 40/172; G06V 40/173; G06V 40/178
See application file for complete search history.

(56) References Cited

U.S. PATENT DOCUMENTS

| | | | | |
|---|---|---|---|---|
| 9,241,018 | B2 * | 1/2016 | Johnson | G06V 20/30 |
| 2004/0183918 | A1 | 9/2004 | Squilla et al. | |
| 2005/0036692 | A1 * | 2/2005 | Iida | G06F 16/583 707/E17.02 |
| 2009/0310863 | A1 * | 12/2009 | Gallagher | G06V 40/16 382/182 |
| 2011/0255132 | A1 * | 10/2011 | Shimada | H04N 1/00877 358/1.15 |
| 2015/0100577 | A1 | 4/2015 | Hagiwara et al. | |
| 2016/0086022 | A1 * | 3/2016 | Johnson | G06F 16/50 382/118 |
| 2016/0371536 | A1 * | 12/2016 | Yamaji | G06F 16/583 |
| 2017/0083545 | A1 | 3/2017 | Tsutaoka | |
| 2019/0197348 | A1 | 6/2019 | Kodera | |
| 2019/0347521 | A1 | 11/2019 | Asano | |
| 2019/0379795 | A1 * | 12/2019 | Yamaji | H04N 1/00143 |
| 2019/0391975 | A1 * | 12/2019 | Jiang | G06F 16/2462 |

FOREIGN PATENT DOCUMENTS

| | | | |
|---|---|---|---|
| JP | 2001-238177 | A | 8/2001 |
| JP | 2004-348620 | A | 12/2004 |
| JP | 2006-252025 | A | 9/2006 |
| JP | 4650034 | B2 * | 3/2011 |
| JP | 2011-525017 | A | 9/2011 |
| JP | 2012-027868 | A | 2/2012 |
| JP | 2013-020551 | A | 1/2013 |
| JP | 2017-059124 | A | 3/2017 |
| JP | 2017-091260 | A | 5/2017 |
| JP | 2019-117553 | A | 7/2019 |
| JP | 2019-197452 | A | 11/2019 |

OTHER PUBLICATIONS

Espacenet English Translation of CN-110838102-A Description (Year: 2020).*

Espacenet English Translation of JP-4650034-B2 Description (Year: 2011).*

International Search Report issued in PCT/JP2020/040103; mailed Dec. 28, 2020.

International Preliminary Report on Patentability (Chapter I) and Written Opinion of the International Searching Authority issued in PCT/JP2020/040103; issued Sep. 29, 2022.

An Office Action; "Notice of Reasons for Refusal," mailed by the Japanese Patent Office on Nov. 28, 2023, which corresponds to Japanese Patent Application No. 2022-511506 and is related to U.S. Appl. No. 17/933,666; with English language translation.

An Office Action mailed by China National Intellectual Property Administration on Jul. 21, 2025, which corresponds to Chinese Patent Application No. 202080098979.4 and is related to U.S. Appl. No. 17/933,666; with English language translation.

"Notice of Reasons for Refusal" Office Action issued in JP 2025-064566; mailed by the Japanese Patent Office on Mar. 10, 2026.

"Decision of Refusal" Office Action issued in JP 2025-064566; mailed by the Japanese Patent Office on Jul. 14, 2026.

* cited by examiner

INFORMATION PROCESSING APPARATUS, INFORMATION PROCESSING METHOD, AND PROGRAM

CROSS-REFERENCE TO RELATED APPLICATIONS

This application is a continuation application of International Application No. PCT/JP2020/040103, filed Oct. 26, 2020, the disclosure of which is incorporated herein by reference in its entirety. Further, this application claims priority under 35 USC 119 from Japanese Patent Application No. 2020-061596 filed Mar. 30, 2020, the disclosure of which is incorporated by reference herein.

BACKGROUND

1. Technical Field

The technology of the present disclosure relates to an information processing apparatus, an information processing method, and a program.

2. Related Art

JP2006-252025A discloses an image management device comprising an extraction unit and an estimation unit. The extraction unit extracts a feature amount of an image from the image data of which the imaging date and time is unknown. The estimation unit estimates the imaging date and time of the image data of which the imaging date and time is unknown by comparing the extracted feature amount with a time dictionary in which objects for specifying the date and time are collected.

In addition, the time dictionary records a relationship between the date and the object that expresses a part of a subject, such as a face, hair, a body shape, and clothes. The object is at least one of text data, image data, or video image data describing the feature amount, or at least one of text data, image data, or video image data describing the feature amount representing a specific age or a specific season. Further, the image management device disclosed in JP2006-252025A further comprises an updating unit that updates the time dictionary based on an estimation result of the estimation unit.

SUMMARY

However, in a case in which the types of objects included in the time dictionary are insufficient, it is difficult to accurately estimate the imaging date and time of the image data of which the imaging date and time is unknown.

One embodiment according to the technology of the present disclosure is to provide an information processing apparatus, an information processing method, and a program capable of adding an appropriate date to dateless image data as compared with a case in which the date to be added to the dateless image data is derived based only on dated image data owned by a specific user.

A first aspect of the technology of the present disclosure relates to an information processing apparatus comprising a processor, and a memory built in or connected to the processor, in which the processor creates a dated image data list by classifying a plurality of dated image data to which dates are added, associates the dated image data list with a specific user, acquires the dated image data for a subject, which is similar to a subject indicated by dateless image data of the specific user, from the dated image data list associated with the specific user, and derives a date to be added to the dateless image data, based on the date added to the acquired dated image data, the plurality of dated image data are image data of a plurality of users including the specific user, the dated image data list is created for each subject by classifying the plurality of dated image data for each subject indicated by each of the plurality of dated image data, and the dated image data list for a subject, which is similar to a subject indicated by the dated image data of the specific user, is associated with the specific user.

BRIEF DESCRIPTION OF THE DRAWINGS

Exemplary embodiments of the technology of the disclosure will be described in detail based on the following figures, wherein.

DETAILED DESCRIPTION

An example of an embodiment of an information processing apparatus, an information processing method, and a program according to the technology of the present disclosure will be described with reference to the accompanying drawings.

First, the terms used in the following description will be described.

CPU refers to an abbreviation of "central processing unit". RAM refers to an abbreviation of "random access memory". SSD refers to an abbreviation of "solid state drive". HDD refers to an abbreviation of "hard disk drive". EEPROM refers to an abbreviation of "electrically erasable and programmable read only memory". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". CMOS refers to an abbreviation of "complementary metal oxide semiconductor". CCD refers to an abbreviation of "charge coupled device". EL refers to an abbreviation of "electro-luminescence". UI refers to an abbreviation of "user interface". USB refers to an abbreviation of "universal serial bus". GPU refers to an abbreviation of "graphics processing unit". GPS refers to an abbreviation of "global positioning system". RTC refers to an abbreviation of "real time clock". ID refers to an abbreviation of "identification". Exif refers to an abbreviation of "exchangeable image file format". WAN refers to an abbreviation of "wide area network". LAN refers to an abbreviation of "local area network".

In addition, in the description of the present specification, "match" refers to the match in the sense of including an error generally allowed in the technical field to which the technology of the present disclosure belongs (sense of including an error to the extent that it does not contradict the purpose of the technology of the present disclosure), in addition to the exact match. In addition, in the description of the present specification, "the same" of "the same date" refers to the same in the sense of including an error generally allowed in the technical field to which the technology of the present disclosure belongs (sense of including an error to the extent that it does not contradict the purpose of the technology of the present disclosure), in addition to the exact same.

First Embodiment

Figure 1:
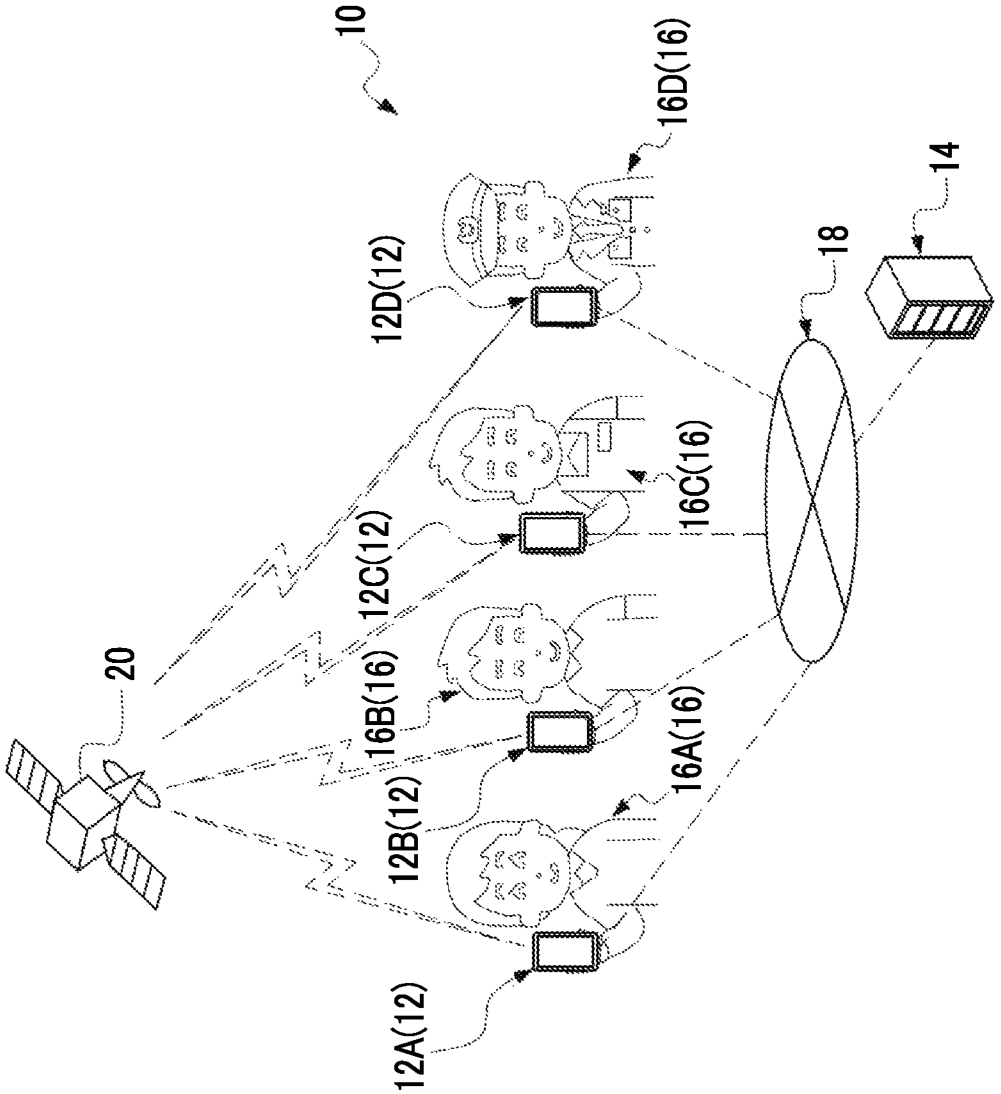
FIG. 1 is a conceptual diagram showing a schematic configuration of an information processing system according to first and second embodiments.

As an example, as shown in FIG. 1, an information processing system 10 comprises a plurality of user devices 12 and a server 14. The user device 12 is a terminal device that transmits and receives input information and/or image information by a user 16 to and from the server 14, and is, for example, a smartphone. In the example shown in FIG. 1, user devices 12A, 12B, 12C, and 12D are shown as the plurality of user devices 12. In the following, for convenience of description, the user devices 12A, 12B, 12C, and 12D are simply referred to as "user device 12" in a case in which the distinction is not necessary. It should be noted that, here, although four user devices 12 are described as an example for convenience of description, the technology of the present disclosure is not limited to this, and the number of user devices 12 need only be plural. In addition, although the smartphone is described as an example of the user device 12, the technology of the present disclosure is not limited to this, and an imaging terminal, such as a tablet terminal, a personal computer, a wearable terminal, and/or a digital camera, may be used.

The information processing system 10 is used by a plurality of users 16. In the example shown in FIG. 1, users 16A, 16B, 16C, and 16D are shown as the plurality of users 16. In the following, for convenience of description, the users 16A, 16B, 16C, and 16D are simply referred to as "user 16" in a case in which the distinction is not necessary.

One user device 12 is allocated to each of the plurality of users 16. The user device 12A is allocated to the user 16A. The user device 12B is allocated to the user 16B. The user device 12C is allocated to the user 16C. The user device 12D is allocated to the user 16D. For example, the user 16A is the owner of the user device 12A, the user 16B is the owner of the user device 12B, the user 16C is the owner of the user device 12C, and the user 16D is the owner of the user device 12D. It should be noted that, although a case in which each user 16 using the user device 12 is one person is described as an example, two or more users 16 may use one user device 12, and one user 16 may use two or more user devices 12.

The plurality of user devices 12 are connected to the server 14 via a network 18. The plurality of user devices 12 and the server 14 are communicably connected to the network 18, for example. In addition, the network 18 is composed of, for example, at least one of a WAN or a LAN. Further, the plurality of user devices 12 and the network 18, and the server 14 and the network 18 may be connected by a wireless communication method or may be connected by a wired communication method, respectively. In addition, in the example shown in FIG. 1, although not shown, the network 18 includes, for example, a base station. The network 18 establishes communication between the plurality of user devices 12 and the server 14, and transmits and receives various pieces of information to and from the plurality of user devices 12 and the server 14. The server 14 receives a request from the user device 12 via the network 18, and provides a service in response to the request to the user device 12 of a request source via the network 18. It should be noted that the server 14 is an example of an "information processing apparatus" according to the technology of the present disclosure.

The user device 12 uses radio waves transmitted from a GPS satellite 20 to calculate GPS information as position specification information for specifying the current position of the user device 12. The GPS information is, for example, the latitude and the longitude. In the first embodiment, the latitude and the longitude are described as an example of the GPS information for convenience of description, but the technology of the present disclosure is not limited to this, and the GPS information may be the latitude, the longitude, and the altitude. It should be noted that the GPS information is an example of "position specification information" according to the technology of the present disclosure.

Figure 2:
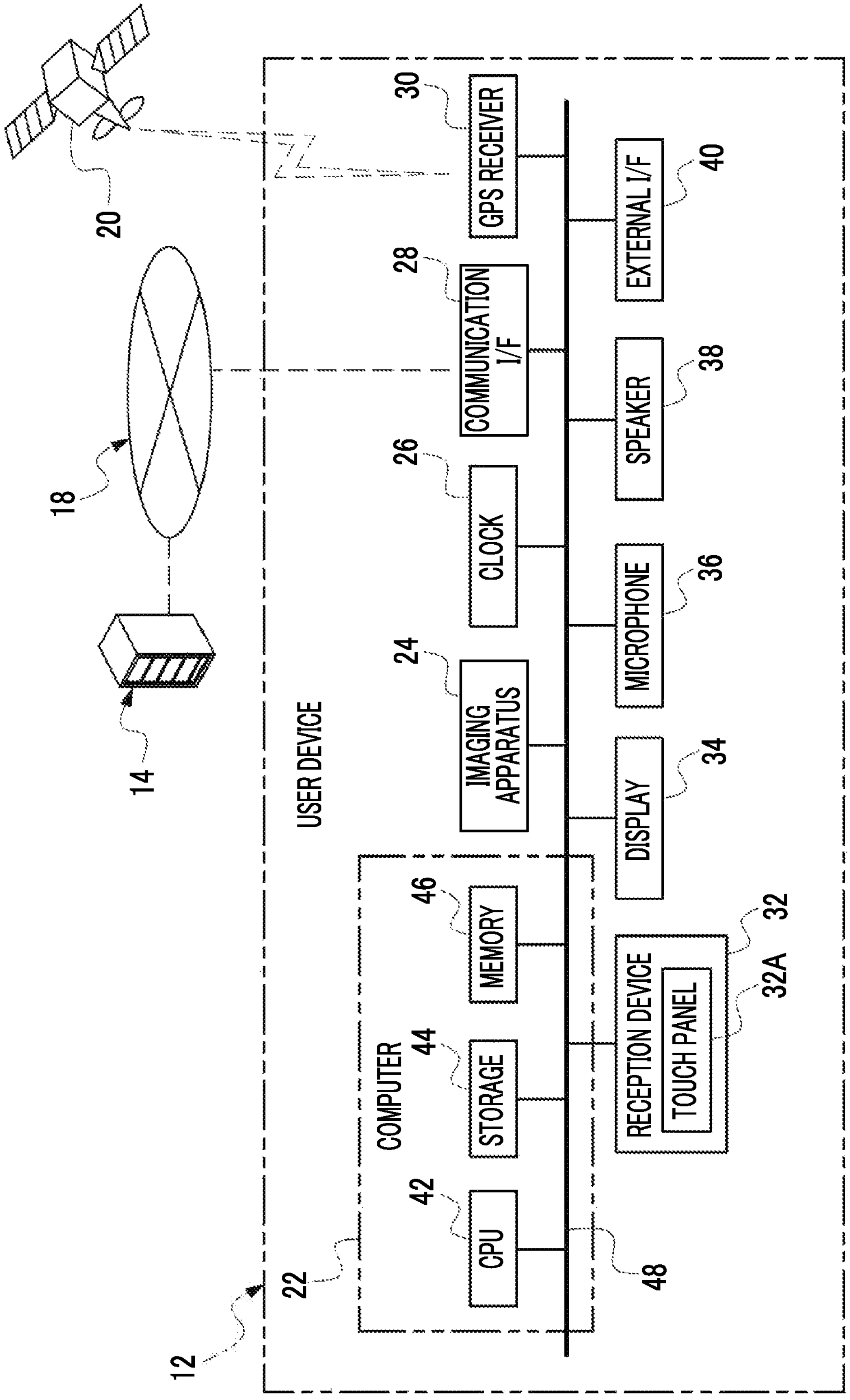
FIG. 2 is a block diagram showing an example of a hardware configuration of an electric system of a user device provided in the information processing system according to the first and second embodiments.

As an example, as shown in FIG. 2, the user device 12 comprises a computer 22, an imaging apparatus 24, a clock 26, a communication I/F 28, a GPS receiver 30, a reception device 32, a display 34, a microphone 36, a speaker 38, and an external I/F 40. The computer 22 comprises a CPU 42, a storage 44, and a memory 46. The CPU 42, the storage 44, and the memory 46 are connected to a bus 48. In addition, the imaging apparatus 24, the clock 26, the communication I/F 28, the GPS receiver 30, the reception device 32, the display 34, the microphone 36, the speaker 38, and the external I/F 40 are also connected to the bus 48. It should be noted that, in the example shown in FIG. 2, for convenience of illustration, one bus is shown as the bus 48, but a data bus, an address bus, a control bus, and the like are included in the bus 48.

The CPU 42 controls the entire user device 12. Various parameters and various programs are stored in the storage 44. The storage 44 is a non-volatile storage device. Here, an EEPROM is adopted as an example of the storage 44, but the technology of the present disclosure is not limited to this, and an SSD and/or an HDD may be used. The memory 46 is a volatile storage device. The memory 46 is used as a work memory by the CPU 42, and temporarily stores various pieces of information. Here, a DRAM is adopted as an example of the memory 46, but the technology of the present disclosure is not limited to this, and another type of volatile storage device, such as an SRAM, may be used.

The imaging apparatus 24 is a device that generates the image data. The imaging apparatus 24 includes, for example, a CMOS image sensor, and comprises a zoom mechanism, and a focus adjustment mechanism. It should be noted that, here, the CMOS image sensor is described as an example of the image sensor of the imaging apparatus 24, but the technology of the present disclosure is not limited to this, and another type of the image sensor, such as a CCD image sensor, may be used. The imaging apparatus 24 images a subject in accordance with an instruction from the CPU 42. Moreover, the imaging apparatus 24 generates the image data indicating the subject by imaging the subject. The CPU 42 acquires the image data generated by the imaging apparatus 24, to store the acquired image data in the storage 44.

The clock 26 acquires a current time point. The clock 26 is, for example, an RTC, and receives driving power from a power supply system that is disconnected from a power supply system for the computer 22 and continues to mark the current time point (year, month, day, hour, minute, and second) even in a case in which the computer 22 is shut down. The clock 26 outputs the current time point to the CPU 42 each time the current time point is updated.

The communication I/F 28 is connected to the network 18 by a wireless communication method, and controls the exchange of various pieces of information between the CPU 42 and the server 14 via the network 18.

The GPS receiver 30 receives radio waves from a plurality of GPS satellites (not shown) including the GPS satellite 20 in accordance with the instruction from the CPU 42, and outputs reception result information indicating a reception result to the CPU 42. The CPU 42 calculates the GPS information described above based on the reception result information input from the GPS receiver 30.

The reception device 32 receives an instruction from the user 16 or the like. Examples of the reception device 32 include a touch panel 32A, and a hard key. The instruction received by the reception device 32 is acquired by the CPU 42. The reception device 32 may receive the instruction from the user 16 or the like by voice input via the microphone 36.

The display 34 displays various pieces of information under the control of the CPU 42. Examples of the display 34 include a liquid crystal display. It should be noted that another type of display, such as an organic EL display, may be adopted as the display 34 without being limited to the liquid crystal display.

It should be noted that, in the first embodiment, an out-cell type touch panel display in which the touch panel 32A is superimposed on a surface of a display region of the display 34 is adopted. It should be noted that the out-cell type touch panel display is merely an example, and for example, an on-cell type or an in-cell type touch panel display can be applied.

The microphone 36 converts the collected sound into an electric signal to output the electric signal obtained by converting the sound to the CPU 42.

The speaker 38 converts the electric signal input from a specific device (for example, CPU 42) into the sound, and outputs the sound obtained by converting the electric signal to the outside of the user device 12.

The external I/F 40 controls the exchange of various pieces of information with the device present outside the user device 12. Examples of the external I/F 40 include a USB interface. A user device, a personal computer, a server, a USB memory, a memory card, and/or a printer are connected to the USB interface.

Figure 3:
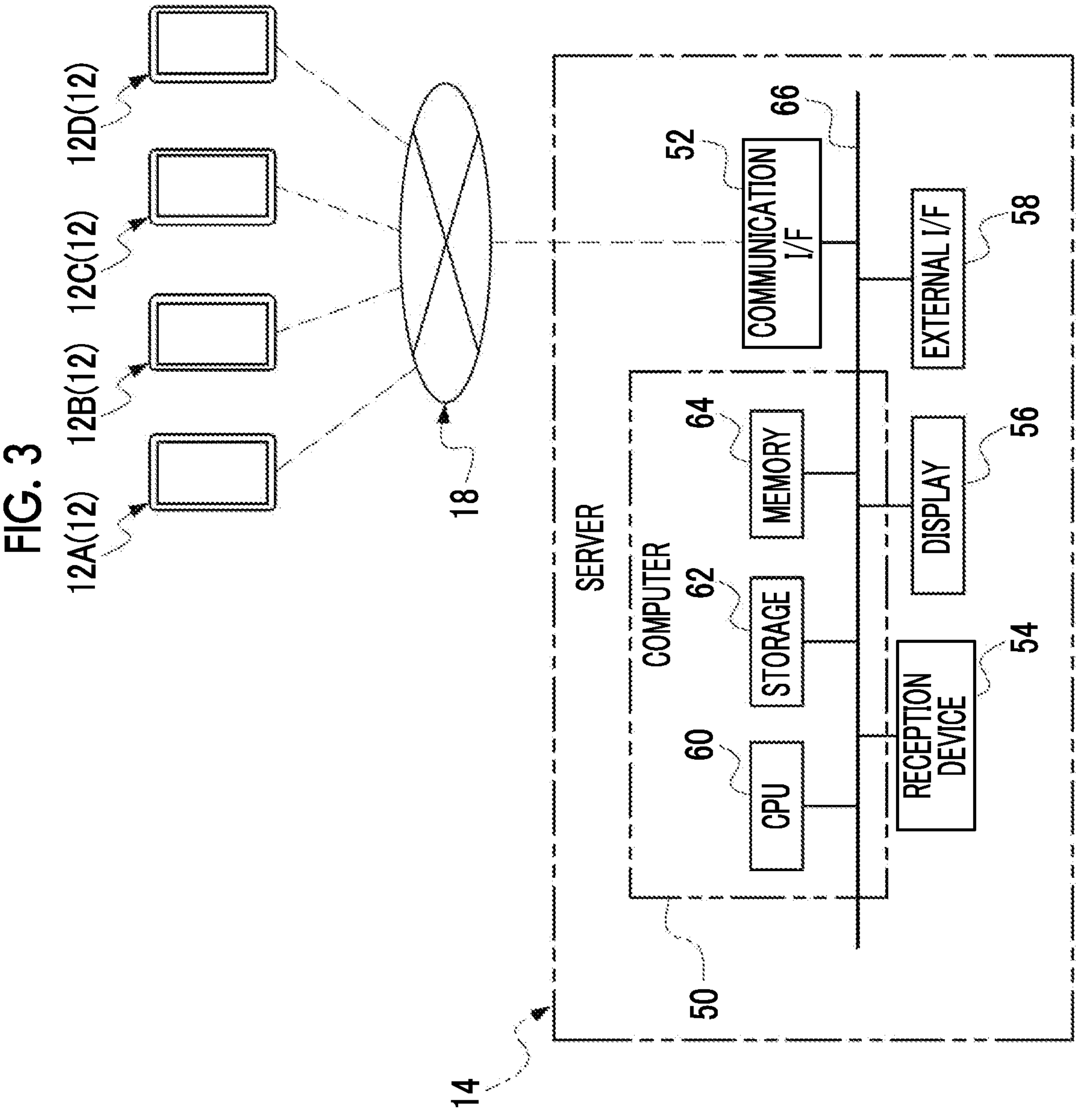
FIG. 3 is a block diagram showing an example of a hardware configuration of an electric system of a server provided in the information processing system according to the first and second embodiments.

As an example, as shown in FIG. 3, the server 14 comprises a computer 50, a communication I/F 52, a reception device 54, a display 56, and an external I/F 58. The computer 50 comprises a CPU 60, a storage 62, and a memory 64. The CPU 60, the storage 62, and the memory 64 are connected to a bus 66. In addition, the communication I/F 52, the reception device 54, the display 56, and the external I/F 58 are also connected to the bus 66. It should be noted that, in the example shown in FIG. 3, for convenience of illustration, one bus is shown as the bus 66, but a data bus, an address bus, a control bus, and the like are included in the bus 66.

The CPU 60 controls the entire server 14. Various parameters and various programs are stored in the storage 62. The storage 62 is a non-volatile storage device. Here, an SSD is adopted as an example of the storage 62, but the technology of the present disclosure is not limited to this, and an EEPROM and/or an HDD may be used. The memory 64 is a volatile storage device. The memory 64 is used as a work memory by the CPU 60, and temporarily stores various pieces of information. Here, a DRAM is adopted as an example of the memory 64, but the technology of the present disclosure is not limited to this, and another type of volatile storage device, such as an SRAM, may be used. It should be noted that the CPU 60 is an example of a "processor" according to the technology of the present disclosure, and the storage 62 and the memory 64 are examples of a "memory" according to the technology of the present disclosure.

The communication I/F 52 is communicably connected to the network 18, and controls the exchange of various pieces of information between the CPU 60 and the user device 12 via the network 18.

The reception device 54 receives an instruction from an administrator or the like of the server 14. Examples of the reception device 54 include the voice input via a remote controller, a touch panel, a hard key, and/or a microphone. The instruction received by the reception device 54 is acquired by the CPU 60.

The display 56 displays various pieces of information under the control of the CPU 60. Examples of the display 56 include a liquid crystal display. It should be noted that another type of display, such as an EL display, may be adopted as the display 56 without being limited to the liquid crystal display.

The external I/F 58 controls the exchange of various pieces of information with the device present outside the server 14. Examples of the external I/F 58 include a USB interface. A user device, a personal computer, a server, a USB memory, a memory card, and/or a printer are connected to the USB interface.

By the way, in the information processing system 10, the plurality of user devices 12 upload dated image data to the server 14, and the server 14 manages the uploaded dated image data. Here, the dated image data refers to image data to which a date is added. The dated image data is created by the user device 12, for example.

Figure 4:
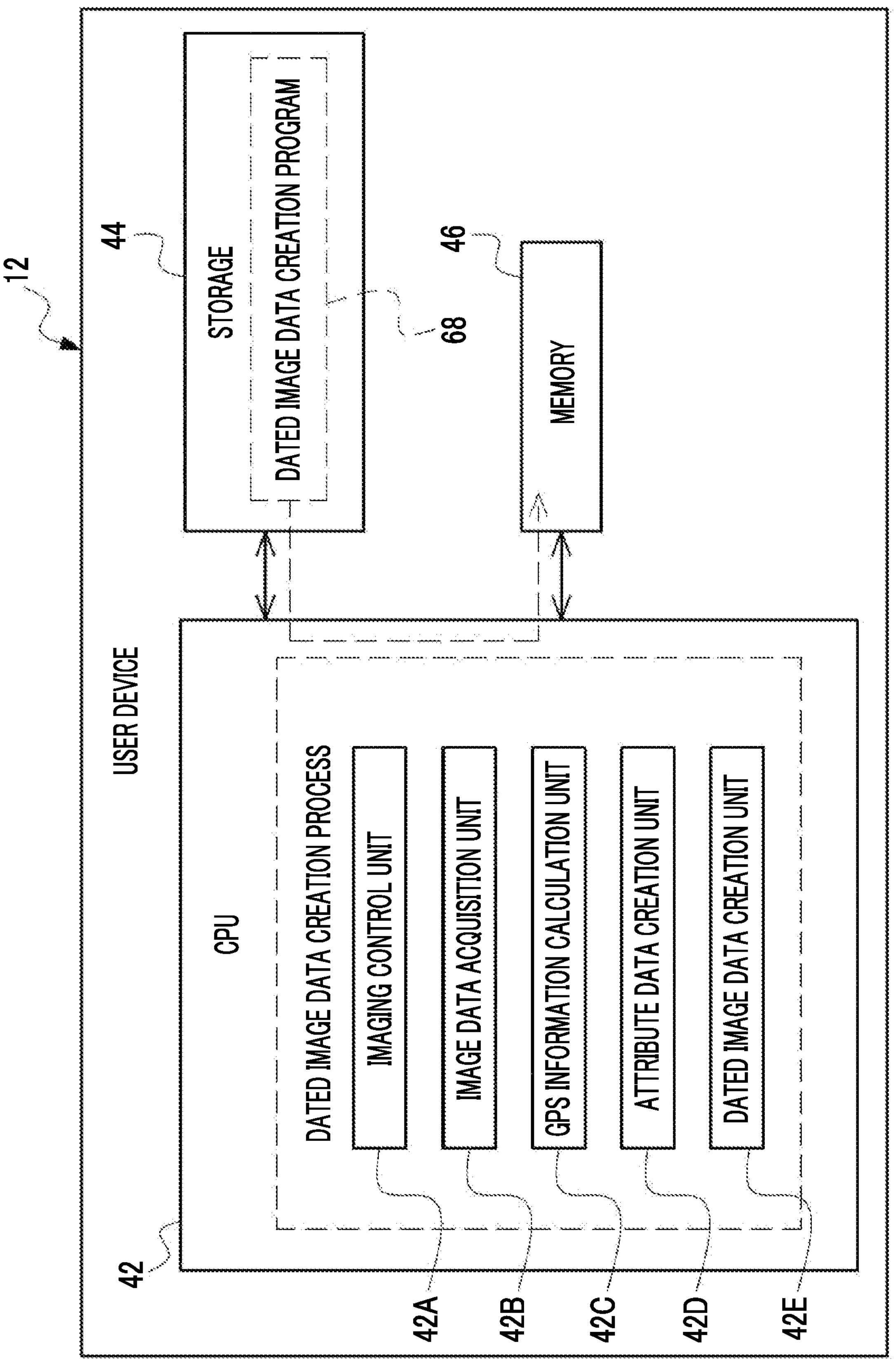
FIG. 4 is a block diagram showing an example of a main function of a CPU in a case in which a dated image data creation process is executed by the CPU of the user device provided in the information processing system according to the first embodiment.

In the user device 12, the dated image data is created by executing a dated image data creation process by the CPU 42. As an example, as shown in FIG. 4, a dated image data creation program 68 is stored in the storage 44. The CPU 42 reads out the dated image data creation program 68 from the storage 44. Moreover, the CPU 42 executes the dated image data creation program 68 read out from the storage 44 on the memory 46 to be operated as an imaging control unit 42A, an image data acquisition unit 42B, a GPS information calculation unit 42C, an attribute data creation unit 42D, and a dated image data creation unit 42E. That is, the dated image data creation process is realized by the CPU 42 being operated as the imaging control unit 42A, the image data acquisition unit 42B, the GPS information calculation unit 42C, the attribute data creation unit 42D, and the dated image data creation unit 42E.

Figure 5:
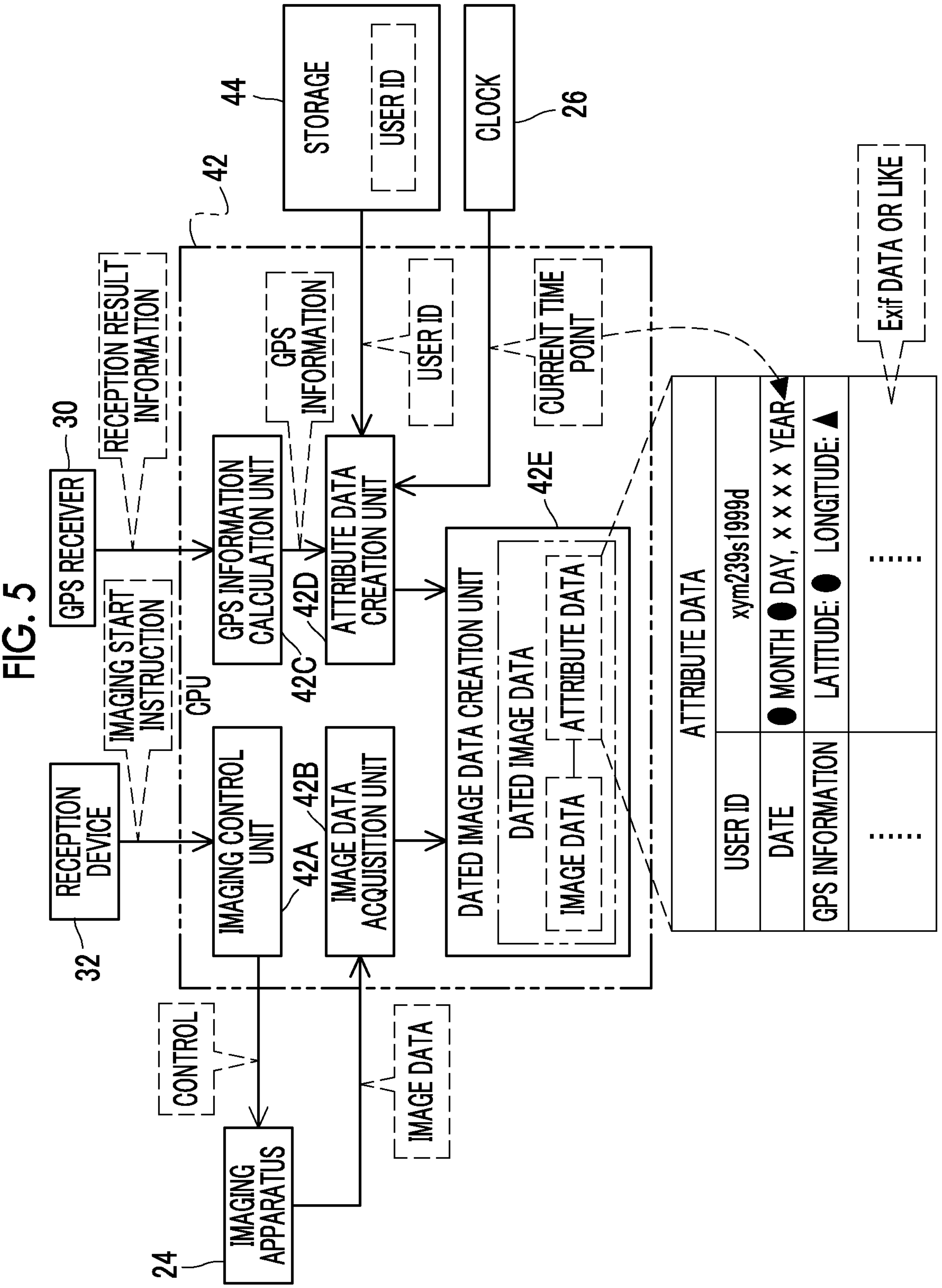
FIG. 5 is a block diagram showing an example of a process content in a case in which the CPU of the user device provided in the information processing system according to the first embodiment is operated as an imaging control unit, an image data acquisition unit, a GPS information calculation unit, an attribute data creation unit, and a dated image data creation unit.

As an example, as shown in FIG. 5, in a case in which an instruction to start imaging (hereinafter, also referred to as "imaging start instruction") is received by the reception device 32, the imaging control unit 42A controls the imaging apparatus 24 to cause the imaging apparatus 24 to image the subject. The imaging apparatus 24 generates the image data by imaging the subject. The image data acquisition unit 42B acquires the image data from the imaging apparatus 24.

The GPS information calculation unit 42C calculates the GPS information based on the reception result information input from the GPS receiver 30.

The storage 44 stores a user ID for specifying the user 16. The attribute data creation unit 42D creates attribute data indicating an attribute of the image data acquired by the image data acquisition unit 42B. An attribute data creation timing is a timing at which the imaging of one frame is performed by the imaging apparatus 24. That is, the attribute data is created by the attribute data creation unit 42D each time the imaging of one frame is performed by the imaging apparatus 24.

The attribute data creation unit 42D acquires the GPS information from the GPS information calculation unit 42C. In addition, the attribute data creation unit 42D acquires the user ID from the storage 44. Further, the attribute data creation unit 42D acquires the current time point from the clock 26. Moreover, the attribute data creation unit 42D creates the attribute data including the user ID, the date, and the GPS information. The GPS information is included in the attribute data as information for specifying an imaging position. In addition, the attribute data also includes Exif information.

In addition, here, as the date included in the attribute data, the current time point acquired from the clock 26 by the attribute data creation unit 42D is adopted. Since the attribute data is created at a timing at which the imaging apparatus 24 performs the imaging of one frame as described above, the date included in the attribute data is the date on which the imaging is performed (hereinafter, also referred to as "imaging date").

The dated image data creation unit 42E acquires the image data from the image data acquisition unit 42B and acquires the attribute data from the attribute data creation unit 42D each time the imaging of one frame. Moreover, the dated image data creation unit 42E creates the dated image data by associating the image data and the attribute data in units of one frame.

Figure 6:
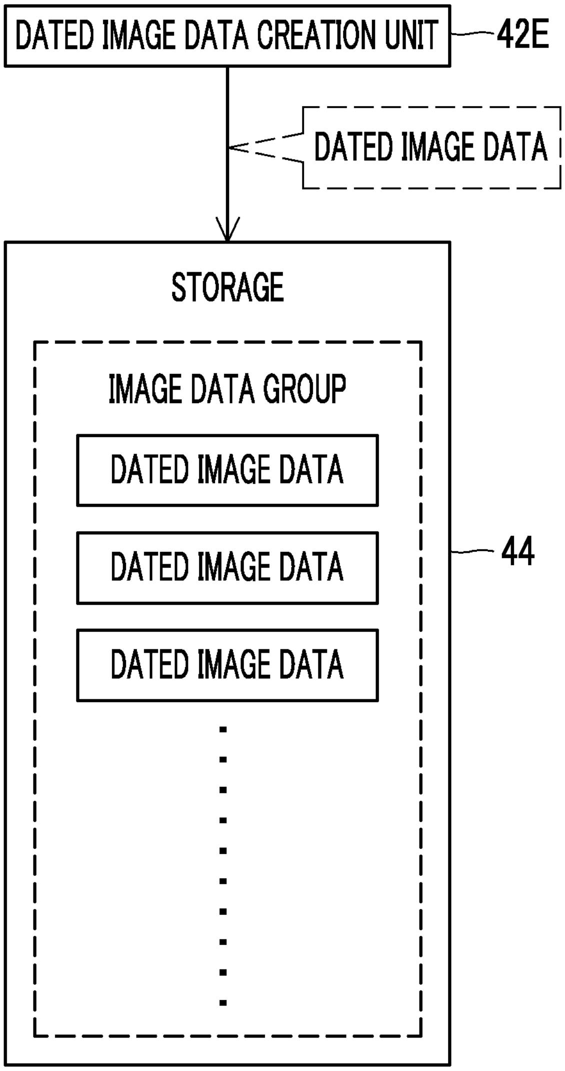
FIG. 6 is a block diagram showing an example of a process content in a case in which the CPU of the user device provided in the information processing system according to the first embodiment is operated as the dated image data creation unit.
Figure 7:
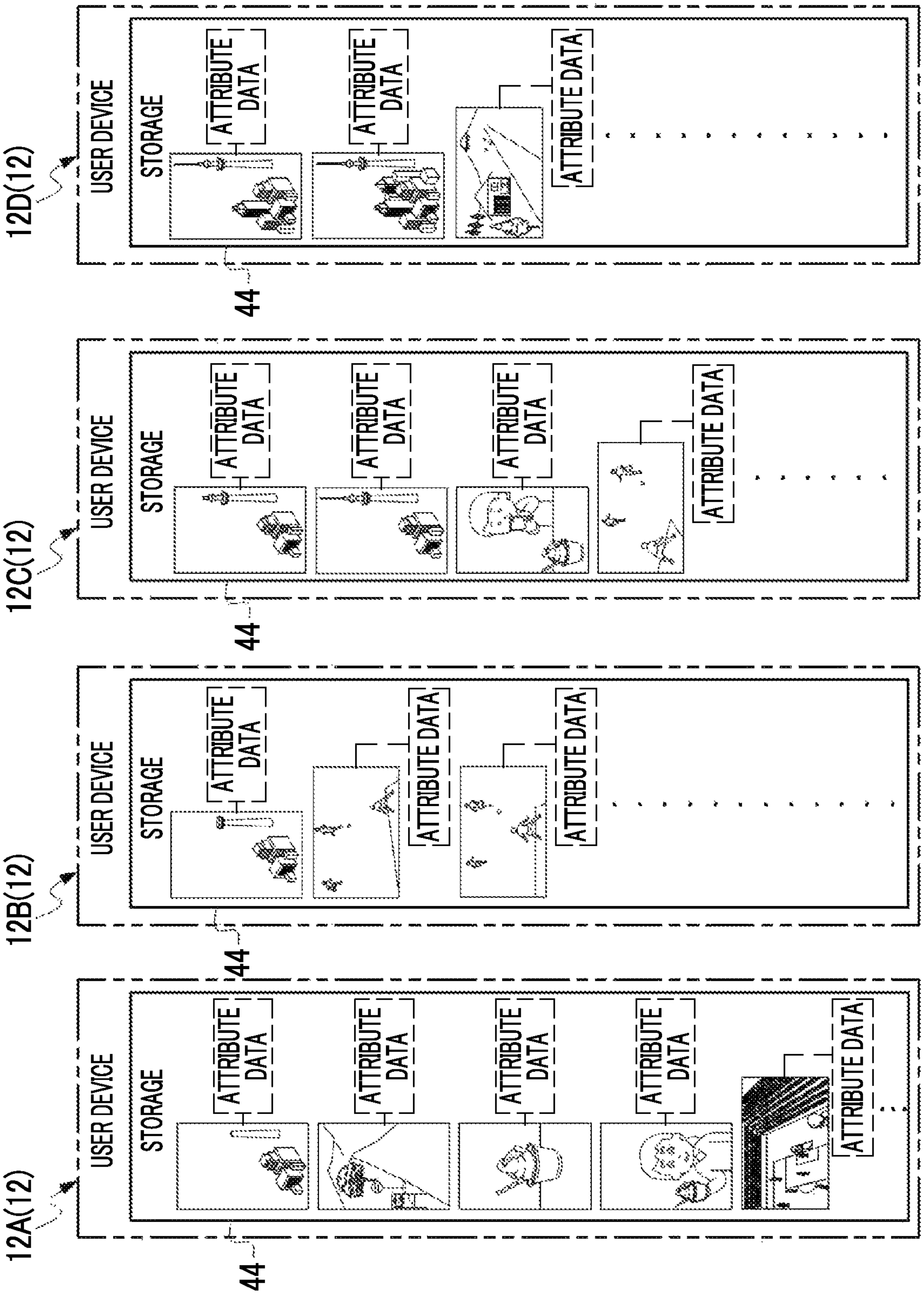
FIG. 7 is a conceptual diagram showing an example of a state in which a plurality of dated image data are stored in a storage of each of a plurality of user devices provided in the information processing system according to the first embodiment.

As an example, as shown in FIG. 6, each time the dated image data is created by the dated image data creation unit 42E, the dated image data is stored in the storage 44 by the dated image data creation unit 42E. The storage 44 holds a plurality of dated image data (for example, dated image data of a plurality of frames) as an image data group. As described above, the dated image data is created for each of the plurality of user devices 12 each time the imaging is performed, and as shown in FIG. 7 as an example, the plurality of dated image data are held in the storage 44 of each of the plurality of user devices 12 as an image data group.

Figure 8:
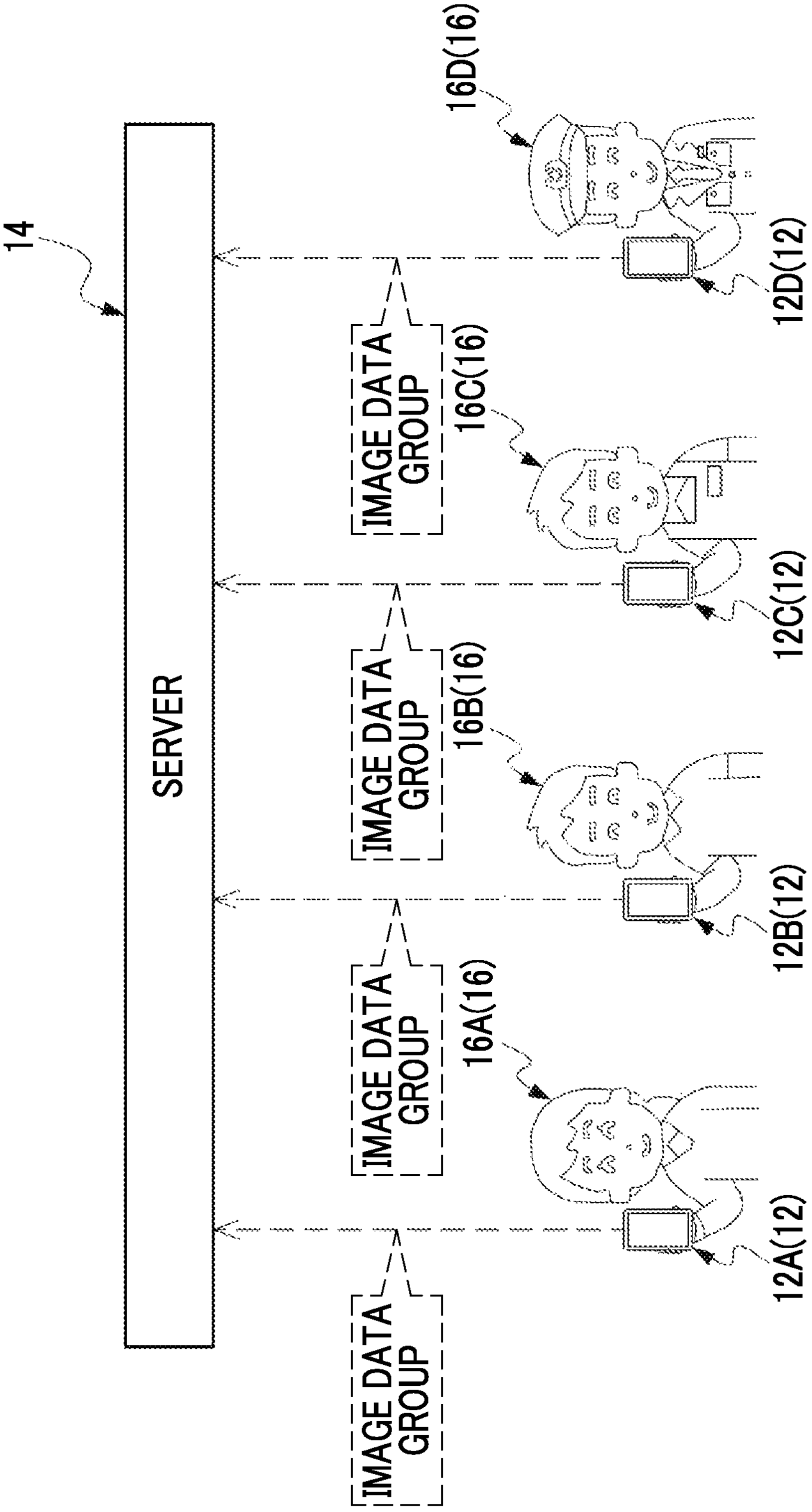
FIG. 8 is a conceptual diagram showing an example of an aspect in which the plurality of user devices provided in the information processing system according to the first embodiment upload an image data group to the server.

As an example, as shown in FIG. 8, each of the plurality of users 16 uploads the image data group held in the storage 44 to the server 14 by operating own user device 12 thereof. As described above, the image data group uploaded to the server 14 is stored and managed in the server 14.

By the way, in the information processing system 10, in a case in which the user 16 owns the image data without the date (hereinafter, also referred to as "dateless image data"), the user 16 can request the server 14 to add the date to the dateless image data by using the user device 12. In this case, in the user device 12, the CPU 42 executes the date addition request process, so that the server 14 is requested to add the date to the dateless image data.

Figure 9:
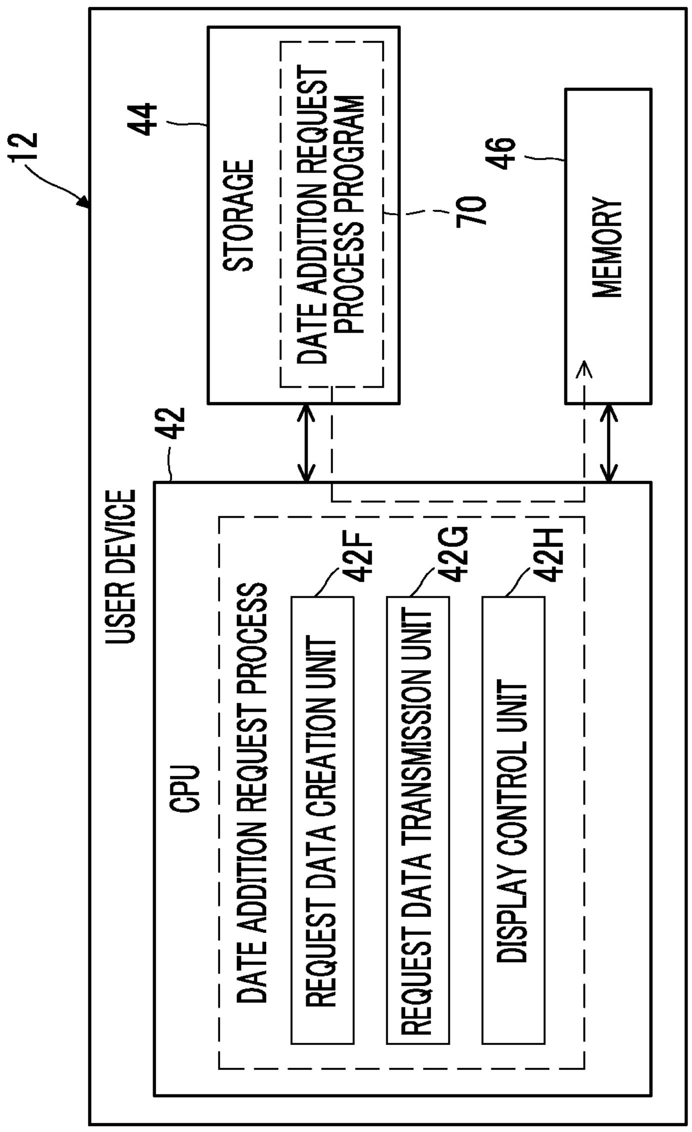
FIG. 9 is a block diagram showing an example of a main function of the CPU in a case in which a date addition request process is executed by the CPU of the user device provided in the information processing system according to the first embodiment.

As an example, as shown in FIG. 9, a date addition request process program 70 is stored in the storage 44. The CPU 42 reads out the date addition request process program 70 from the storage 44. Moreover, the CPU 42 executes the date addition request process program 70 read out from the storage 44 on the memory 46 to be operated as a request data creation unit 42F, a request data transmission unit 42G, and a display control unit 42H. That is, the date addition request process is realized by the CPU 42 being operated as the request data creation unit 42F, the request data transmission unit 42G, and the display control unit 42H.

Figure 10:
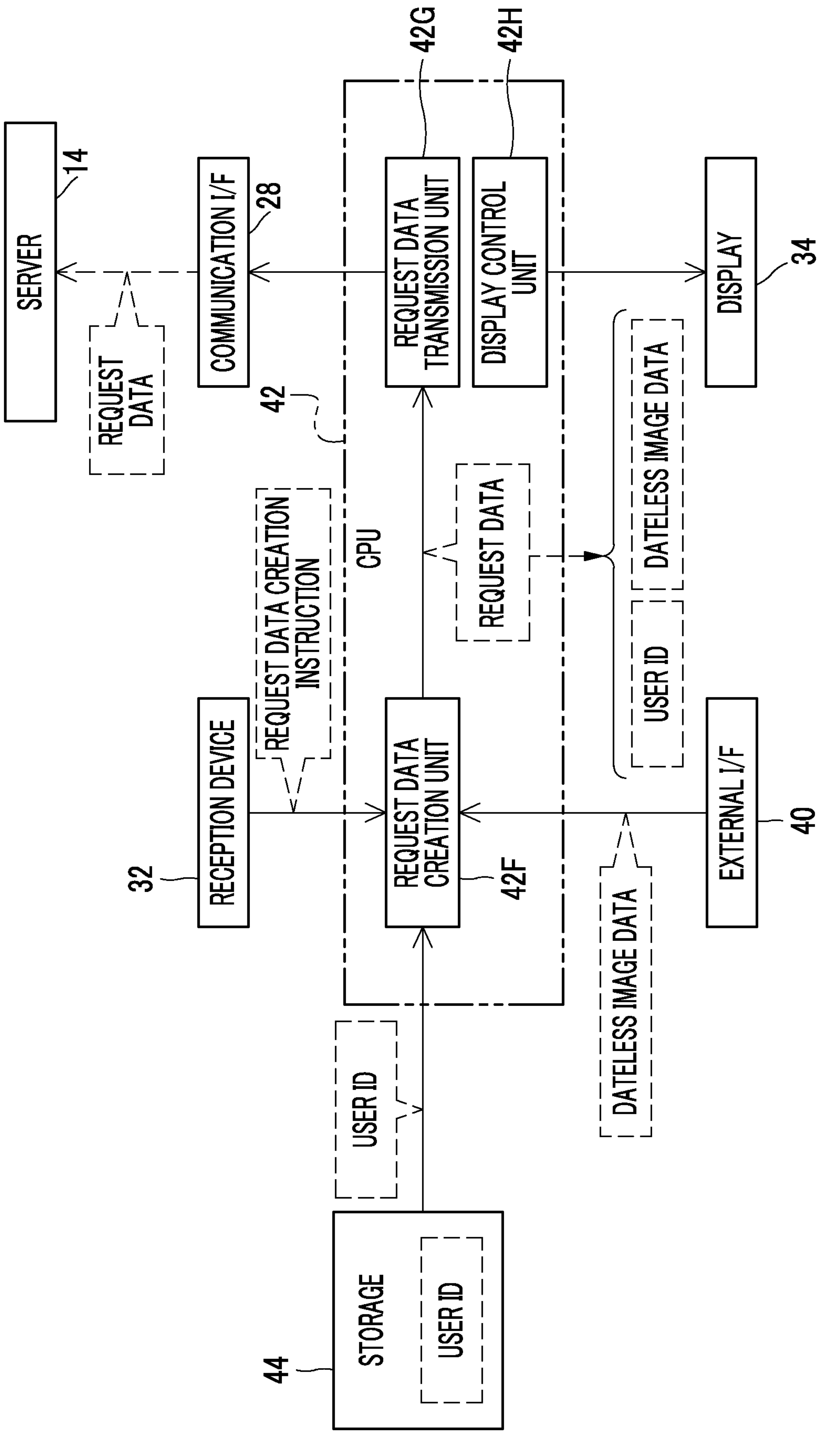
FIG. 10 is a block diagram showing an example of a process content in a case in which the CPU of the user device provided in the information processing system according to the first embodiment is operated as a request data creation unit, a request data transmission unit, and a display control unit.

As shown in FIG. 10 as an example, in a case in which an instruction to create request data (hereinafter, also referred to as "request data creation instruction") is received by the reception device 32, the request data creation unit 42F creates the request data. Here, the request data refers to data indicating that the server 14 is requested to add the date to the dateless image data. In a case in which the request data creation instruction is received by the reception device 32, the request data creation unit 42F first acquires the user ID from the storage 44, and acquires the dateless image data from an external device (for example, a USB memory or an SSD) via the external I/F 40. Then, the request data creation unit 42F creates the request data by associating the acquired user ID with the dateless image data. Moreover, the request data creation unit 42F outputs the created request data to the request data transmission unit 42G. It should be noted that, in the information processing system 10, the user device 12 adds the user ID as the attribute data included in the dated image data or the dateless image data, but the technology of the present disclosure is not limited to this. For example, the dated image data or the dateless image data may be generated by performing a user authentication process of specifying the user 16 who uses the user device 12 between the server 14 and the user device 12, and adding the image uploaded after the authentication and the user ID associated with the authenticated user 16. In addition, the user device 12 may add a device ID for identifying the user device 12 instead of the user ID as the attribute data included in the dated image data or the dateless image data, and the server 14 may hold the user 16 and a correspondence list of the device ID corresponding to each user 16 in the storage 62, specify the user ID from the device ID included in the dated image data or the dateless image data based on the correspondence list.

The request data transmission unit 42G transmits the request data input from the request data creation unit 42F to the server 14 via the communication I/F 28.

The server 14 receives the request data transmitted from the request data transmission unit 42G, adds the date to the dateless image data included in the received request data, generates date-added image data, and provides the generated date-added image data to the user device 12 which is a request source.

The display control unit 42H displays an image (hereinafter, also referred to as "date-added image") indicated by the date-added image data provided by the server 14 on the display 34.

The date-added image data is generated by executing a dated image data list creation process (see FIG. 11) and a date addition process (see FIG. 34) by the CPU 60 of the server 14.

Figure 11:
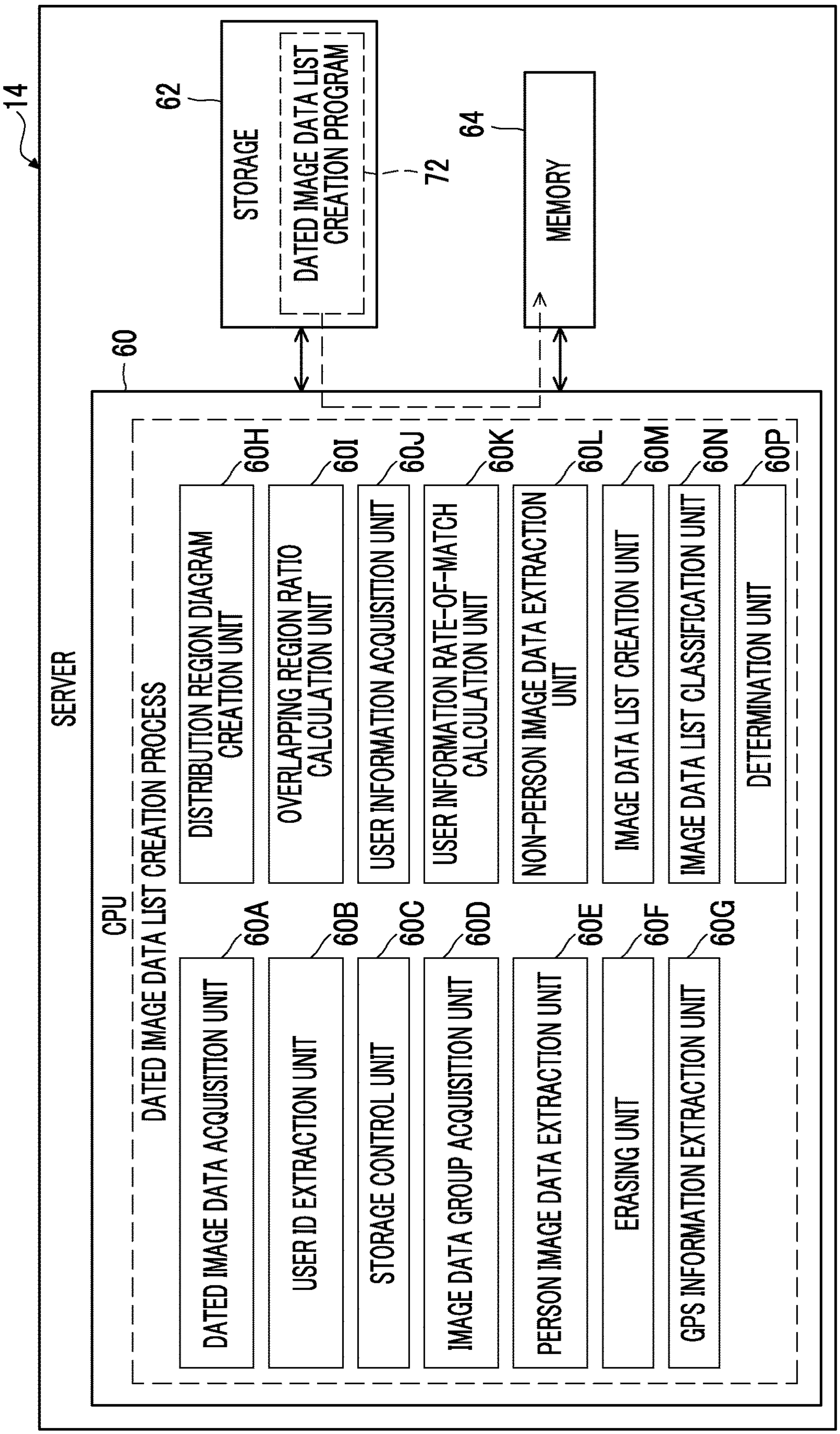
FIG. 11 is a block diagram showing an example of a main function of the CPU in a case in which a dated image data list creation process is executed by the CPU of the server provided in the information processing system according to the first embodiment.

As shown in FIG. 11 as an example, a dated image data list creation program 72 is stored in the storage 62. The CPU 60 reads out the dated image data list creation program 72 from the storage 62. Moreover, the CPU 60 executes the dated image data list creation program 72 read out from the storage 62 on the memory 64 to be operated as a dated image data acquisition unit 60A, a user ID extraction unit 60B, a storage control unit 60C, an image data group acquisition unit 60D, a person image data extraction unit 60E, an erasing unit 60F, a GPS information extraction unit 60G, a distribution region diagram creation unit 60H, an overlapping region ratio calculation unit 60I, a user information acquisition unit 60J, a user information rate-of-match calculation unit 60K, a non-person image data extraction unit 60L, an image data list creation unit 60M, an image data list classification unit 60N, and a determination unit 60P. That is, the dated image data list creation process is realized by the CPU 60 being operated as the dated image data acquisition unit 60A, the user ID extraction unit 60B, the storage control unit 60C, the image data group acquisition unit 60D, the person image data extraction unit 60E, the erasing unit 60F, the GPS information extraction unit 60G, the distribution region diagram creation unit 60H, the overlapping region ratio calculation unit 60I, the user information acquisition unit 60J, the user information rate-of-match calculation unit 60K, the non-person image data extraction unit 60L, the image data list creation unit 60M, the image data list classification unit 60N, and the determination unit 60P.

The CPU 60 creates a dated image data list by executing the dated image data list creation process. The dated image data list is created for each subject by classifying the plurality of dated image data for each subject indicated by each of the plurality of dated image data. The "subject" as used herein refers to a subject of which an aspect of a temporal change can be visually specified. In addition, here, the "plurality of dated image data", which are classification targets, are the plurality of dated image data having different dates, and are the image data of the plurality of users 16 including a specific user. The specific user refers to, for example, the user 16 (for example, the owner of the user device 12) to which the user device 12 that has transmitted the request data to the server 14 is allocated among the plurality of users 16.

In addition, the CPU 60 associates the dated image data list with the specific user by executing the dated image data list creation process. The specific user is associated with the dated image data list for the subject similar to the subject indicated by the dated image data of the specific user.

Figure 12:
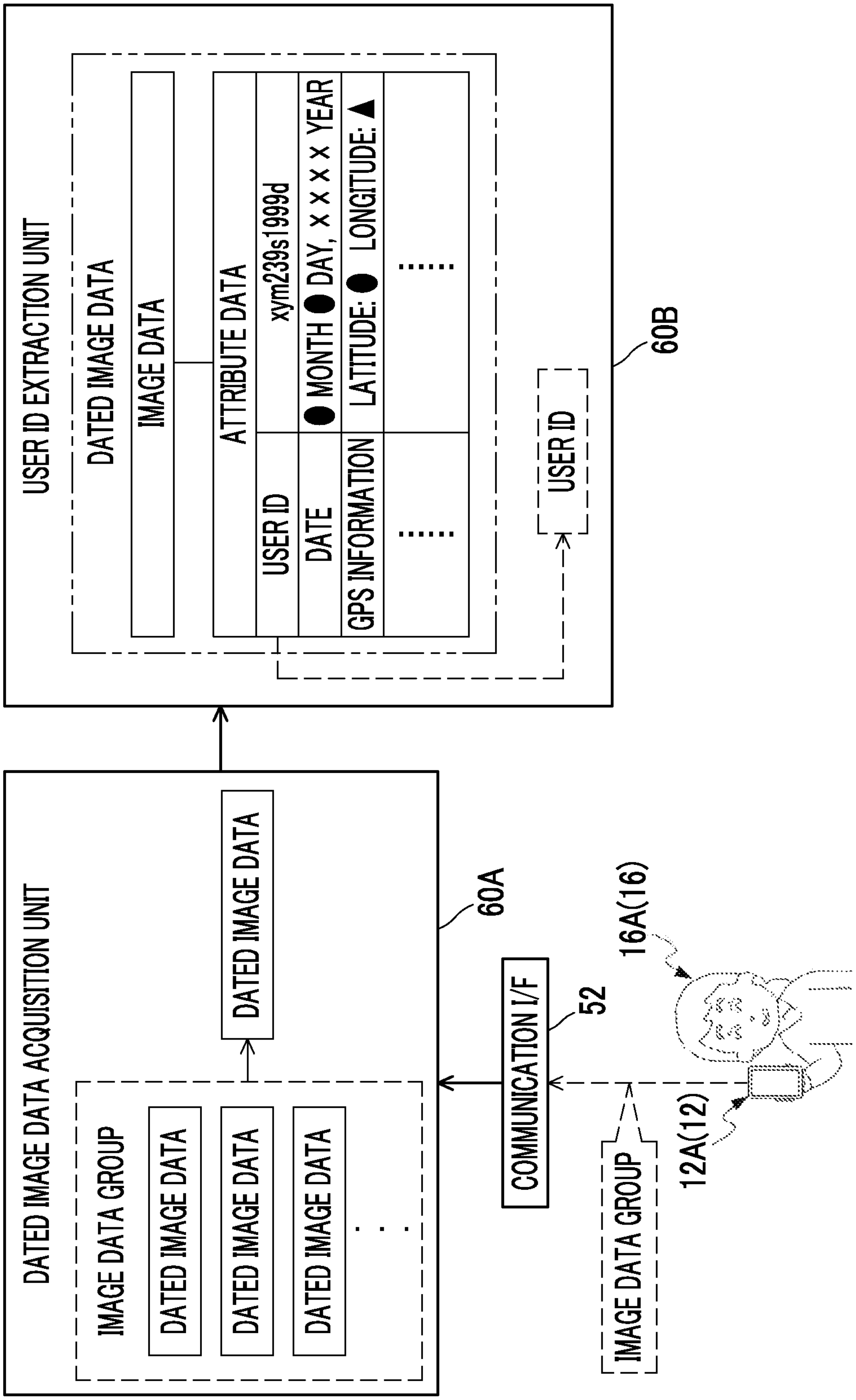
FIG. 12 is a block diagram showing an example of a process content in a case in which the CPU of the server provided in the information processing system according to the first embodiment is operated as a dated image data acquisition unit and a user ID extraction unit.

As an example, as shown in FIG. 12, in a case in which an image data group transmitted from the user device 12 is received by the communication I/F 52, the dated image data acquisition unit 60A acquires the image data group received by the communication I/F 52. Moreover, the dated image data acquisition unit 60A acquires the dated image data from the image data group. The user ID extraction unit 60B extracts the user ID from the attribute data included in the dated image data acquired by the dated image data acquisition unit 60A. It should be noted that the user ID extraction unit 60B extracts the user ID from the attribute data included in the dated image data, but the technology of the present disclosure is not limited to this, and the server 14 may hold, in the storage 62, a list in which the user IDs of the plurality of users and the dated image data associated with each of the plurality of users 16 are associated, or the user ID extraction unit 60B may select a predetermined condition or the user ID of any user 16 from among the stored plurality of users 16. The predetermined condition may be, for example, a timing at which the dated image data is uploaded by the user 16 via the user device 12.

Figure 13:
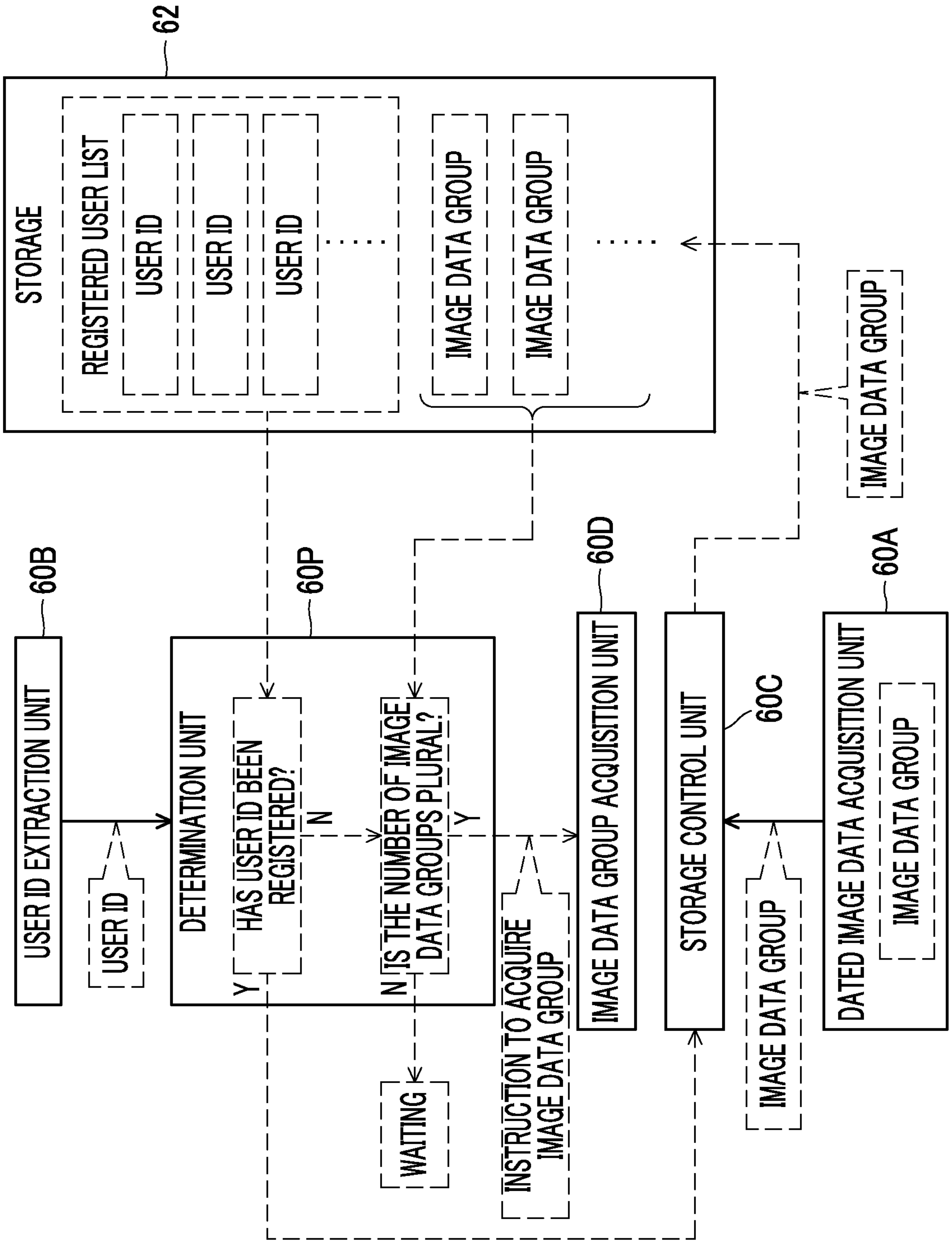
FIG. 13 is a block diagram showing an example of a process content in a case in which the CPU of the server provided in the information processing system according to the first embodiment is operated as the user ID extraction unit, a determination unit, an image data group acquisition unit, a storage control unit, and the dated image data acquisition unit.

As an example, as shown in FIG. 13, a registered user list is stored in the storage 62. The registered user list is a list showing a plurality of user IDs for specifying the user group satisfying a condition that registration to agree to share information including the dated image data has been made. That is, the plurality of users 16 specified by the plurality of user IDs indicated by the registered user list are the user group that has made the registration to agree to share the information including the dated image data (hereinafter, also referred to as "registered user group").

For the registered user group, narrowing down is further performed by executing the dated image data list creation process shown below by the CPU 60. As described above, the image data group is associated with each of the plurality of users 16, and the registered user group is narrowed down to the users who satisfy a condition that the image data groups are similar to each other. Further, the registered user group is narrowed down to users who satisfy a condition that the registered user information is similar. In the following, a more detailed description will be made.

The determination unit 60P refers to the registered user list in the storage 62 to determine whether or not the user ID extracted by the user ID extraction unit 60B is a registered user ID. In a case in which the determination unit 60P determines that the user ID is the registered user ID, the storage control unit 60C stores the image data group acquired by the dated image data acquisition unit 60A in the storage 62.

In a case in which the determination unit 60P determines that the user ID extracted by the user ID extraction unit 60B is not the registered user ID, the determination unit 60P next determines whether or not the number of image data groups stored in the storage 62 is plural. In a case in which the number of image data groups stored in the storage 62 is not plural, the determination unit 60P waits for the arrival of a next determination timing.

In a case in which the determination unit 60P determines that the number of image data groups stored in the storage 62 is plural, the determination unit 60P instructs the image data group acquisition unit 60D to acquire the image data group.

Figure 14:
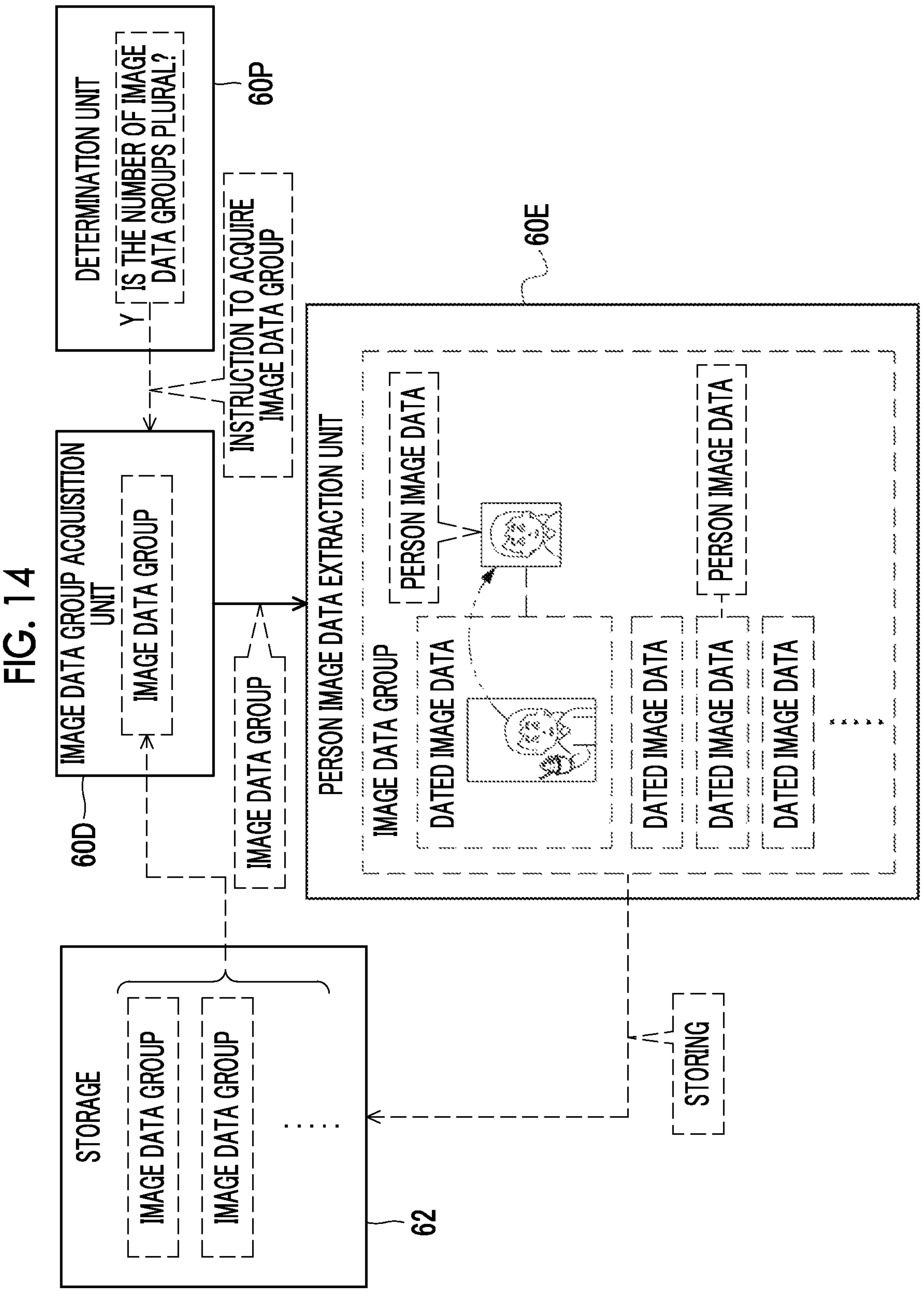
FIG. 14 is a block diagram showing an example of a process content in a case in which the CPU of the server provided in the information processing system according to the first embodiment is operated as the image data group acquisition unit, the determination unit, and a person image data extraction unit.

As an example, as shown in FIG. 14, in a case in which the determination unit 60P makes the instruction to acquire the image data group, the image data group acquisition unit 60D acquires the image data group from the storage 62. The person image data extraction unit 60E extracts person image data indicating the person from the dated image data by executing an image recognition process with respect to the dated image data included in the image data group, and associates the extracted person image data with the dated image data which is an extraction source. Moreover, the person image data extraction unit 60E stores the dated image data associated with the person image data in the storage 62 for each image data group to return the dated image data to the storage 62 for each image data group.

It should be noted that, in the first embodiment, as the image recognition process, a process of performing image analysis using a cascade classifier is applied. It should be noted that this is merely an example, and another image recognition process, such as pattern matching, may be performed, and any process may be performed as long as the subject image data indicating a specific subject can be recognized from the dated image data by the process.

Figure 15:
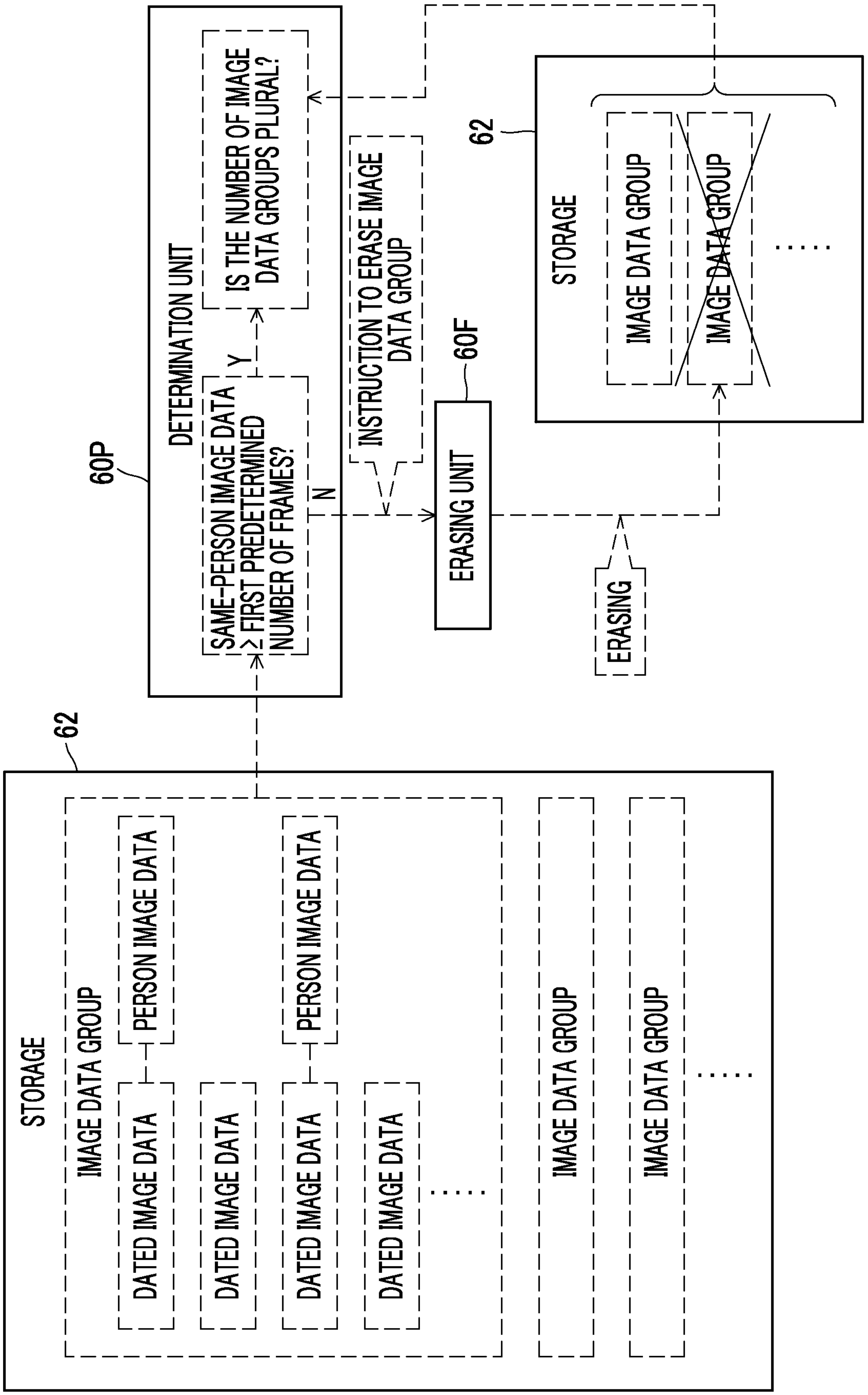
FIG. 15 is a block diagram showing an example of a process content in a case in which the CPU of the server provided in the information processing system according to the first embodiment is operated as the determination unit and an erasing unit.

As an example, as shown in FIG. 15, the determination unit 60P determines whether or not the number of frames of the person image data for the same person (hereinafter, also referred to as "same-person image data") is equal to or larger than a first predetermined number of frames (for example, 10) for each image data group stored in the storage 62. Here, the determination of whether or not the data is the same-person image data is performed based on the image recognition result obtained by executing the image recognition process with respect to the person image data associated with the dated image data. It should be noted that, here, the first predetermined number of frames is a fixed value. It should be noted that this is merely an example, and the first predetermined number of frames may be a fixed value or a variable value as long as it is a natural number of 2 or more. Examples of the variable value include a value that can be changed in accordance with the instruction received by the reception device 54, and a value that is changed periodically.

In a case in which the determination unit 60P determines that the number of frames of the same-person image data is smaller than the first predetermined number of frames, the determination unit 60P instructs the erasing unit 60F to erase the image data group, which is a determination target, from the image data group, which is a creation target of the image data list. In a case in which the determination unit 60P makes the instruction to erase the image data group, the erasing unit 60F erases the image data group, which is the determination target, from the image data group which is the creation target of the image data list in the storage 62. It should be noted that, in the present embodiment, the CPU 60 includes the erasing unit 60F that erases the image data group which is the determination target by the determination unit 60P from the image data group which is the creation target of the image data list, but the technology of the present disclosure is not limited to this. For example, the determination unit 60P may include an extraction unit that extracts the image data group which is the determination target from the storage 44 as the image data group which is the creation target of the image data list.

Figure 16:
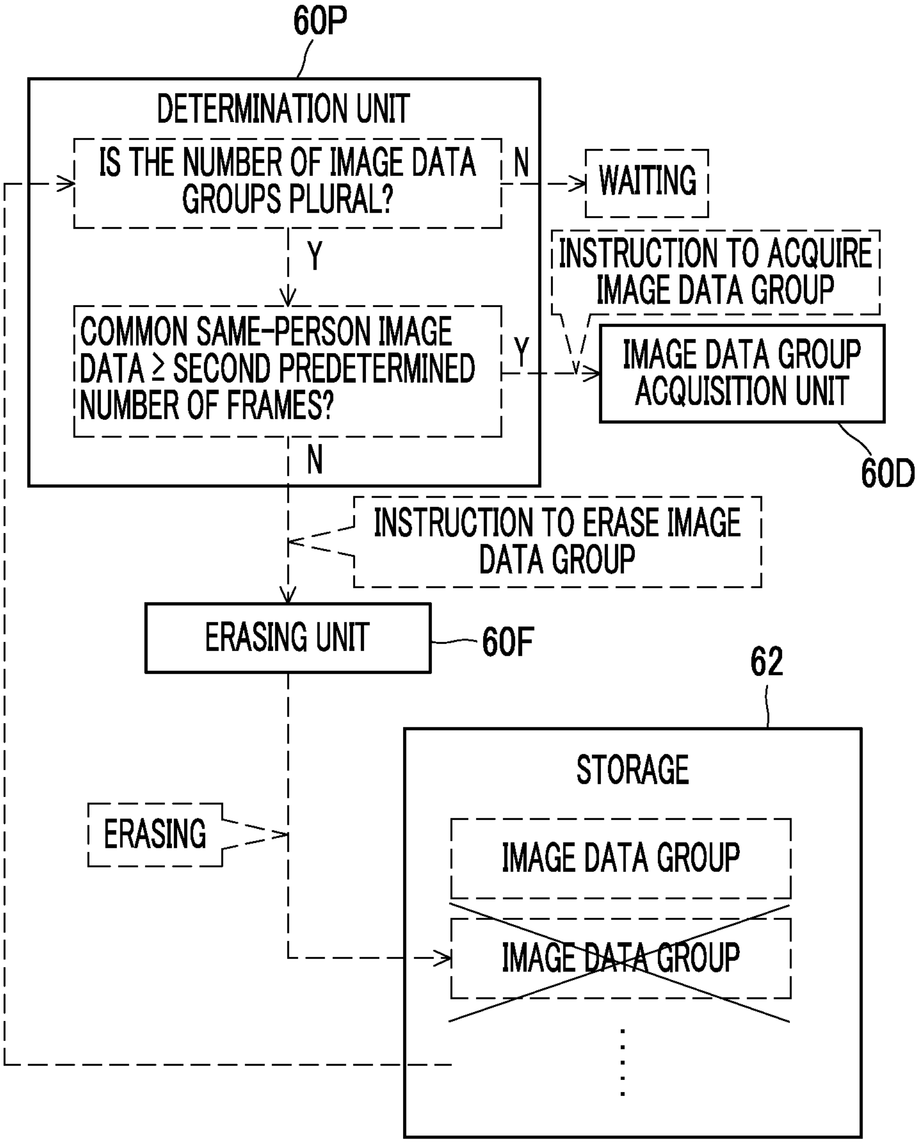
FIG. 16 is a block diagram showing an example of a process content in a case in which the CPU of the server provided in the information processing system according to the first embodiment is operated as the determination unit and the erasing unit.

On the other hand, as an example, as shown in FIG. 16, in a case in which it is determined that the number of frames of the same-person image data is equal to or larger than the first predetermined number of frames, the determination unit 60P determines whether or not the number of image data groups stored in the storage 62 is plural, the image data group being determined that the number of frames of the same-person image data is equal to or larger than the first predetermined number of frames. Here, in a case in which the number of image data groups is not plural, the determination unit 60P waits for the arrival of the next determination timing. On the other hand, in a case in which the number of image data groups is plural, the determination unit 60P determines whether or not the number of frames of the common same-person image data is equal to or larger than a second predetermined number of frames (for example, 5) for each of the image data groups in which the number of frames of the same-person image data is determined to be equal to or larger than the first predetermined number of frames.

Here, in a case in which the image data in which the number of frames of the common same-person image data is smaller than the second predetermined number of frames is present, the determination unit 60P instructs the erasing unit 60F to erase the image data group in which the number of frames of the common same-person image data is smaller than the second predetermined number of frames from the image data group which is the creation target of the image data list. In a case in which the determination unit 60P makes the instruction to erase the image data group, the erasing unit 60F erases the image data group in which the number of frames of the common same-person image data is smaller than the second predetermined number of frames from the image data group which is the creation target of the image data list in the storage 62. On the other hand, in a case in which the image data group in which the number of frames of the common same-person image data is equal to or larger than the second predetermined number of frames is present, the determination unit 60P instructs the image data group acquisition unit 60D to acquire the image data group in which the number of frames of the common same-person image data is equal to or larger than the second predetermined number of frames from the storage 62 as the image data group which is the creation target of the image data list.

Figure 17:
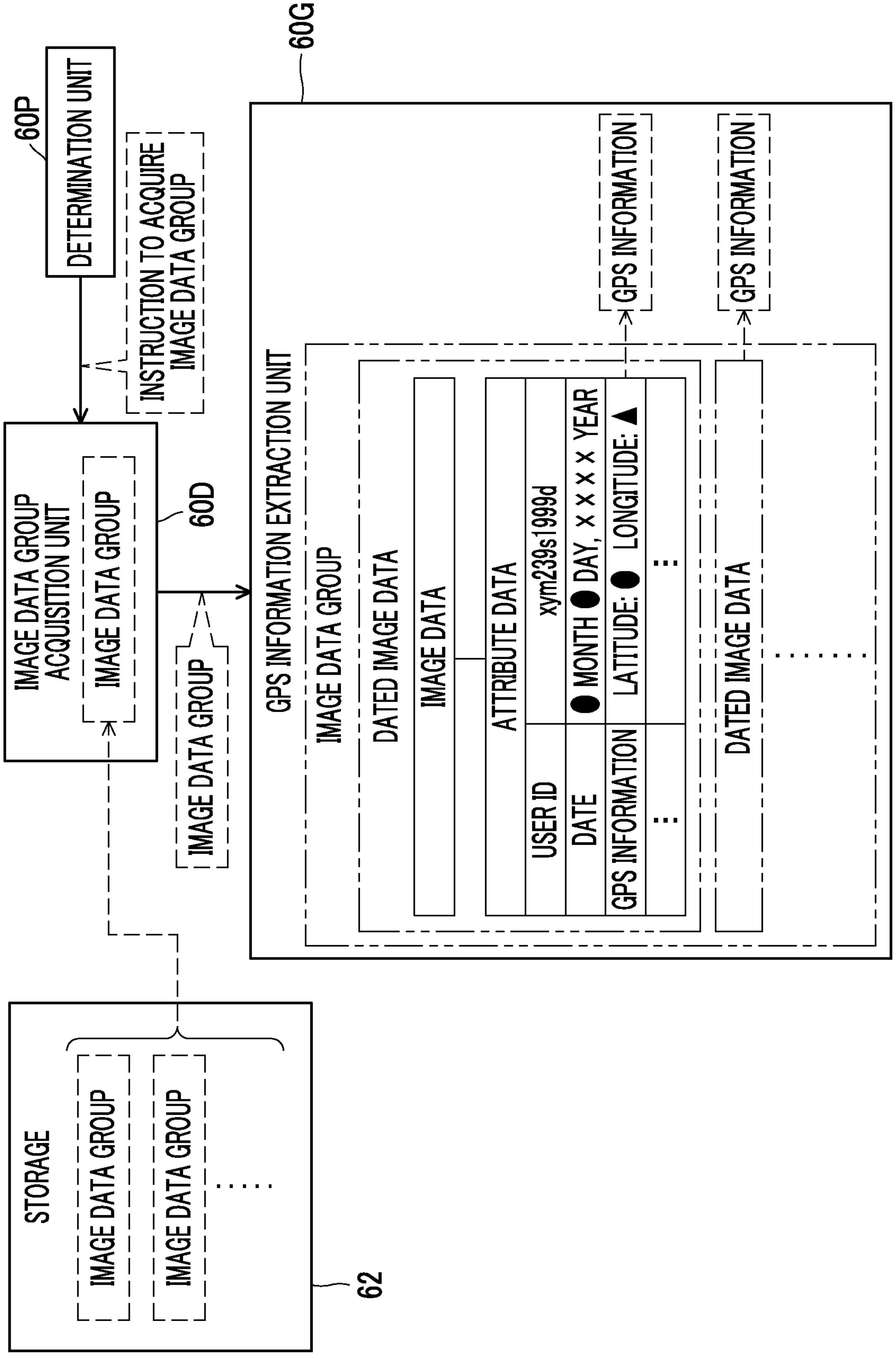
FIG. 17 is a block diagram showing an example of a process content in a case in which the CPU of the server provided in the information processing system according to the first embodiment is operated as the image data group acquisition unit, the determination unit, and a GPS information extraction unit.

As an example, as shown in FIG. 17, in a case in which the determination unit 60P makes the instruction to acquire the image data group, the image data group acquisition unit 60D acquires the image data group in which the number of frames of the common same-person image data is equal to or larger than the second predetermined number of frames from the storage 62. The GPS information extraction unit 60G extracts the GPS information from the attribute data in the dated image data included in the image data group acquired by the image data group acquisition unit 60D.

Figure 18:
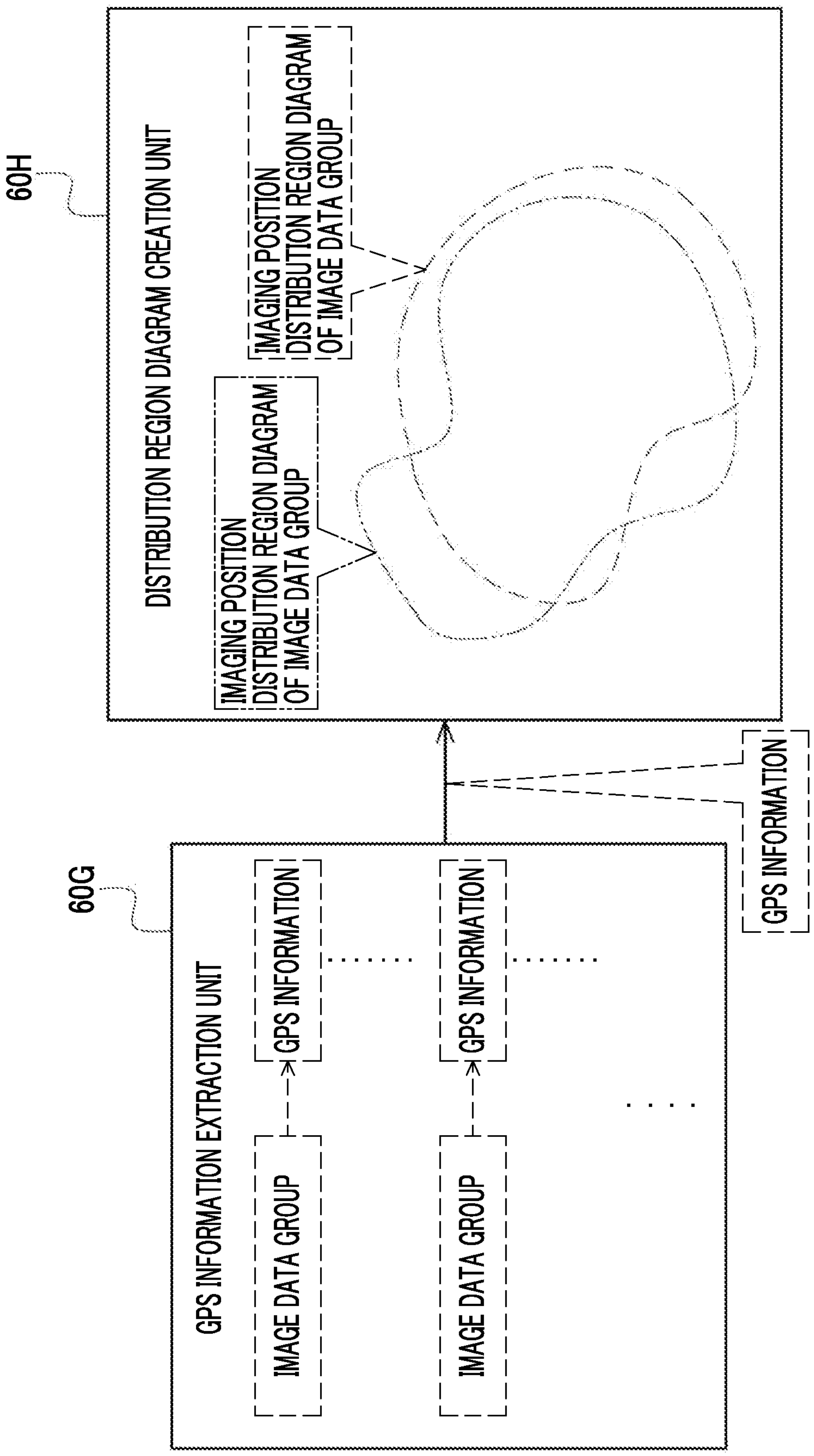
FIG. 18 is a block diagram showing an example of a process content in a case in which the CPU of the server provided in the information processing system according to the first embodiment is operated as the GPS information extraction unit and a distribution region diagram creation unit.

As an example, as shown in FIG. 18, the distribution region diagram creation unit 60H acquires the GPS information extracted by the GPS information extraction unit 60G for each image data group. Moreover, the distribution region diagram creation unit 60H creates an imaging position distribution region diagram of the image data group for each image data group based on the GPS information. The imaging position distribution region diagram is a diagram showing a region in which the positions at which the imaging is performed indicated by the GPS information (hereinafter, also referred to as "imaging position") are distributed. In the example shown in FIG. 18, the imaging position distribution region diagrams of two image data groups are shown, but the technology of the present disclosure is not limited to this, and the imaging position distribution region diagrams for the number of image data groups are created.

Figure 19:
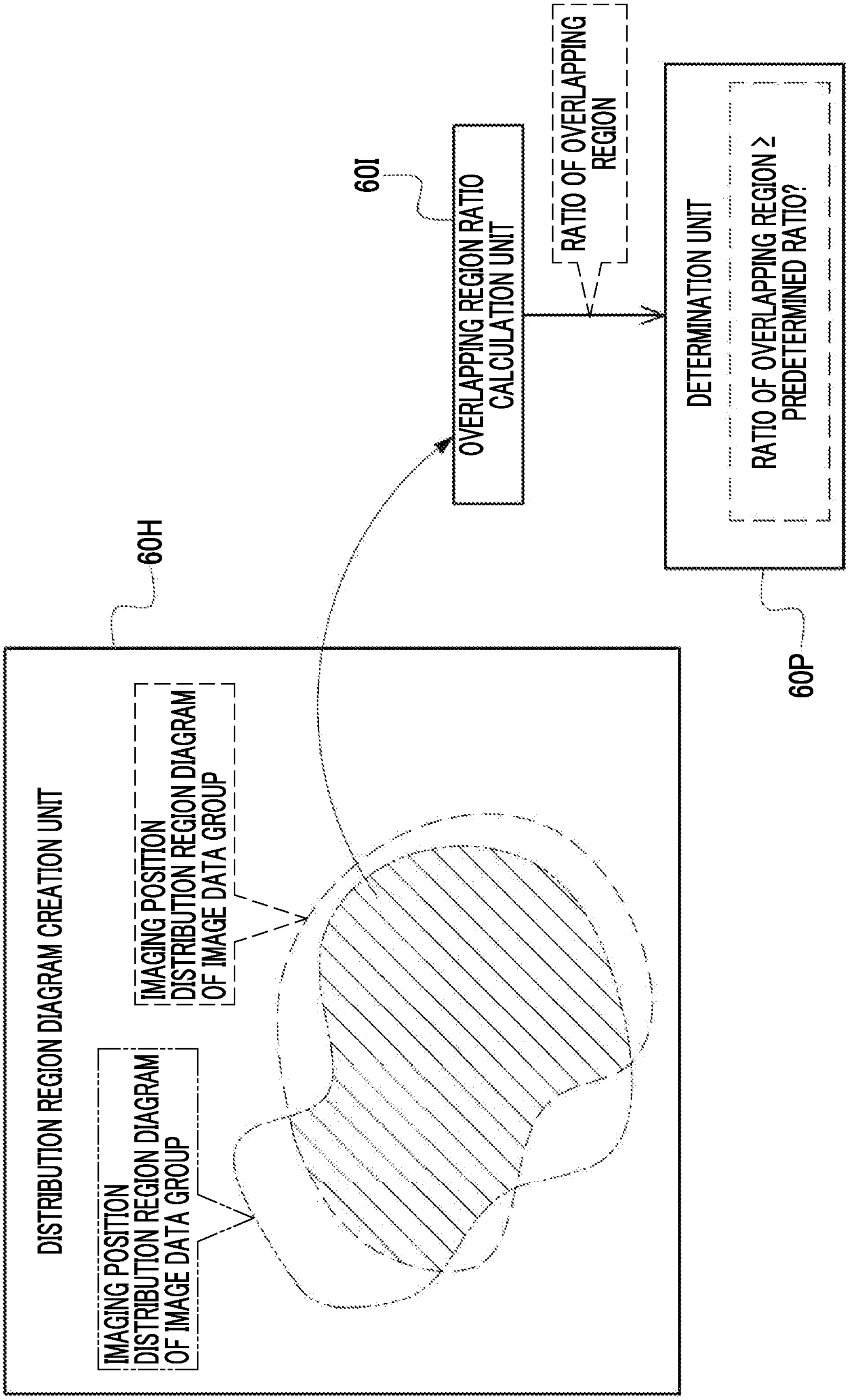
FIG. 19 is a block diagram showing an example of a process content in a case in which the CPU of the server provided in the information processing system according to the first embodiment is operated as the distribution region diagram creation unit, an overlapping region ratio calculation unit, and the determination unit.

As an example, as shown in FIG. 19, the overlapping region ratio calculation unit 60I calculates a ratio of the region in which the imaging position distribution region diagrams between the image data groups overlap with each other (hereinafter, also referred to as "overlapping region"). The determination unit 60P determines whether or not the ratio of the overlapping region is equal to or larger than a predetermined ratio (for example, 60%). It should be noted that, here, the predetermined ratio is a fixed value. It should be noted that this is merely an example, and the predetermined ratio may be a variable value. Examples of the variable value include a value that can be changed in accordance with the instruction received by the reception device 54, and a value that is changed periodically. In addition, in the example shown in FIG. 19, a hatched region indicates the overlapping region, and is a region in which the ratio of the overlapping region is equal to or larger than the predetermined ratio.

Figure 20:
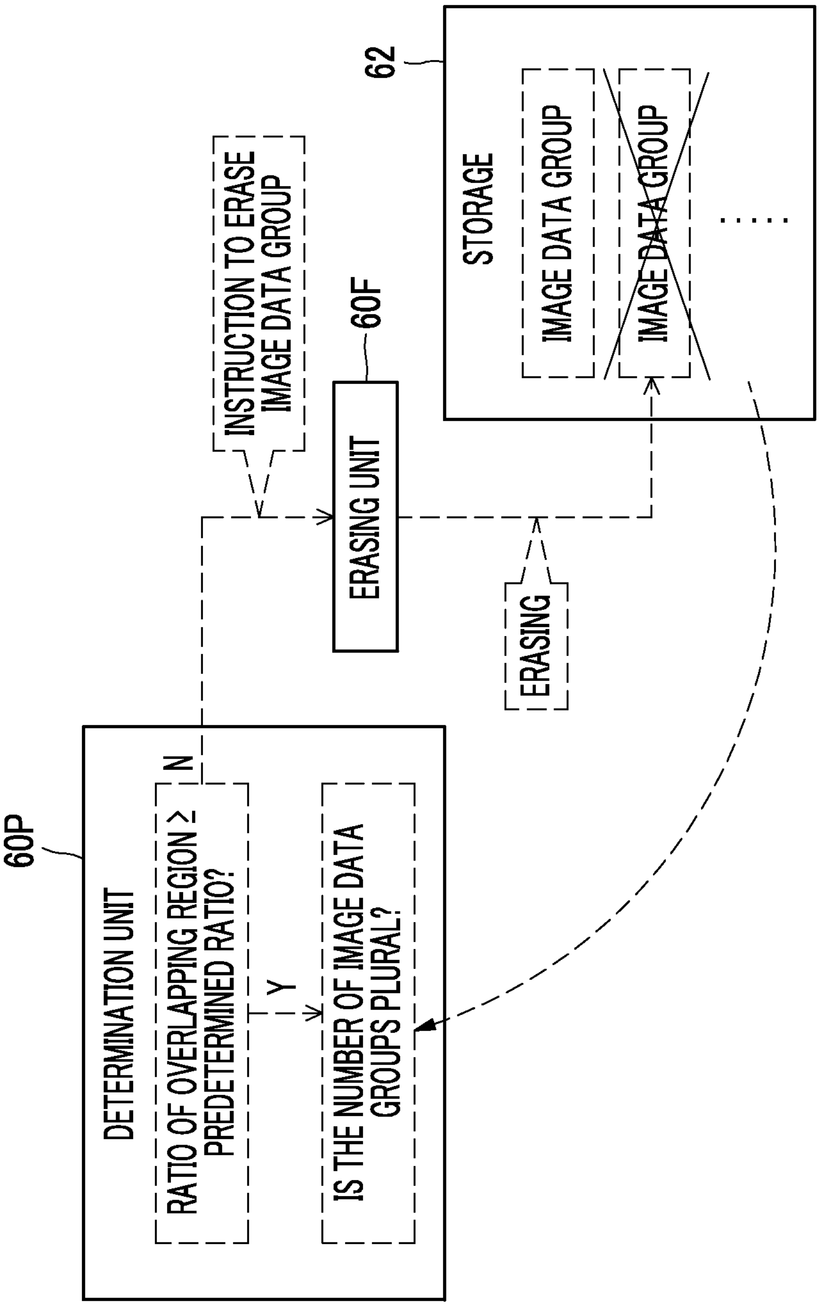
FIG. 20 is a block diagram showing an example of a process content in a case in which the CPU of the server provided in the information processing system according to the first embodiment is operated as the determination unit and the erasing unit.

As an example, as shown in FIG. 20, in a case in which it is determined that the ratio of the overlapping region is smaller than the predetermined ratio, the determination unit 60P instructs the erasing unit 60F to erase the image data group which is the determination target. For example, in a case in which the ratio of the overlapping region of the imaging position distribution region diagrams between the two image data groups is smaller than the predetermined ratio, the determination unit 60P instructs the erasing unit 60F to erase the two image data groups.

The erasing unit 60F limits the dated image data, which is the creation target of the dated image data list, among the plurality of dated image data to the image data obtained by being captured in a range determined based on the GPS information. That is, in a case in which the determination unit 60P makes the instruction to erase the image data group from the image data group which is the creation target of the image data list, the erasing unit 60F limits the dated image data which is the creation target of the dated image data list by erasing the image data group, which is the determination target, from the image data group which is the creation target of the image data list in the storage 62.

On the other hand, in a case in which it is determined that the ratio of the overlapping region among all the image data groups is equal to or larger than the predetermined ratio, the determination unit 60P determines whether or not the number of image data groups stored in the storage 62 is plural.

Figure 21:
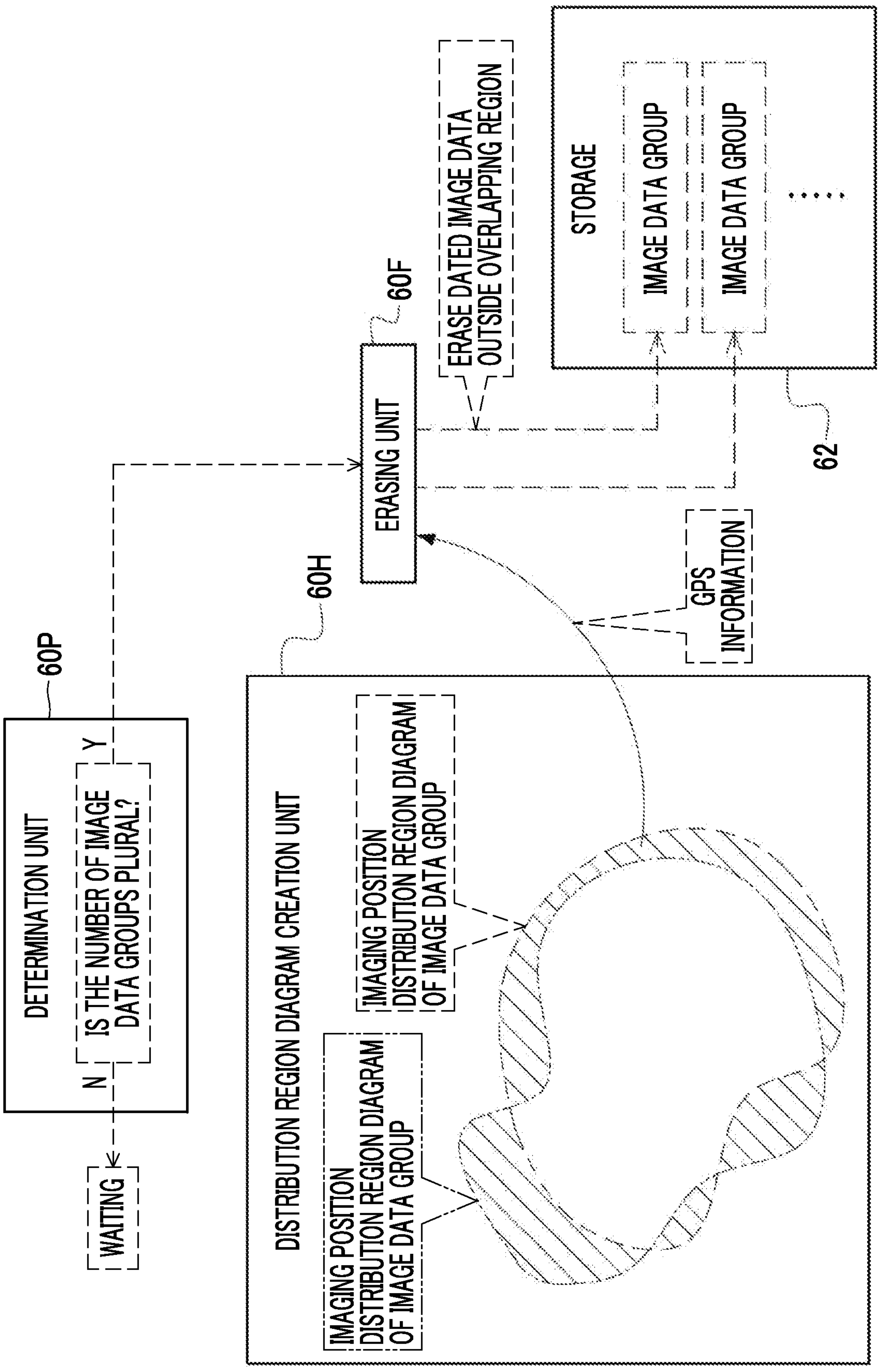
FIG. 21 is a block diagram showing an example of a process content in a case in which the CPU of the server provided in the information processing system according to the first embodiment is operated as the distribution region diagram creation unit, the determination unit, and the erasing unit.

As an example, as shown in FIG. 21, in a case in which the number of image data groups stored in the storage 62 is not plural, the determination unit 60P waits for the arrival of the next determination timing. On the other hand, in a case in which the determination unit 60P determines that the number of image data groups stored in the storage 62 is plural, the erasing unit 60F acquires the GPS information outside the overlapping region between the image data groups stored in the storage 62 from the distribution region diagram creation unit 60H. Moreover, the erasing unit 60F refers to the GPS information acquired from the distribution region diagram creation unit 60H, and erases the dated image data to which the GPS information outside the overlapping region is added, among the plurality of dated image data included in the image data group stored in the storage 62, from the dated image data which is the creation target of the image data list.

Figure 22:
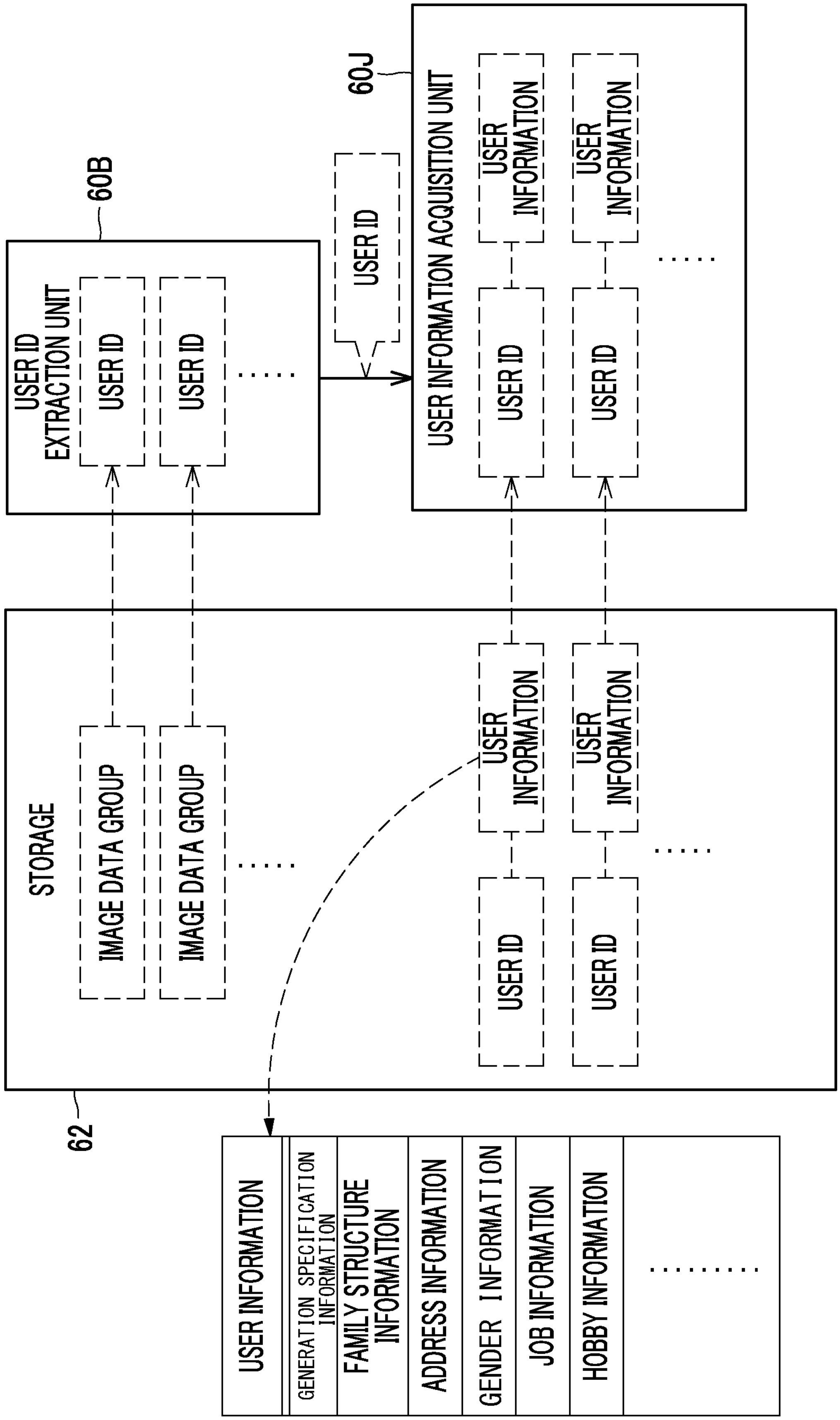
FIG. 22 is a block diagram showing an example of a process content in a case in which the CPU of the server provided in the information processing system according to the first embodiment is operated as the user ID extraction unit and a user information acquisition unit.

As an example, as shown in FIG. 22, the user information is associated with the registered user ID in the storage 62. The user information is information on the user 16 specified by the corresponding user ID. Examples of the user information include generation specification information, family structure information, address information, gender information, job information, and hobby information.

The generation specification information is information indicating a generation of the user 16. For example, in a case in which the birth of the user 16 is a year of 1975, the information "a year of 1970 to a year of 1980" is used as the generation specification information. The family structure information is information indicating a family structure of the user 16. Examples of the family structure information include information indicating married, unmarried, the number of older brothers, the number of younger brothers, the number of older sisters, the number of younger sisters, an age difference between siblings, and/or the age of parents. The address information is information indicating an address of the user 16. Examples of the address information include information indicating a country name, an administrative division name, and/or a city/town/village name. The gender information is information indicating the gender of the user 16. Examples of the gender information include information indicating man and woman The job information is information indicating a job of the user 16. Examples of the job information include information indicating a sales position, a technical position, a teaching position, an unemployed person, and/or a housewife. The hobby information is information indicating a hobby of the user 16. Examples of the hobby information include preferring to be out doors, preferring to be in doors, golf, soccer, baseball, fishing, watching movies, reading books, and/or an Internet game.

The user ID extraction unit 60B extracts the user ID from each image data group stored in the storage 62. The user information acquisition unit 60J acquires the user information corresponding to the user ID extracted by the user ID extraction unit 60B to associate the acquired user information with the corresponding user ID.

Figure 23:
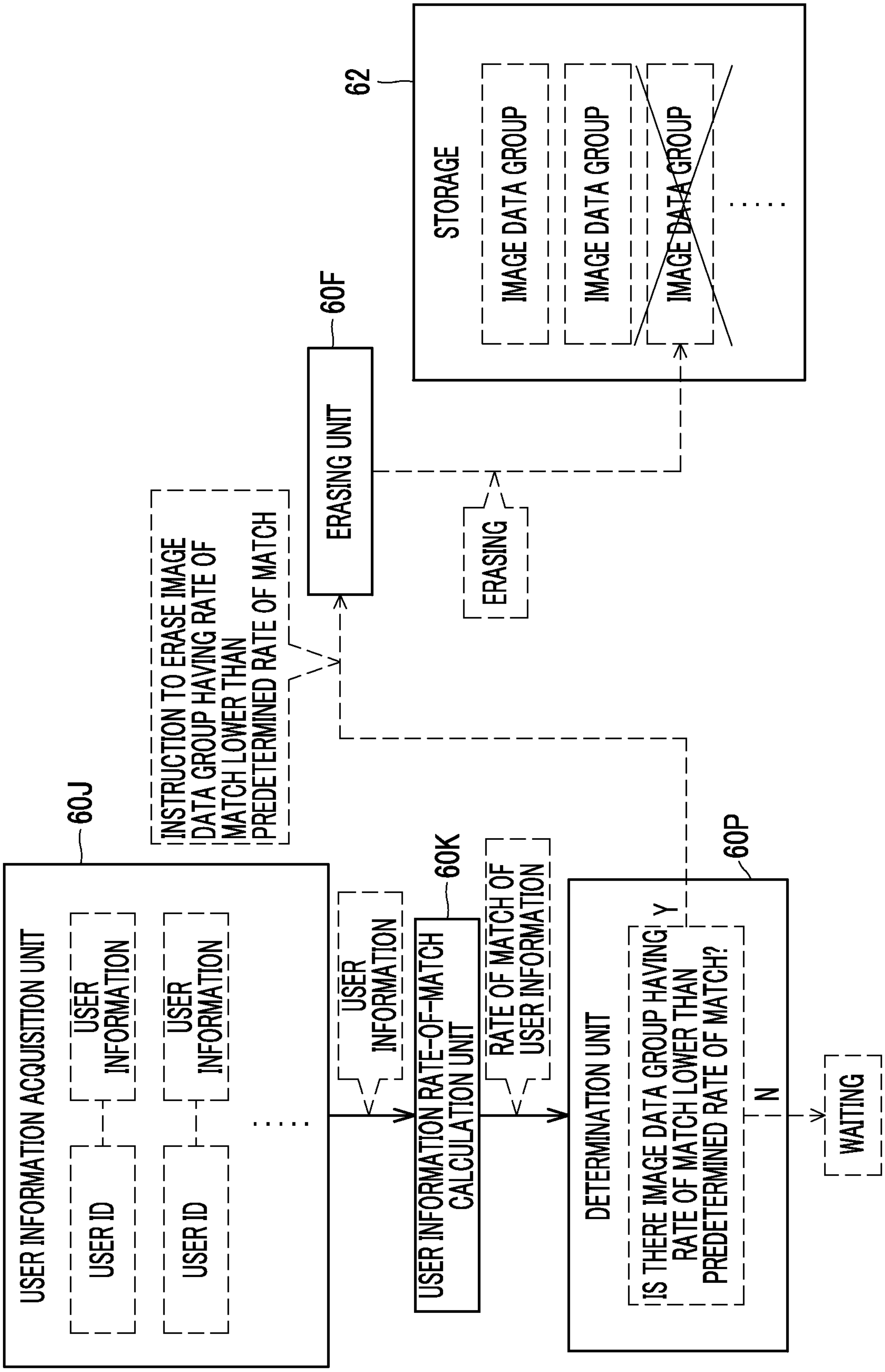
FIG. 23 is a block diagram showing an example of a process content in a case in which the CPU of the server provided in the information processing system according to the first embodiment is operated as the user information acquisition unit, a user information rate-of-match calculation unit, the determination unit, and the erasing unit.

As shown in FIG. 23 as an example, the user information rate-of-match calculation unit 60K acquires the user information for each user ID from the user information acquisition unit 60J, and calculates a rate of match of the user information between the user IDs (hereinafter, also referred to as "rate of match of the user information"). The determination unit 60P determines whether or not the image data group in which the rate of match of the user information between any user IDs is lower than a predetermined rate of match (for example, 5%) is stored in the storage 62. It should be noted that, here, a fixed value is adopted as the predetermined rate of match. It should be noted that this is merely an example, and the predetermined rate of match may be a variable value. Examples of the variable value include a value that can be changed in accordance with the instruction received by the reception device 54, and a value that is changed periodically.

In a case in which the image data group in which the rate of match of the user information between any user IDs is lower than the predetermined rate of match is not stored in the storage 62, the determination unit 60P waits for the arrival of the next determination timing. In a case in which the image data group in which the rate of match of the user information between any user IDs is lower than the predetermined rate of match is stored in the storage 62, the determination unit 60P instructs the erasing unit 60F to erase the image data group in which the rate of match of the user information is lower than the predetermined rate of match from the image data group which is the creation target of the image data list. Accordingly, the erasing unit 60F erases the image data group in which the rate of match of the user information is lower than the predetermined rate of match from the image data group which is the creation target of the image data list in the storage 62.

Figure 24:
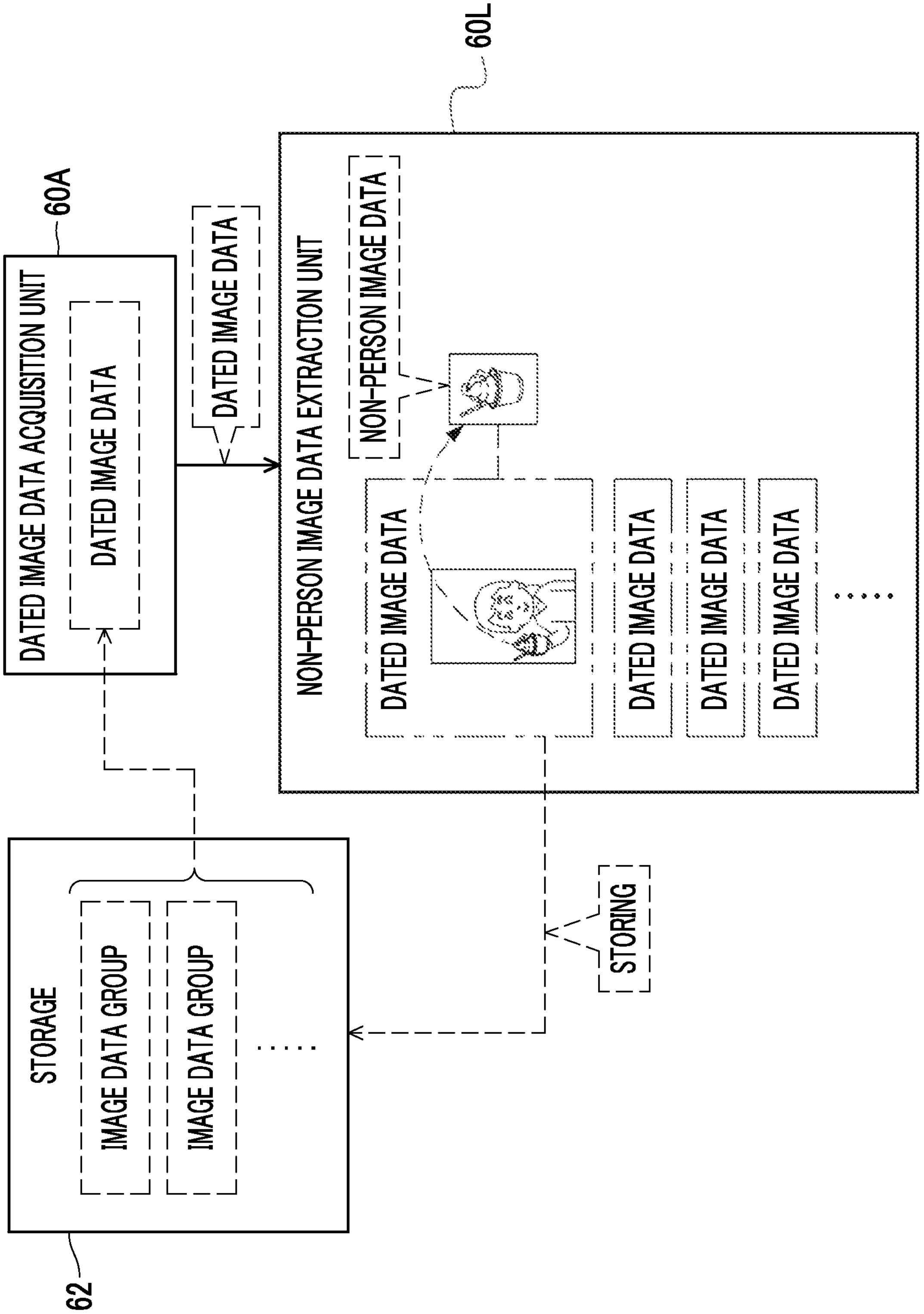
FIG. 24 is a block diagram showing an example of a process content in a case in which the CPU of the server provided in the information processing system according to the first embodiment is operated as the dated image data acquisition unit and a non-person image data extraction unit.

As an example, as shown in FIG. 24, the dated image data acquisition unit 60A acquires the dated image data from each image data group in the storage 62. The non-person image data extraction unit 60L extracts non-person image data indicating the non-person object from the dated image data by executing an image recognition process with respect to the dated image data acquired by the dated image data acquisition unit 60A, and associates the extracted non-person image data with the dated image data which is the extraction source. Moreover, the non-person image data extraction unit 60L stores the dated image data associated with the non-person image data in the storage 62 for each image data group to return the dated image data to the storage 62 for each image data group.

Here, the non-person object refers to an object other than a person of which the aspect of the temporal change can be visually specified. Here, examples of the aspect of the temporal change include an aspect of an object that symbolizes the times. Examples of the object that symbolizes the times include a building, a road, a street, a signboard, a poster, and a food.

Figure 25:
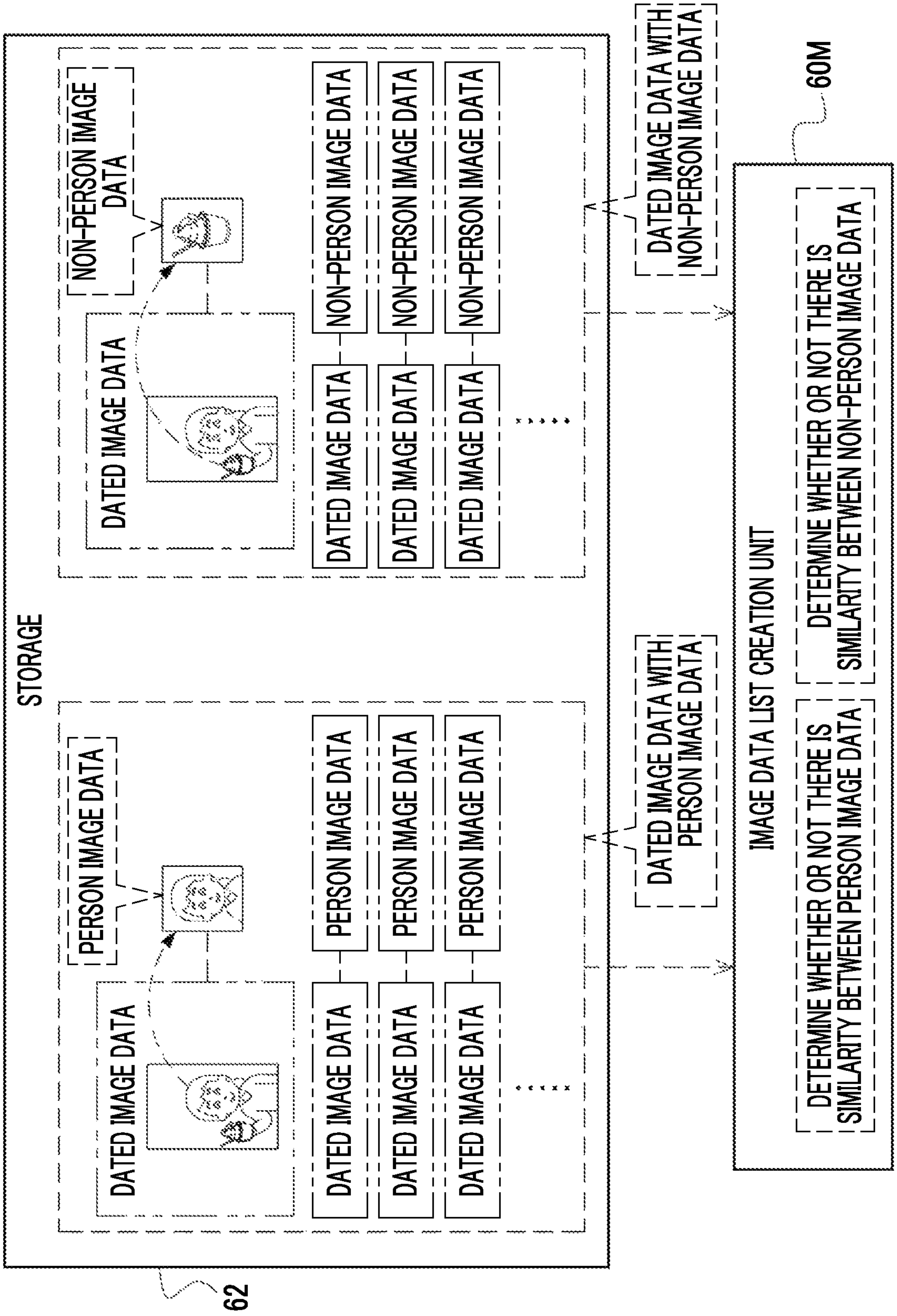
FIG. 25 is a block diagram showing an example of a process content in a case in which the CPU of the server provided in the information processing system according to the first embodiment is operated as an image data list creation unit.

As shown in FIG. 25 as an example, the image data list creation unit 60M acquires the dated image data associated with the person image data from the storage 62 (hereinafter, also referred to as "dated image data with the person image data"). In addition, the image data list creation unit 60M acquires the dated image data associated with the non-person image data from the storage 62 (hereinafter, also referred to as "dated image data with the non-person image data").

Moreover, the image data list creation unit 60M determines whether or not the person image data is similar between the dated image data with the person image data. In addition, the image data list creation unit 60M determines whether or not the non-person image data is similar between the dated image data with the non-person image data.

It should be noted that, in the example shown in FIG. 25, for convenience of description, only one person image data or non-person image data is associated with one dated image data, but the technology of the present disclosure is not limited to this. For example, an aspect may also be adopted in which at least one person image data and at least one non-person image data are associated with one dated image data.

Figure 26:
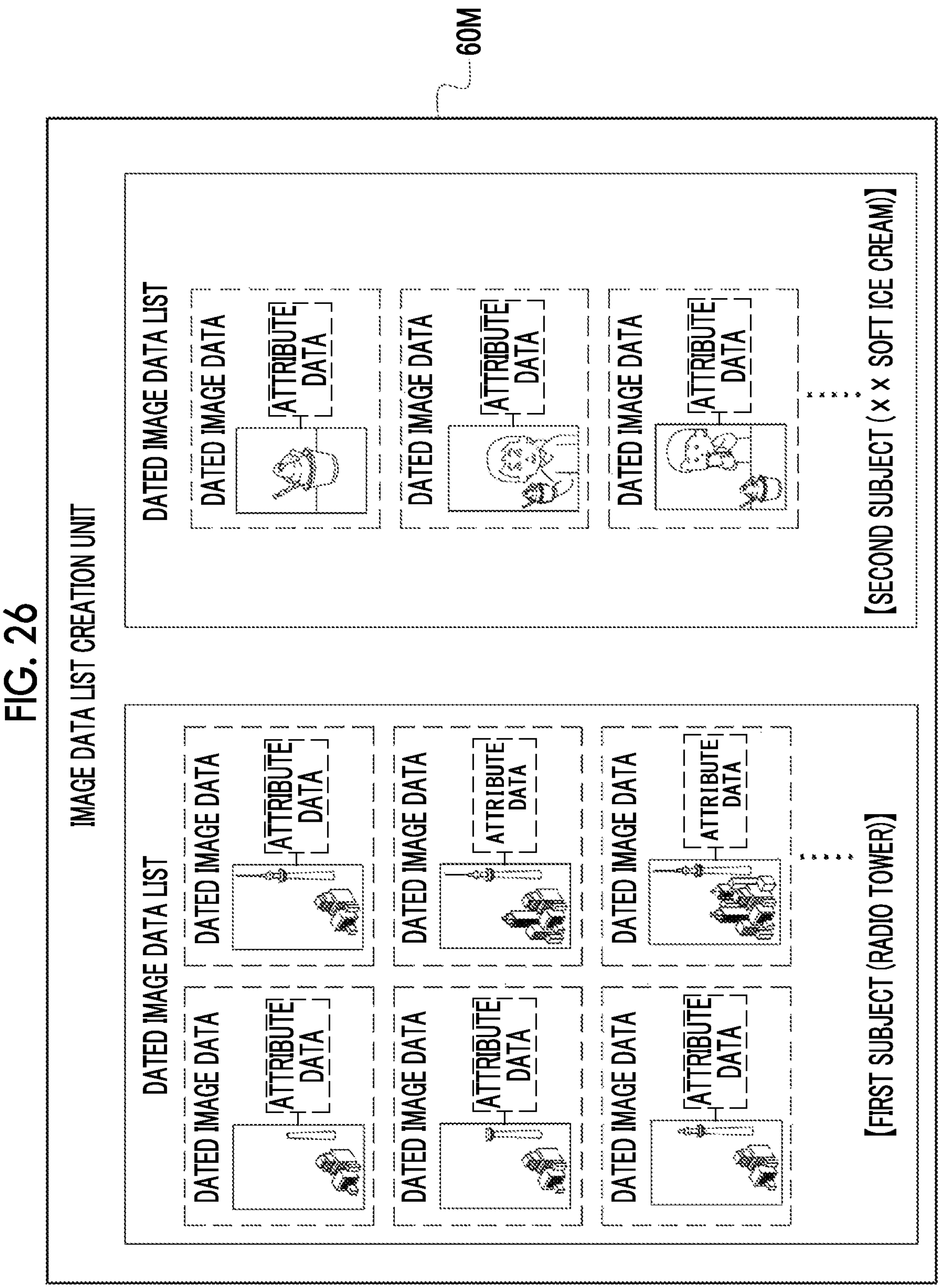
FIG. 26 is a conceptual diagram showing an example of first and second subject image data lists created by operating the CPU of the server provided in the information processing system according to the first embodiment as an image data list creation unit.
Figure 27:
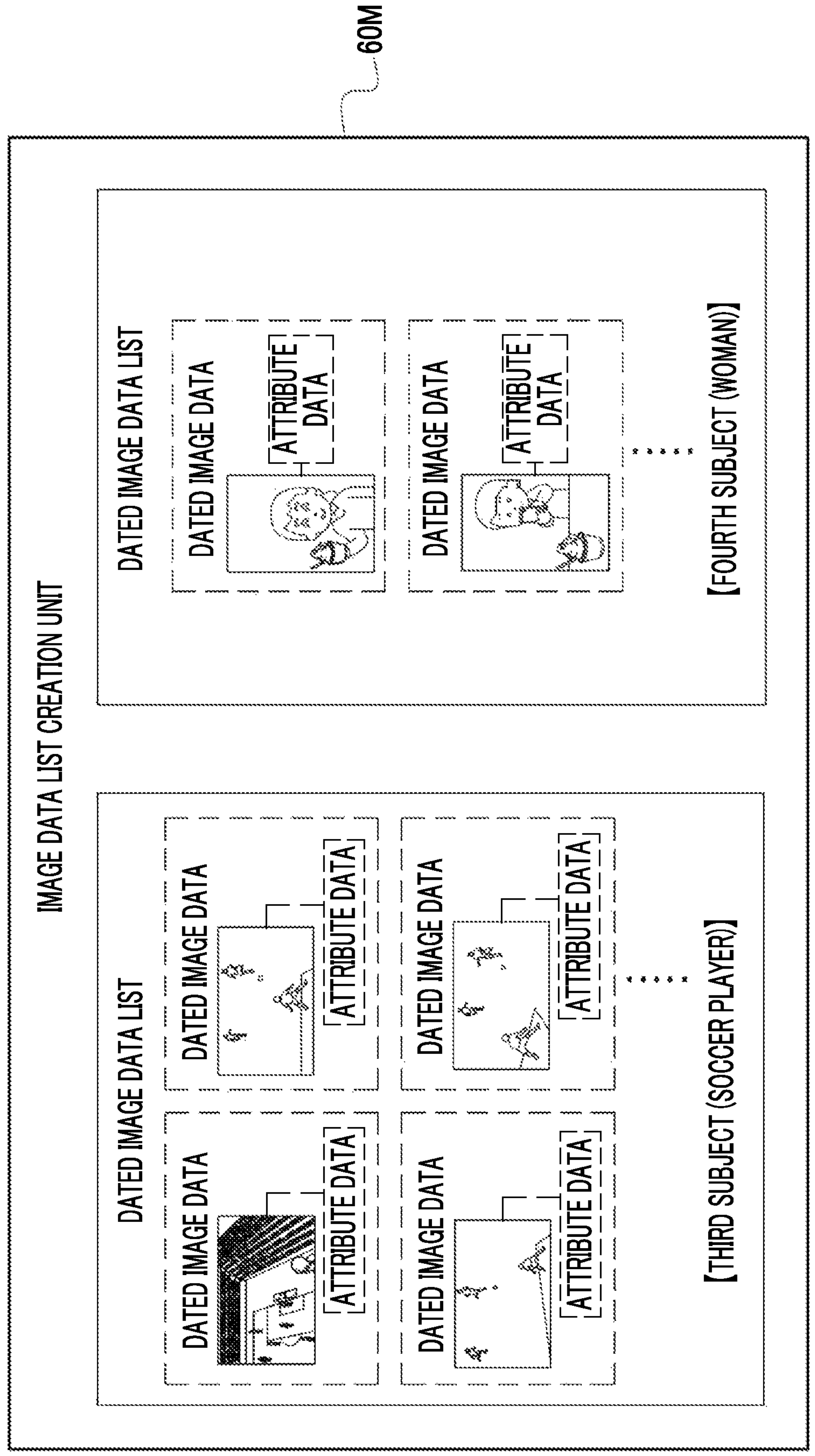
FIG. 27 is a conceptual diagram showing an example of third and fourth subject image data lists created by operating the CPU of the server provided in the information processing system according to the first embodiment as the image data list creation unit.
Figure 28:
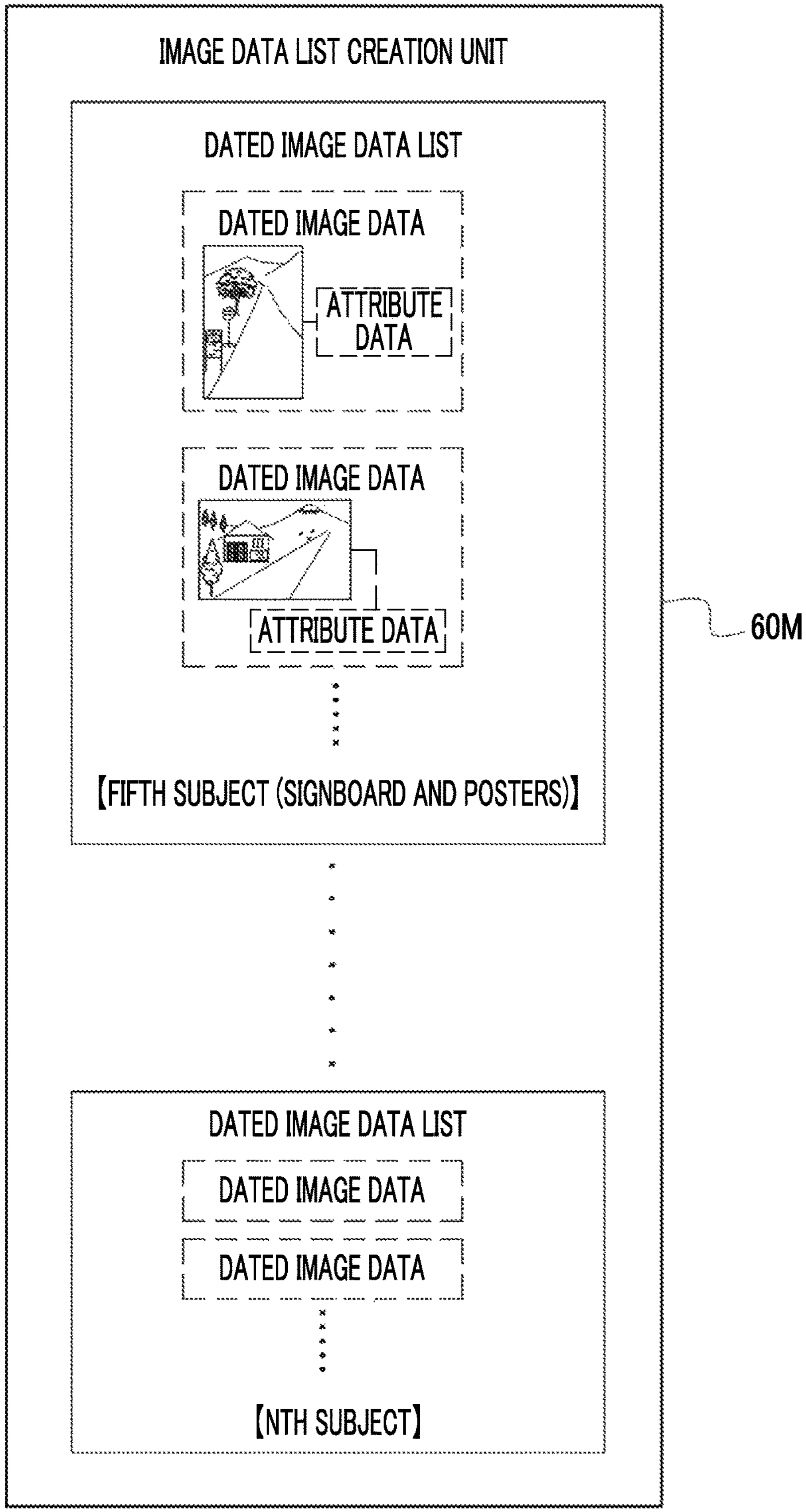
FIG. 28 is a conceptual diagram showing an example of fifth to Nth subject image data lists created by operating the CPU of the server provided in the information processing system according to the first embodiment as the image data list creation unit.

As an example, as shown in FIGS. 26 to 28, the image data list creation unit 60M creates the dated image data list for each subject by classifying the dated image data for each subject indicated by each of all the dated image data stored in the storage 62 as the creation target of the image data list. The dated image data which is the creation target of the image data list includes, for example, the dated image data associated with each of the plurality of users. In the examples shown in FIGS. 26 to 28, first to Nth subject image data lists are shown.

In the example shown in FIG. 26, the first subject image data list and the second subject image data list are shown. The first subject image data list is a dated image data list consisting of the plurality of dated image data in which a first subject is reflected. In addition, the first subject image data list is, for example, a list formed from the dated image data included in the plurality of image data groups A to D associated with the users 16A to 16D, respectively. The second subject image data list is a dated image data list consisting of the plurality of dated image data in which a second subject is reflected. In addition, the second subject image data list is, for example, a list formed from the dated image data included in the plurality of image data groups A and C associated with the users 16A and 16C, respectively. In the example shown in FIG. 26, a radio tower is shown as an example of the first subject, and "×× soft ice cream" is shown as an example of the second subject. The radio tower and the "×× soft ice cream" are the non-person objects. In addition, the radio tower is an example of the building described above, and "×× soft ice cream" is an example of the food described above.

In the example shown in FIG. 27, the third subject image data list and the fourth subject image data list are shown. The third subject image data list is a dated image data list consisting of the plurality of dated image data in which a third subject is reflected. In addition, the third subject image data list is, for example, a list formed from the dated image data included in the plurality of image data groups A to C associated with the users 16A to 16C, respectively. The fourth subject image data list is a dated image data list consisting of the plurality of dated image data in which a fourth subject is reflected. In addition, the fourth subject image data list is, for example, a list formed from the dated image data included in the plurality of image data groups A and C associated with the users 16A and 16C, respectively. In the example shown in FIG. 27, a soccer player is shown as an example of the third subject, and a woman is shown as an example of the fourth subject. The soccer player and the woman are the persons.

In the example shown in FIG. 28, a fifth subject image data list is shown. The fifth subject image data list is a dated image data list consisting of the plurality of dated image data in which a fifth subject is reflected. In addition, the fifth subject image data list is, for example, a list formed from the dated image data included in the plurality of image data groups A and D associated with the users 16A and 16D, respectively. In the example shown in FIG. 28, the signboard and the posters are shown as an example of the fifth subject. The signboard and the posters are the non-person objects.

Figure 29:
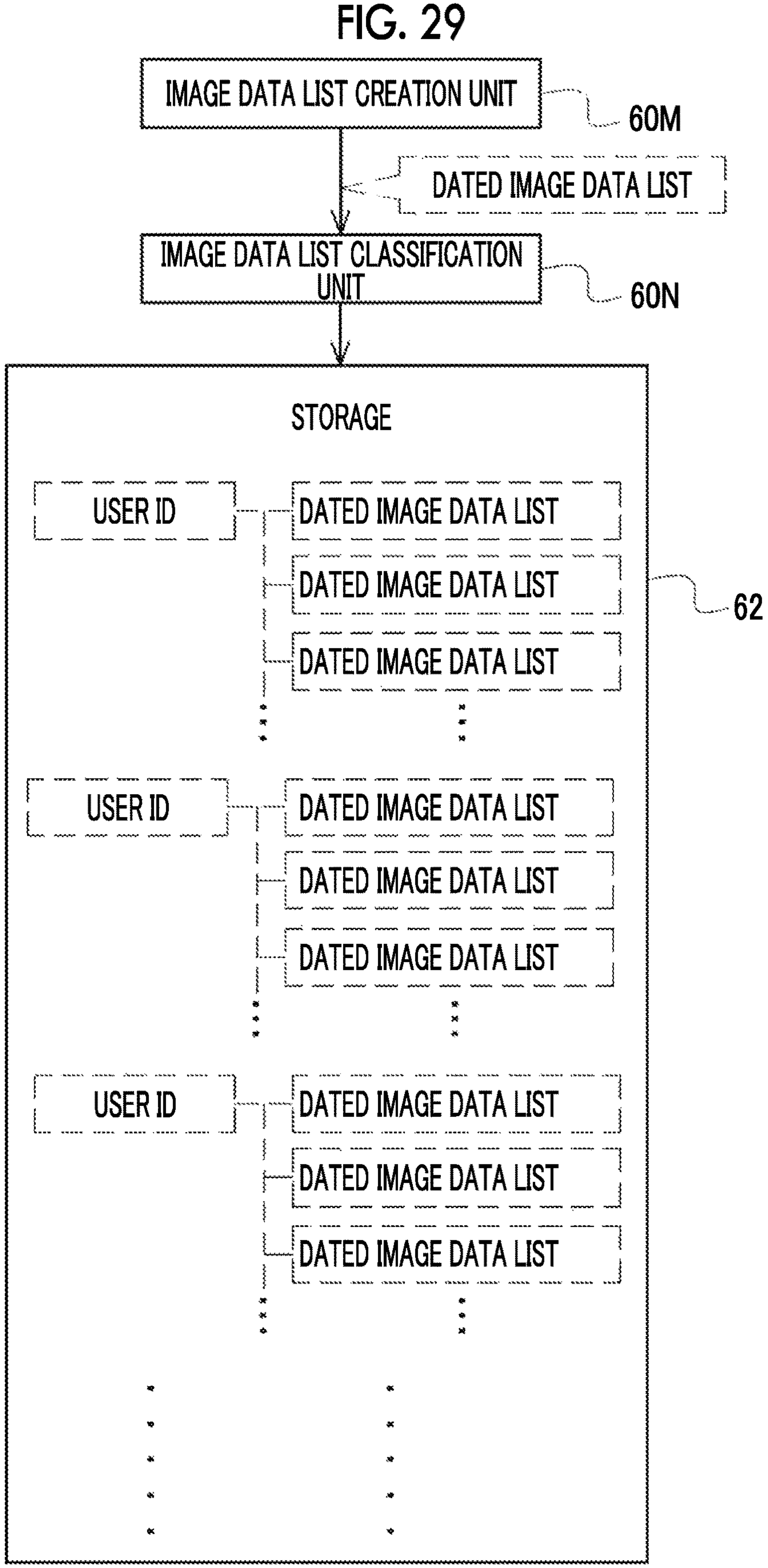
FIG. 29 is a block diagram showing an example of a process content in a case in which the CPU of the server provided in the information processing system according to the first embodiment is operated as the image data list creation unit and an image data list classification unit.

As an example, as shown in FIG. 29, the image data list classification unit 60N associates the dated image data list with each of the plurality of users 16 by classifying the dated image data list created by the image data list creation unit 60M for each user ID. In this case, first, the image data list classification unit 60N extracts the user ID from each of the plurality of dated image data included in the dated image data list. Moreover, the image data list classification unit 60N associates the dated image data list including the dated image data, which is the extraction source of the user ID, with the user ID that matches the extracted user ID among the plurality of user IDs stored in the storage 62.

By associating the dated image data list with each of the plurality of user IDs in the storage 62 in this way, as shown in FIGS. 30 to 33 as an example, the dated image data list is associated with each of the plurality of users 16.

Figure 30:
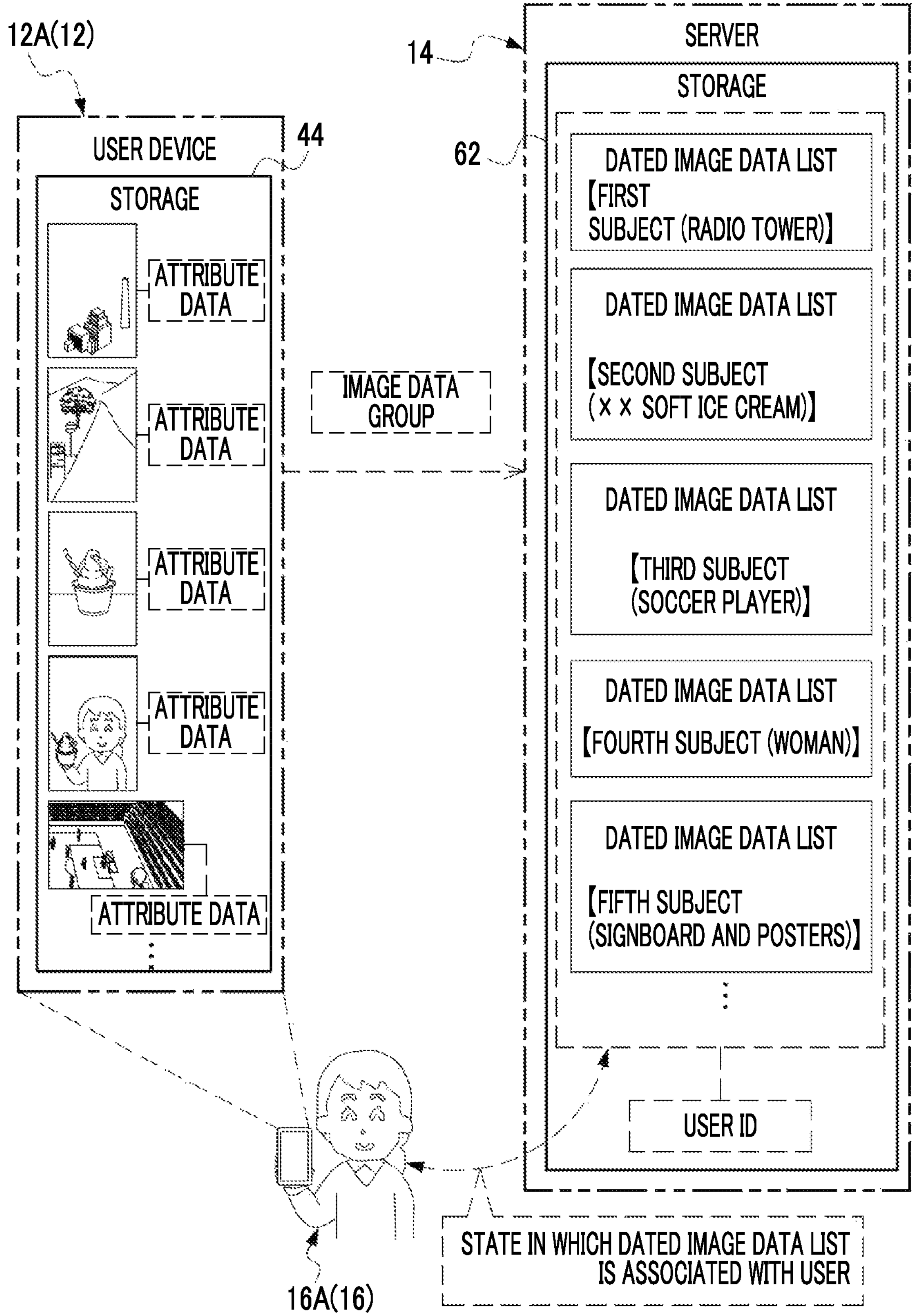
FIG. 30 is a conceptual diagram showing an example of a state in which a first user and a dated image data list are associated with each other by executing the dated image data list creation process by the CPU of the server provided in the information processing system according to the first embodiment.

In the example shown in FIG. 30, a state is shown in which the first to fifth subject image data lists are associated with the user 16A. The image data group uploaded from the user device 12A allocated to the user 16A to the server 14 includes the dated image data in which the subject similar to the first to fifth subjects is reflected. Therefore, the image data list classification unit 60N associates the first to fifth subject image data lists relating to the first to fifth subjects with the user 16A.

Figure 31:
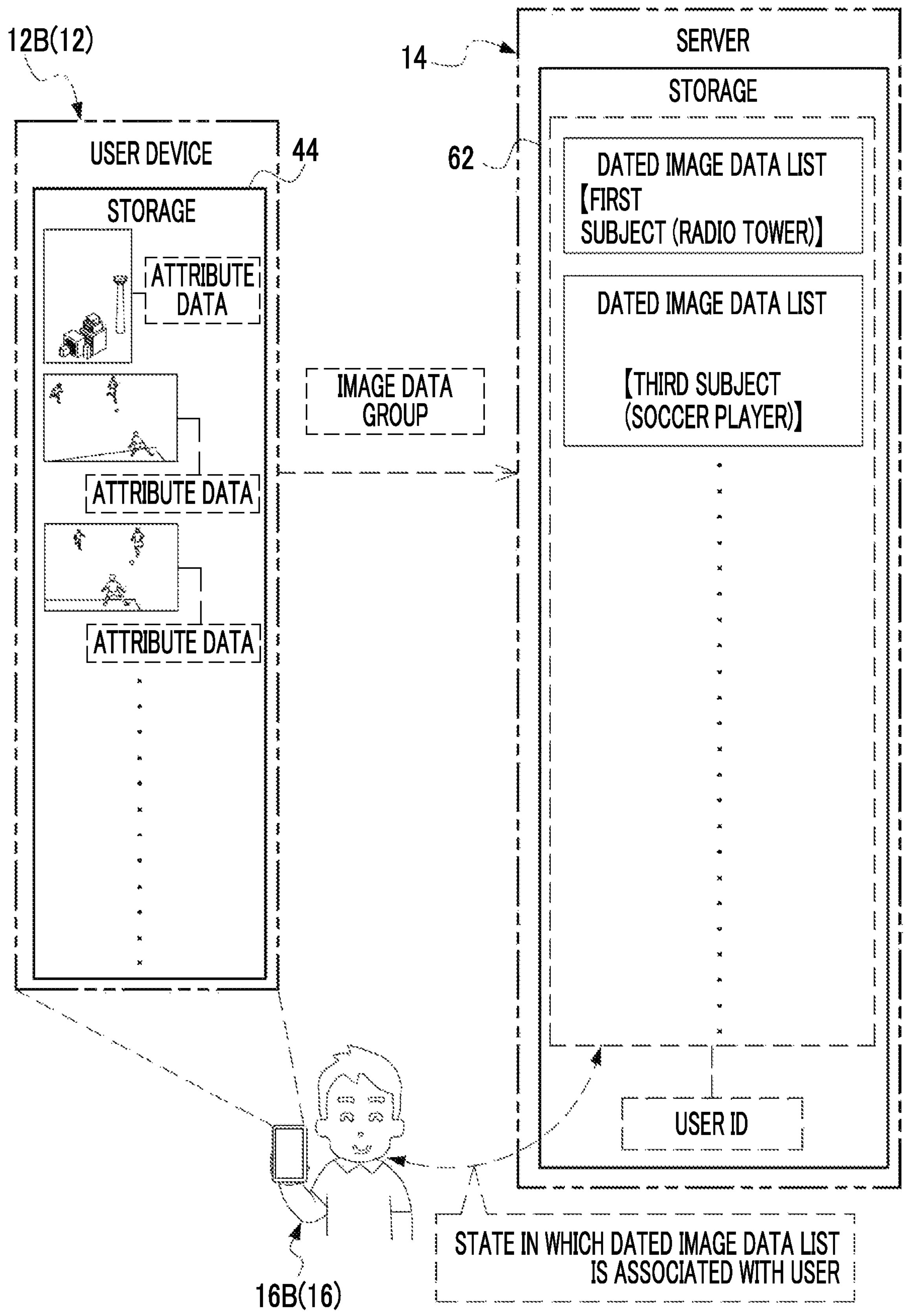
FIG. 31 is a conceptual diagram showing an example of a state in which a second user and the dated image data list are associated with each other by executing the dated image data list creation process by the CPU of the server provided in the information processing system according to the first embodiment.

In the example shown in FIG. 31, a state is shown in which the first subject image data list and the third subject image data list are associated with the user 16B. The image data group uploaded from the user device 12B allocated to the user 16B to the server 14 includes the dated image data in which the subject similar to the first and third subjects is reflected. Therefore, the image data list classification unit 60N associates the first subject image data list and the third subject image data list which relate to the first and third subjects with the user 16B.

Figure 32:
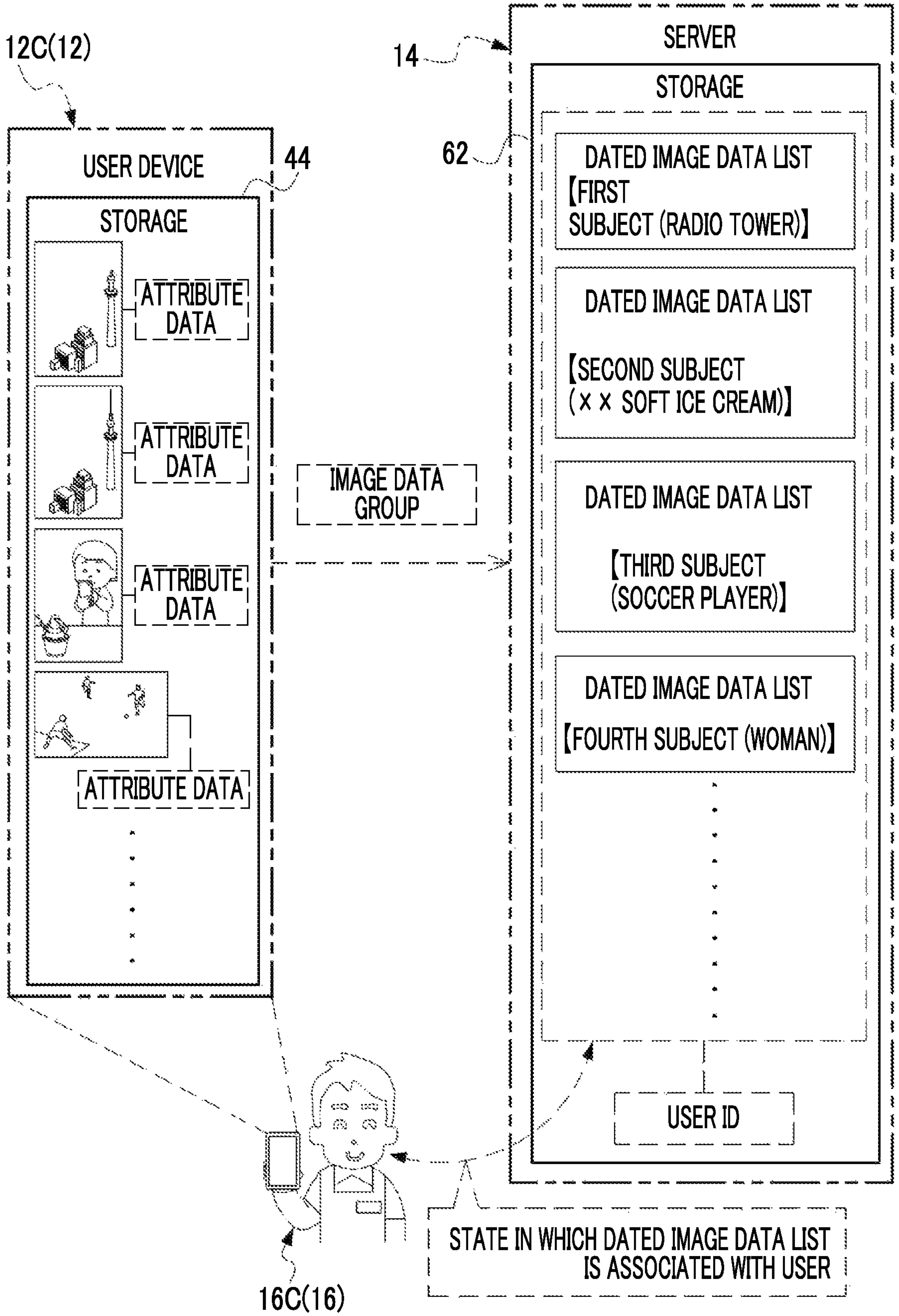
FIG. 32 is a conceptual diagram showing an example of a state in which a third user and the dated image data list are associated with each other by executing the dated image data list creation process by the CPU of the server provided in the information processing system according to the first embodiment.

In the example shown in FIG. 32, a state is shown in which the first to fourth subject image data lists are associated with the user 16C. The image data group uploaded from the user device 12C allocated to the user 16C to the server 14 includes the dated image data in which the subject similar to the first to fourth subjects is reflected. Therefore, the image data list classification unit 60N associates the first to fourth subject image data lists relating to the first to fourth subjects with the user 16C.

Figure 33:
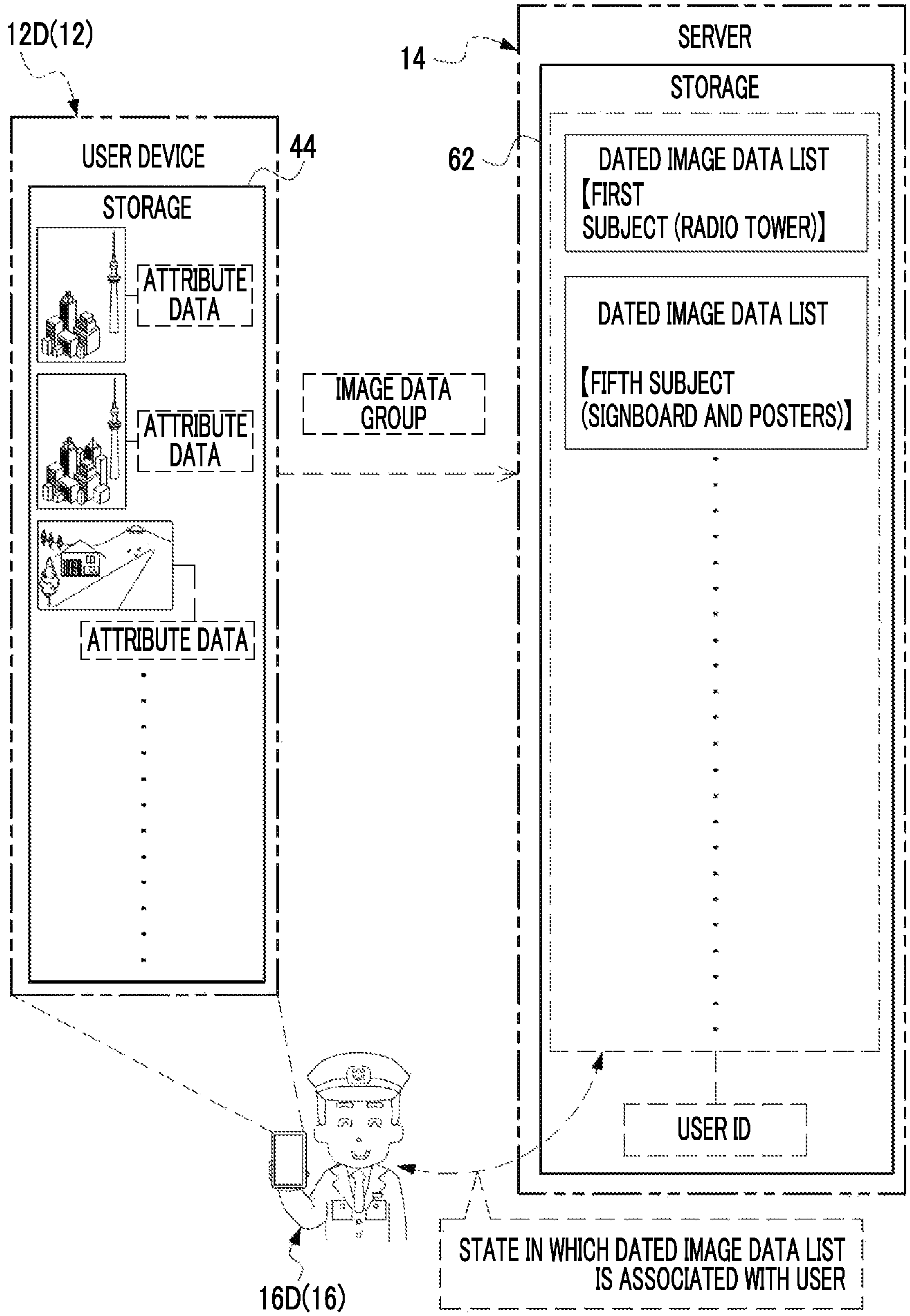
FIG. 33 is a conceptual diagram showing an example of a state in which a fourth user and the dated image data list are associated with each other by executing the dated image data list creation process by the CPU of the server provided in the information processing system according to the first embodiment.

In the example shown in FIG. 33, a state is shown in which the first subject image data list and the fifth subject image data list are associated with the user 16D. The image data group uploaded from the user device 12D allocated to the user 16D to the server 14 includes the dated image data in which the subject similar to the first and fifth subjects is reflected. Therefore, the image data list classification unit 60N associates the first subject image data list and the fifth subject image data list which relate to the first and fifth subjects with the user 16D.

Figure 34:
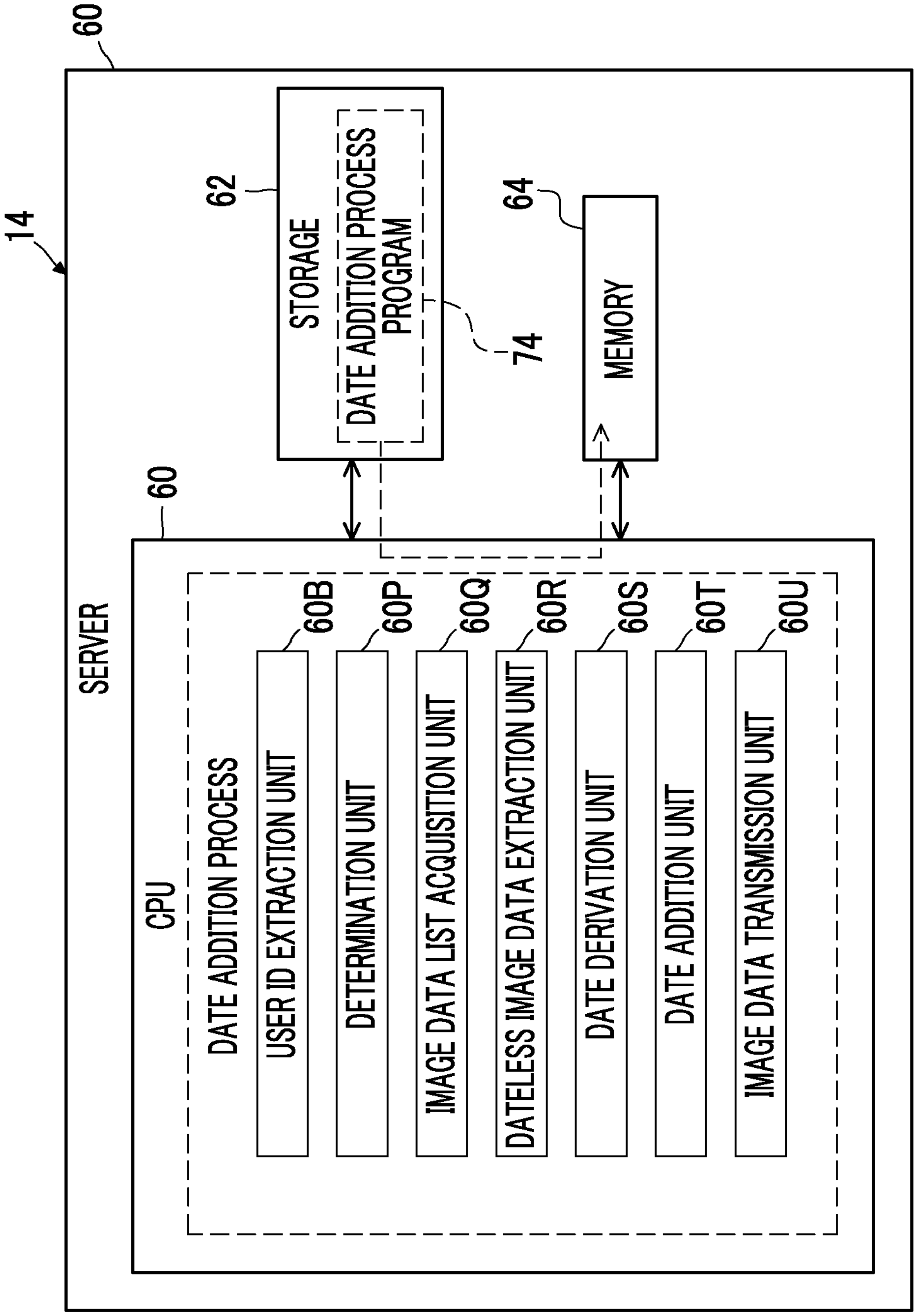
FIG. 34 is a block diagram showing an example of a main function of the CPU in a case in which a date addition process is executed by the CPU of the user device provided in the information processing system according to the first embodiment.

As shown in FIG. 34 as an example, a date addition process program 74 is stored in the storage 62. The CPU 60 reads out the date addition process program 74 from the storage 62. Moreover, the CPU 60 executes the date addition process program 74 read out from the storage 62 on the memory 64 to be operated as the user ID extraction unit 60B, the determination unit 60P, an image data list acquisition unit 60Q, a dateless image data extraction unit 60R, a date derivation unit 60S, a date addition unit 60T, and an image data transmission unit 60U. That is, the date addition process is realized by the CPU 60 being operated as the user ID extraction unit 60B, the determination unit 60P, the image data list acquisition unit 60Q, the dateless image data extraction unit 60R, the date derivation unit 60S, the date addition unit 60T, and the image data transmission unit 60U.

By executing the date addition process, the CPU 60 acquires the dated image data for the subject, which is similar to the subject indicated by the dateless image data of the specific user, from the dated image data list associated with the specific user. In addition, by executing the date addition process, the CPU 60 derives the date to be added to the dateless image data, based on the date added to the acquired dated image data, and adds the derived date to the dateless image data. In the following, a more detailed description will be made.

Figure 35:
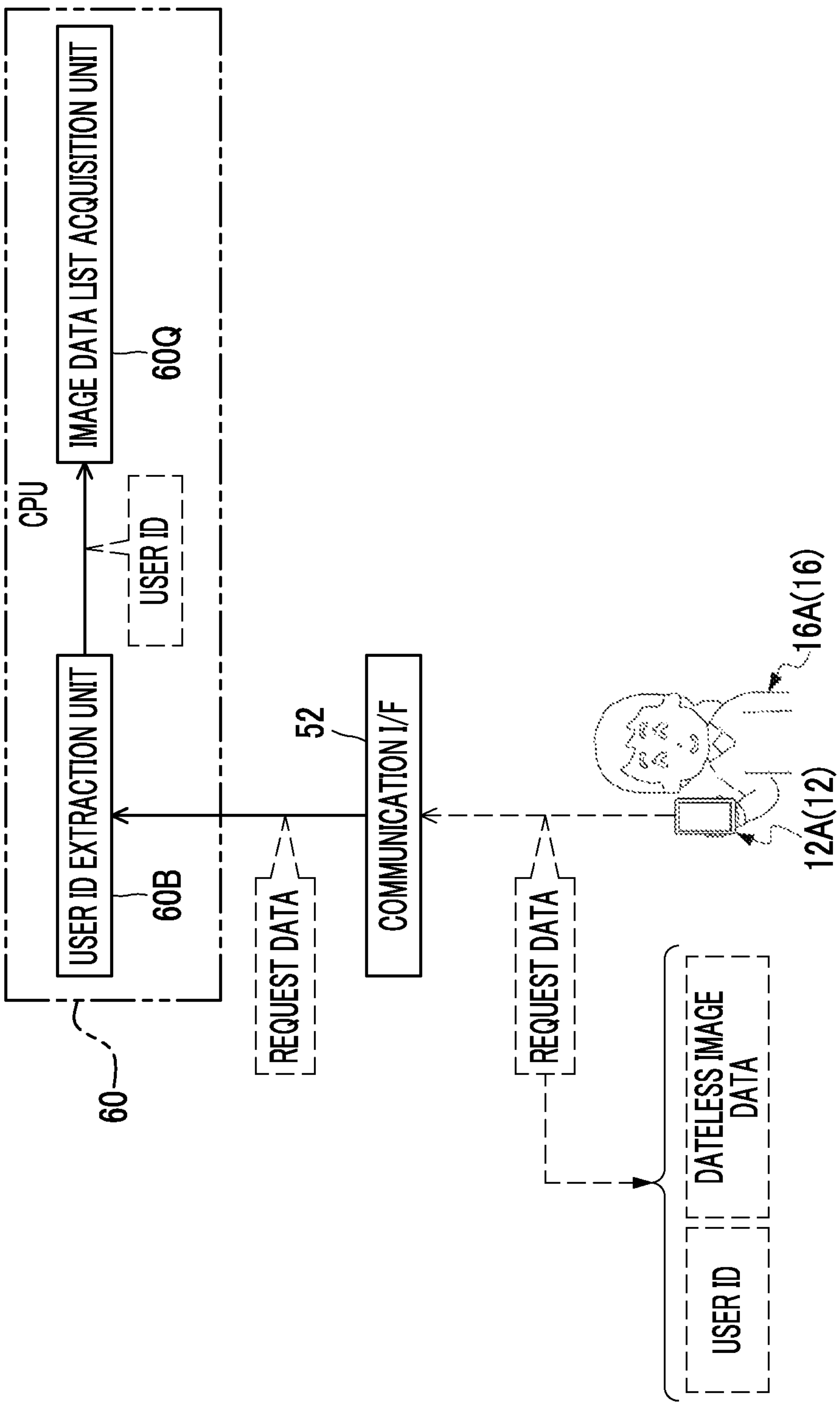
FIG. 35 is a block diagram showing an example of a process content in a case in which the CPU of the server provided in the information processing system according to the first embodiment is operated as the user ID extraction unit and an image data list acquisition unit.

As an example, as shown in FIG. 35, in a case in which the request data transmission unit 42G transmits the request data to the server 14 (see FIG. 10) by executing the date addition request process (see FIG. 9) by the CPU 42 of the user device 12, the request data is received by the communication I/F 52 of the server 14. The user ID extraction unit 60B extracts the user ID from the request data received by the communication I/F 52 to output the extracted user ID to the image data list acquisition unit 60Q.

Figure 36:
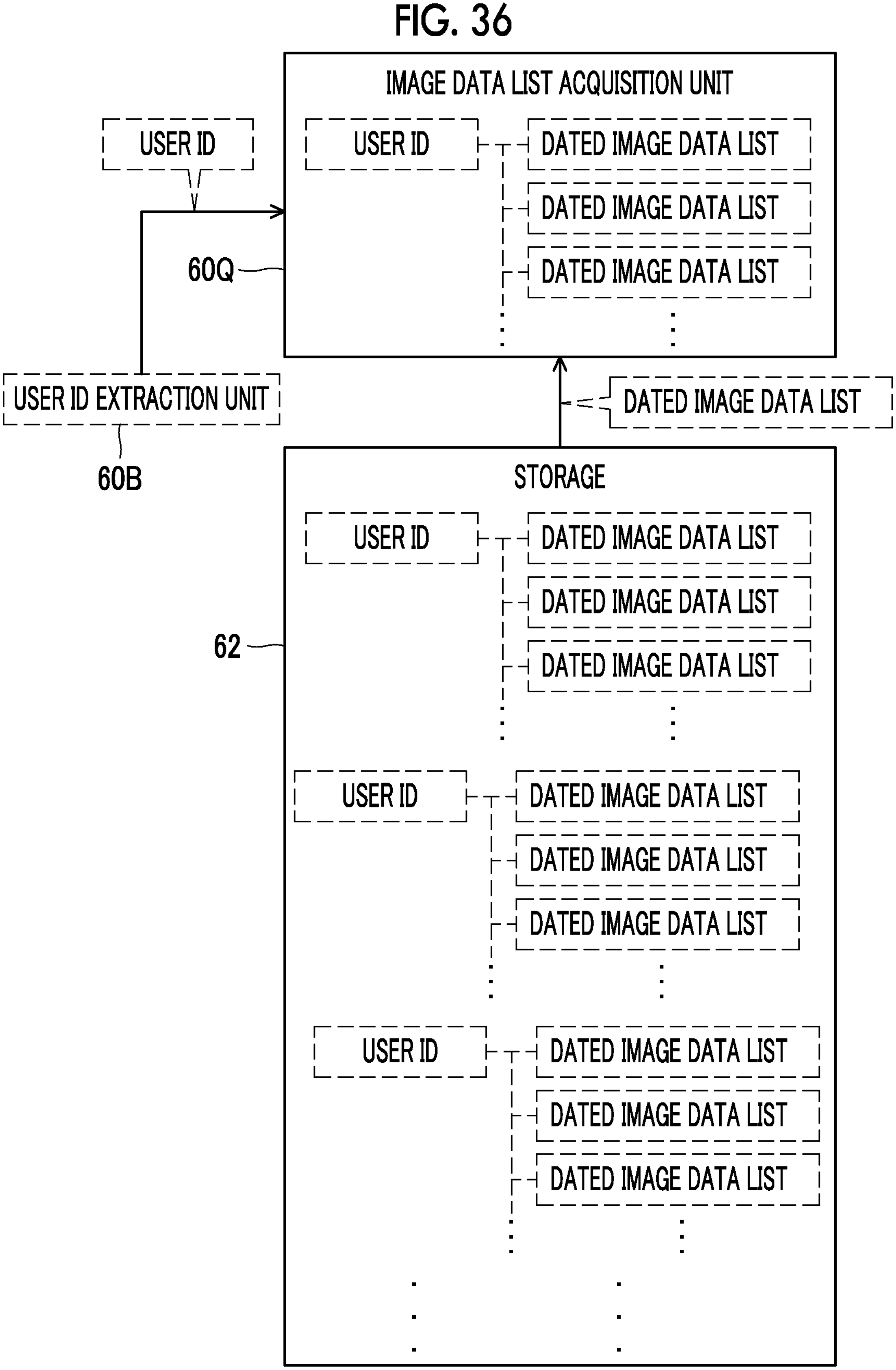
FIG. 36 is a block diagram showing an example of a process content in a case in which the CPU of the server provided in the information processing system according to the first embodiment is operated as the user ID extraction unit and the image data list acquisition unit.

As an example, as shown in FIG. 36, the image data list acquisition unit 60Q acquires the dated image data list corresponding to the user ID input from the user ID extraction unit 60B from the storage 62.

Figure 37:
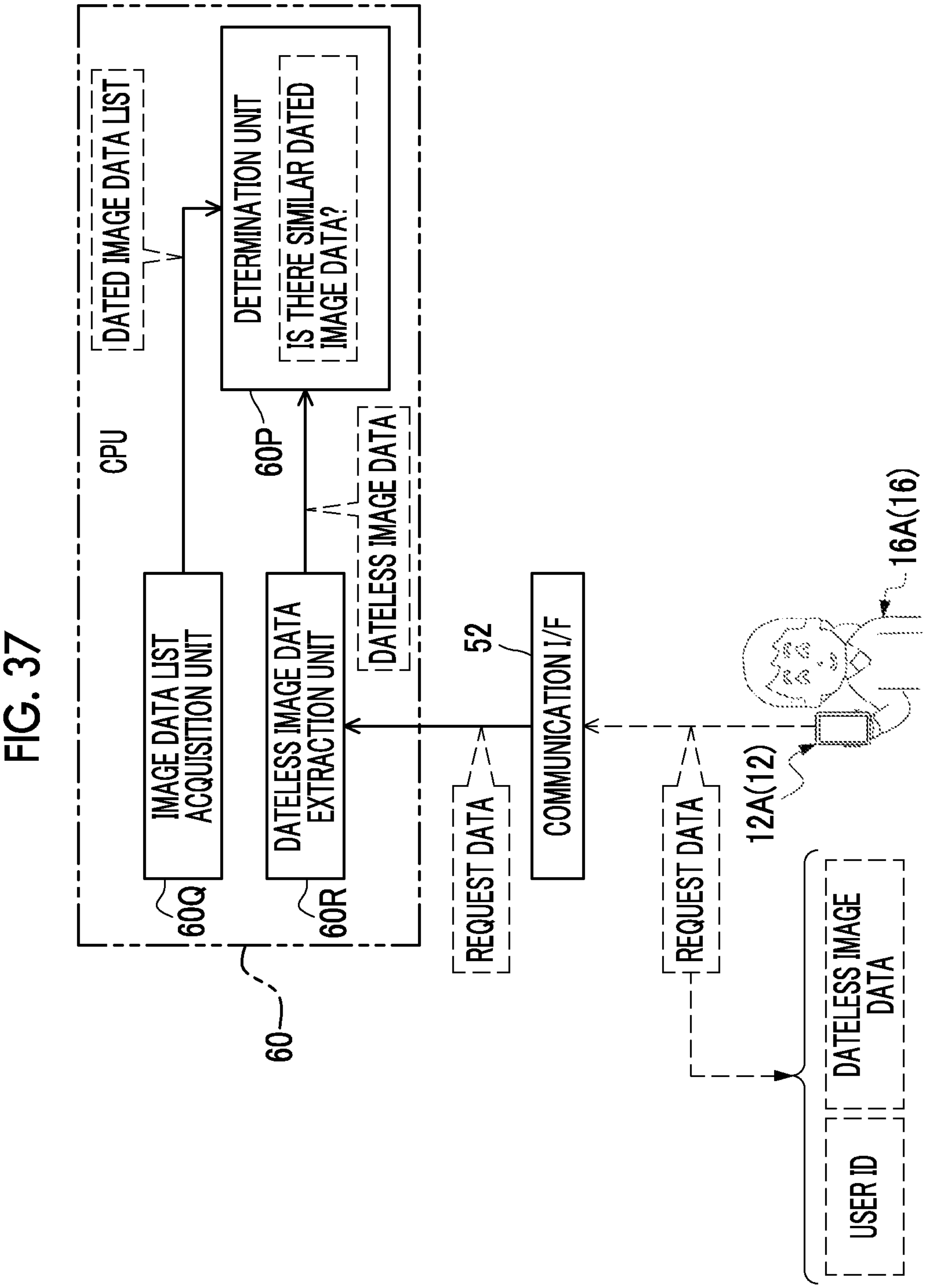
FIG. 37 is a block diagram showing an example of a process content in a case in which the CPU of the server provided in the information processing system according to the first embodiment is operated as the image data list acquisition unit, a dateless image data extraction unit, and the determination unit.

As an example, as shown in FIG. 37, the dateless image data extraction unit 60R extracts the dateless image data from the request data received by the communication I/F 52 to output the extracted dateless image data to the determination unit 60P. The determination unit 60P determines whether or not the dated image data list acquired by the image data list acquisition unit 60Q includes the dated image data similar to the dateless image data input from the dateless image data extraction unit 60R. Here, "similar" means the match within a range of a predetermined error. The predetermined error may be a fixed value, or may be a variable value.

Examples of the variable value include a value that can be changed in accordance with the instruction received by the reception device 54, a value that is changed in accordance with the number of frames of the dated image data included in the dated image data list, a value that is determined in accordance with a degree of variation (for example, dispersion or standard deviation) in the dates added to the dated image data included in the dated image data list, a value that is changed in accordance with the user 16 who provides the dateless image data, and/or a value that is changed periodically.

Figure 38:
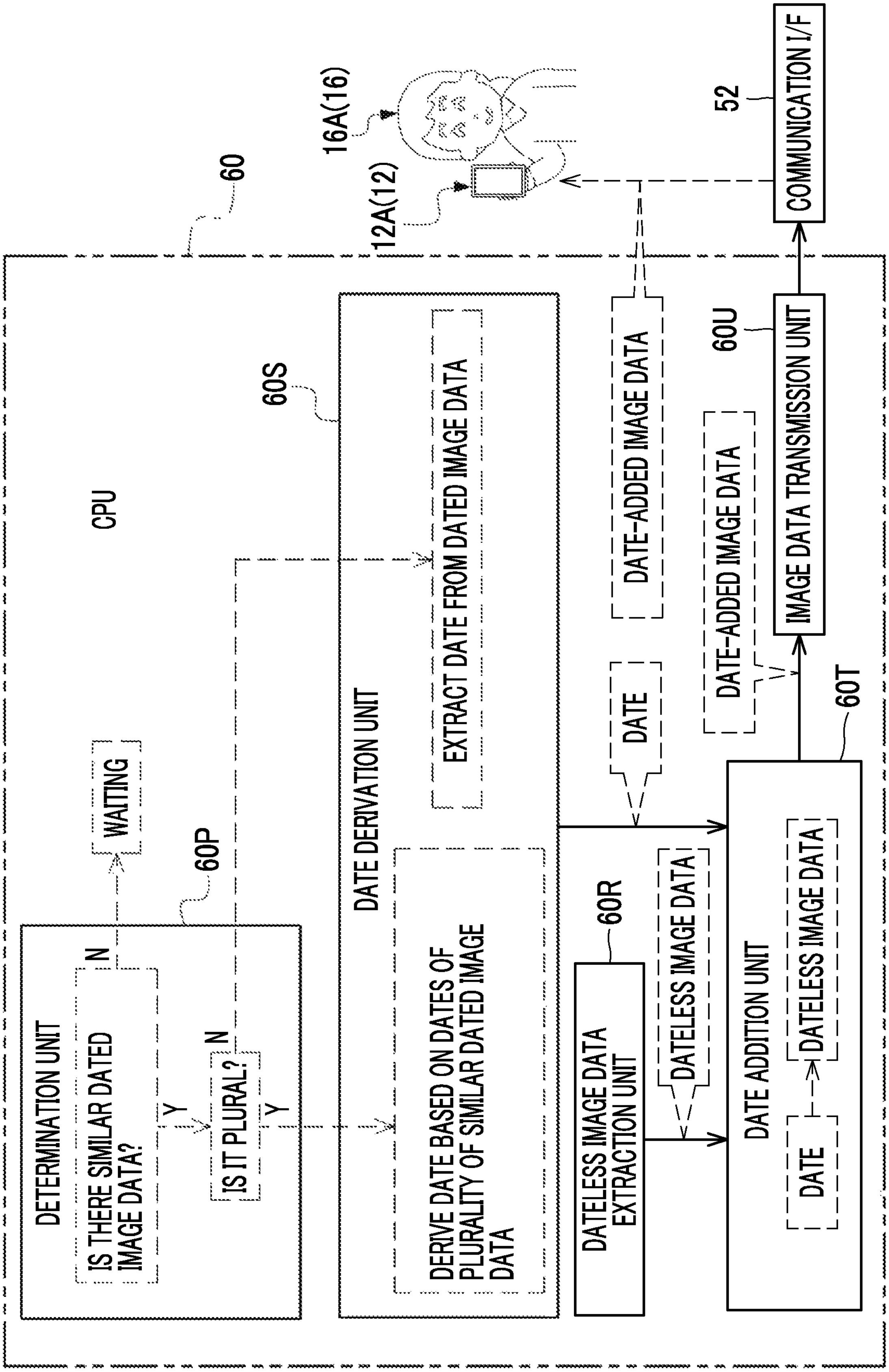
FIG. 38 is a block diagram showing an example of a process content in a case in which the CPU of the server provided in the information processing system according to the first embodiment is operated as the determination unit, a date derivation unit, the dateless image data extraction unit, a date addition unit, and an image data transmission unit.

As an example, as shown in FIG. 38, in a case in which it is determined that the dated image data list acquired by the image data list acquisition unit 60Q does not include the dated image data similar to the dateless image data input from the dateless image data extraction unit 60R, the determination unit 60P waits for the arrival of the next determination timing. On the other hand, in a case in which it is determined that the dated image data list acquired by the image data list acquisition unit 60Q includes the dated image data similar to the dateless image data input from the dateless image data extraction unit 60R, the determination unit 60P determines whether or not the dated image data similar to the dateless image data is the plurality of frames.

In a case in which the determination unit 60P determines that the dated image data similar to the dateless image data is not the plurality of frames, the date derivation unit 60S extracts the date from the dated image data which is the determination target, that is, the dated image data similar to the dateless image data. In a case in which the determination unit 60P determines that the dated image data similar to the dateless image data is the plurality of frames, the date derivation unit 60S extracts the date from each of the plurality of dated image data which are the determination target, that is, the plurality of dated image data similar to the dateless image data. Moreover, the date derivation unit 60S derives the date of the dateless image data based on the plurality of dates extracted from the plurality of dated image data, respectively. The date derived by the date derivation unit 60S may be only the year, month, and day, may be only the year and month, or may be only the year among the year, month, day, hour, minute, and second.

Here, the date derived by the date derivation unit 60S as the date of the dateless image data is, for example, a date based on an average value of the plurality of dates extracted from the plurality of dated image data, respectively. The date based on the average value of the plurality of dates refers to, for example, a date obtained by rounding off the average value of the plurality of dates.

It should be noted that, here, although the date based on the average value of the plurality of dates is described as an example, the technology of the present disclosure is not limited to this, and the date of the mode value or the median value among the plurality of dates may be used. In a case in which the date derived as the date of the dateless image data is the date of the mode value or the median value among the plurality of dates, the date of the mode value or the median value in a period with the highest date density among periods in which the plurality of dates are distributed may be used. In addition, the date of the dateless image data having the highest similarity degree to the dateless image data may be derived by the date derivation unit 60S as the date of the dateless image data.

The date derivation unit 60S outputs the date derived as the date of the dateless image data to the date addition unit 60T. The date addition unit 60T adds the date input from the date derivation unit 60S to the dateless image data extracted from the request data by the dateless image data extraction unit 60R, that is, the dateless image data compared with the dated image data by the determination unit 60P. As described above, by adding the date to the dateless image data, the date is added to the dateless image data. As described above, the date-added image data is generated by adding the date to the dateless image data by the date addition unit 60T.

The image data transmission unit 60U transmits the date-added image data generated by the date addition unit 60T to the user device 12A, which is the providing source of the request data, via the communication I/F 52. As a result, the date-added image data is provided to the user 16 to which the user device 12A, which is the providing source of the request data, is allocated.

Then, an action of the information processing system 10 will be described.

First, the dated image data list creation process executed by the CPU 60 of the server 14 will be described with reference to FIGS. 39A to 39E. It should be noted that the flows of the dated image data list creation process shown in FIGS. 39A to 39E are examples of an "information processing method" according to the technology of the present disclosure.

Figure 39A:
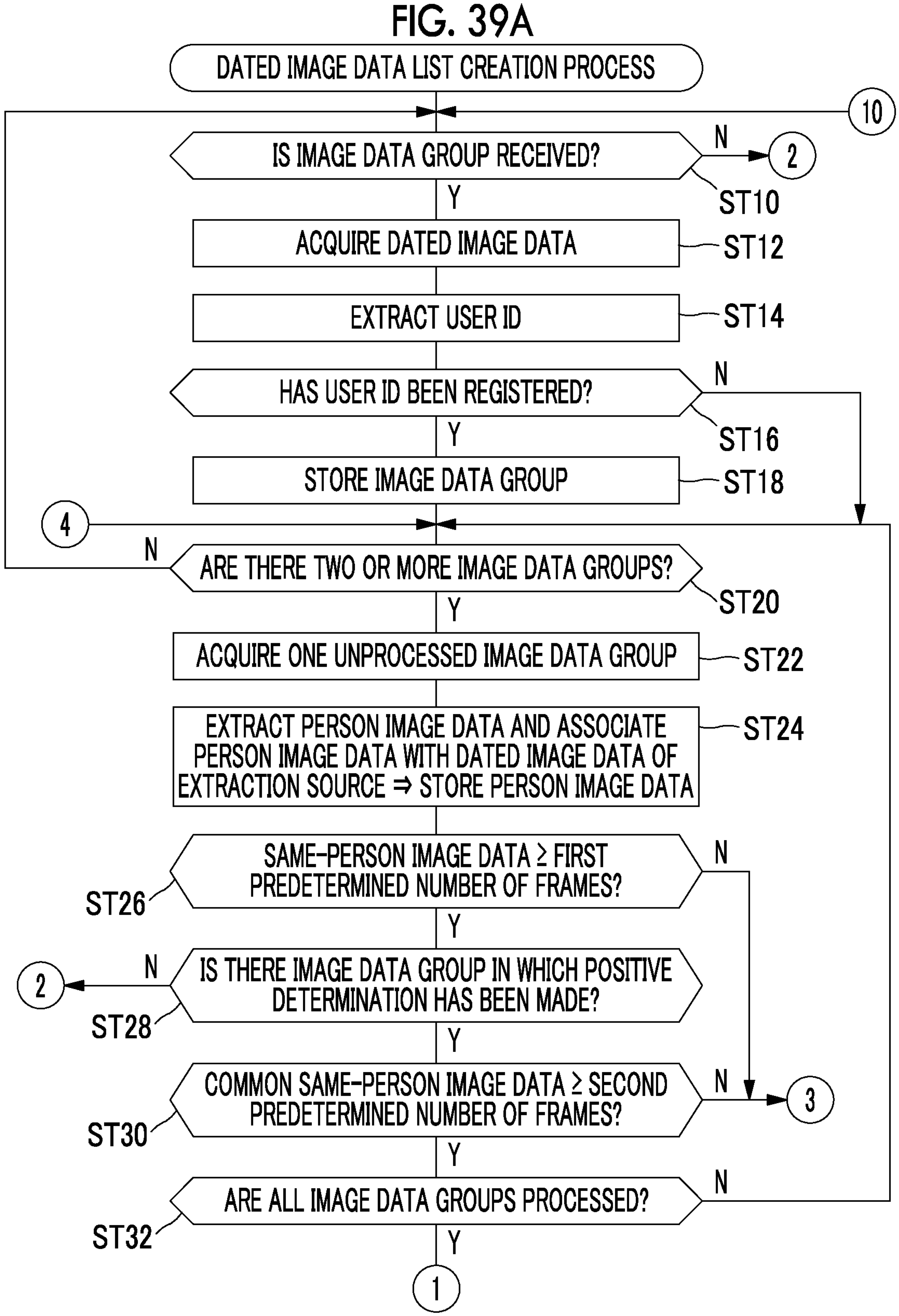
FIG. 39A is a flowchart showing an example of a flow of a dated image data list creation process according to the first embodiment.

In the dated image data list creation process shown in FIG. 39A, first, in step ST10, the determination unit 60P determines whether or not the image data group transmitted from the user device 12 is received by the communication I/F 52. In step ST10, in a case in which the image data group transmitted from the user device 12 is not received by the communication I/F 52, a negative determination is made, and the dated image data list creation process proceeds to step ST80 shown in FIG. 39E. In step ST10, in a case in which the image data group transmitted from the user device 12 is received by the communication I/F 52, a positive determination is made, and the dated image data list creation process proceeds to step ST12.

In step ST12, the dated image data acquisition unit 60A acquires the dated image data from the image data group received by the communication I/F 52, and then the dated image data list creation process proceeds to step ST14.

In step ST14, the user ID extraction unit 60B extracts the user ID from the dated image data acquired in step ST12, and then the dated image data list creation process proceeds to step ST16.

In step ST16, the determination unit 60P determines whether or not the user ID extracted in step ST14 has been registered. The determination of whether or not the user ID has been registered is made by determining whether or not the user ID is included in the registered user list in the storage 62. In step ST16, in a case in which the user ID extracted in step ST14 has not been registered, a negative determination is made, and the dated image data list creation process proceeds to step ST20. In step ST16, in a case in which the user ID extracted in step ST14 has been registered, a positive determination is made, and the dated image data list creation process proceeds to step ST18.

In step ST18, the storage control unit 60C stores the image data group used as an acquisition source of the dated image data in the storage 62 in step ST12, and then the dated image data list creation process proceeds to step ST20.

In step ST20, the determination unit 60P determines whether or not two or more image data groups are stored in the storage 62. In a case in which two or more image data groups are not stored in the storage 62 in step ST20, a negative determination is made, and the dated image data list creation process proceeds to step ST10. In a case in which two or more image data groups are stored in the storage 62 in step ST20, a positive determination is made, and the dated image data list creation process proceeds to step ST22.

In step ST22, the image data group acquisition unit 60D acquires one unprocessed image data group from the storage 62. In step ST22, the one unprocessed image data group refers to the image data group in which the processes of step ST24 to step ST30 have not yet been performed. The process of step ST22 is executed, and then the dated image data list creation process proceeds to step ST24.

In step ST24, the person image data extraction unit 60E extracts the person image data from each of the dated image data included in the image data group acquired in step ST22, and associates the extracted person image data with the dated image data which is the extraction source. Moreover, the person image data extraction unit 60E stores the dated image data associated with the person image data in the storage 62 for each image data group, thereby returning the dated image data to the storage 62. The process of step ST24 is executed, and then the dated image data list creation process proceeds to step ST26.

In step ST26, the determination unit 60P determines whether or not the number of frames of the same-person image data is equal to or larger than the first predetermined number of frames for the latest image data group stored in the storage 62 in step ST24. In step ST26, in a case in which the number of frames of the same-person image data is smaller than the first predetermined number of frames, a negative determination is made, and the dated image data list creation process proceeds to step ST34 shown in FIG. 39B. In step ST26, in a case in which the number of frames of the same-person image data is equal to or larger than the first predetermined number of frames, a positive determination is made, and the dated image data list creation process proceeds to step ST28.

In step ST28, the determination unit 60P determines whether or not the image data group for which a positive determination has been made is stored in the storage 62. Here, the image data group for which a positive determination has been made refers to the image data group for which a positive determination is made in step ST26. In step ST28, in a case in which the image data group for which a positive determination has been made is not stored in the storage 62, a negative determination is made, and the dated image data list creation process proceeds to step ST80 shown in FIG. 39E. In a case in which the image data group for which a positive determination has been made is stored in step ST28, a positive determination is made, and the dated image data list creation process proceeds to step ST30.

In step ST30, the determination unit 60P determines whether or not the same-person image data common to the image data group for which a positive determination has been made is included in the latest image data group for which a positive determination is made in step ST26 by the number equal to or larger than the second predetermined number of frames. In step ST30, in a case in which the same-person image data common to the image data group for which a positive determination has been made is not included in the latest image data group for which a positive determination is made in step ST26 by the number equal to or larger than the second predetermined number of frames, a negative determination is made, and the dated image data list creation process proceeds to step ST34 shown in FIG. 39B. In step ST30, in a case in which the same-person image data common to the image data group for which a positive determination has been made is included in the latest image data group for which a positive determination is made in step ST26 by the number equal to or larger than the second predetermined number of frames, a positive determination is made, and the dated image data list creation process proceeds to step ST32.

In step ST32, the determination unit 60P determines whether or not the processes of step ST24 to step ST30 are performed with respect to all the image data groups stored in the storage 62. In step ST32, in a case in which the processes of step ST24 to step ST30 are not performed for all the image data groups stored in the storage 62, a negative determination is made, and the dated image data list creation process proceeds to step ST20. In step ST32, in a case in which the processes of step ST24 to step ST30 are performed for all the image data groups stored in the storage 62, a positive determination is made, and the dated image data list creation process proceeds to step ST38 shown in FIG. 39C.

Figure 39B:
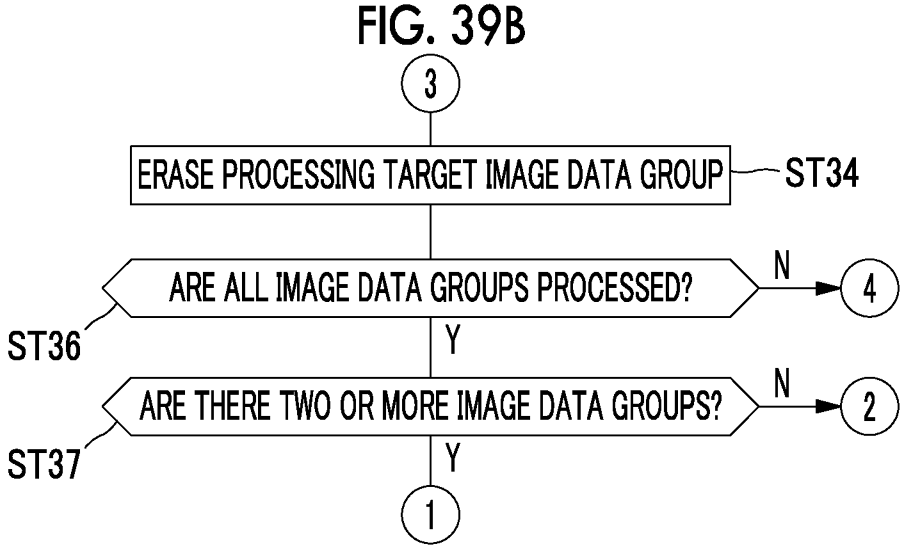
FIG. 39B is a continuation of the flowchart shown in FIG. 39A.

In step ST34 shown in FIG. 39B, the erasing unit 60F erases the processing target image data group from the storage 62, and then the dated image data list creation process proceeds to step ST36.

In this step ST34, the processing target image data group refers to the image data group determined by the determination unit 60P that the number of frames of the same-person image data is smaller than the first predetermined number of frames, and the latest image data group determined by the determination unit 60P that the same-person image data common to the image data group for which a positive determination has been made is not included by the number equal to or larger than the second predetermined number of frames.

The image data group erased by the erasing unit 60F in this step ST34 is the image data group that does not satisfy the condition determined in step ST26 or step ST30. This means that the image data group erased by the erasing unit 60F is the image data group that is not similar to the other image data groups stored in the storage 62. In addition, the image data group has a one-to-one correspondence with the registered user 16. Therefore, by erasing the image data group by the erasing unit 60F in this step ST34, the image data group provided by the registered user 16 satisfying the condition that the image data groups are similar to each other is narrowed down as a creation target candidate for the dated image data list.

In step ST36, the determination unit 60P determines whether or not the processes of step ST24 to step ST30 are performed with respect to all the image data groups stored in the storage 62. In step ST36, in a case in which the processes of step ST24 to step ST30 are not performed for all the image data groups stored in the storage 62, a negative determination is made, and the dated image data list creation process proceeds to step ST20. In step ST36, in a case in which the processes of step ST24 to step ST30 are performed for all the image data groups stored in the storage 62, a positive determination is made, and the dated image data list creation process proceeds to step ST37.

In step ST37, the determination unit 60P determines whether or not two or more image data groups are stored in the storage 62. In step ST37, in a case in which the two or more image data groups are not stored in the storage 62, a negative determination is made, and the dated image data list creation process proceeds to step ST80 shown in FIG. 39E. In step ST37, in a case in which the two or more image data groups are stored in the storage 62, a positive determination is made, and the dated image data list creation process proceeds to step ST38 shown in FIG. 39C.

Figure 39C:
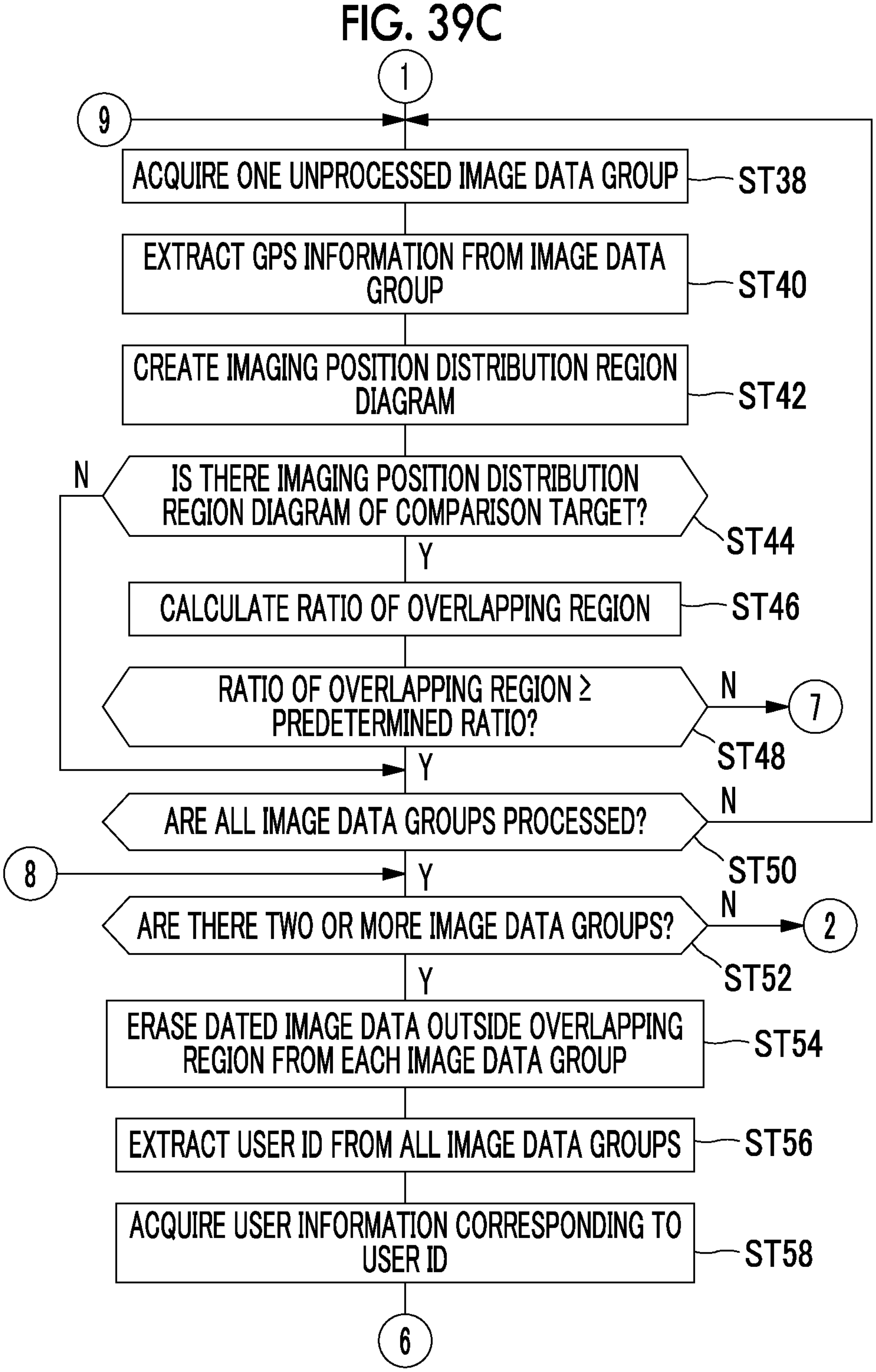
FIG. 39C is a continuation of the flowchart shown in FIGS. 39A and 39B.

In step ST38 shown in FIG. 39C, the image data group acquisition unit 60D acquires the one unprocessed image data group from the storage 62. In step ST38, the one unprocessed image data group refers to the image data group in which the processes of step ST40 to step ST46 have not yet been performed. The process of step ST38 is executed, and then the dated image data list creation process proceeds to step ST40.

In step ST40, the GPS information extraction unit 60G extracts the GPS information from the attribute data in the dated image data included in the image data group acquired in step ST38, and then the dated image data list creation process proceeds to step ST42.

In step ST42, the distribution region diagram creation unit 60H creates the imaging position distribution region diagram of the image data group based on the GPS information extracted in step ST40, and then the dated image data list creation process proceeds to step ST44.

In step ST44, the determination unit 60P determines whether or not the imaging position distribution region diagram which is a comparison target of the imaging position distribution region diagram created in step ST42, that is, another imaging position distribution region diagram is present. In step ST44, in a case in which the imaging position distribution region diagram which is a comparison target of the imaging position distribution region diagram created in step ST42 is not present, a negative determination is made, and the dated image data list creation process proceeds to step ST50. In step ST44, in a case in which the imaging position distribution region diagram which is a comparison target of the imaging position distribution region diagram created in step ST42 is present, a negative determination is made, and the dated image data list creation process proceeds to step ST46.

In step ST46, the overlapping region ratio calculation unit 60I calculates the ratio of the overlapping region between the imaging position distribution region diagram created in step ST42 and another imaging position distribution region diagram, and then the dated image data list creation process proceeds to step ST48. It should be noted that, here, the other imaging position distribution region diagram refers to all the imaging position distribution region diagrams (hereinafter, also referred to as "entire imaging position distribution region diagram") created prior to the existing imaging position distribution region diagram, that is, the imaging position distribution region diagram created in step ST42.

In step ST48, the determination unit 60P determines whether or not the ratio calculated for the entire imaging position distribution region diagram in step ST46 is equal to or larger than the predetermined ratio. In step ST48, in a case in which the ratio calculated for the entire imaging position distribution region diagram in step ST46 is not equal to or larger than the predetermined ratio, a negative determination is made, and the dated image data list creation process proceeds to step ST60 shown in FIG. 39D. In step ST48, in a case in which the ratio calculated for the entire imaging position distribution region diagram in step ST46 is equal to or larger than the predetermined ratio, a positive determination is made, and the dated image data list creation process proceeds to step ST50.

In step ST50, the determination unit 60P determines whether or not the processes of step ST40 to step ST48 are performed for all the image data groups stored in the storage 62. In step ST50, in a case in which the processes of step ST40 to step ST48 are not performed for all the image data groups stored in the storage 62, a negative determination is made, and the dated image data list creation process proceeds to step ST38. In step ST50, in a case in which the processes of step ST40 to step ST48 are performed for all the image data groups stored in the storage 62, a positive determination is made, and the dated image data list creation process proceeds to step ST52.

Figure 39D:
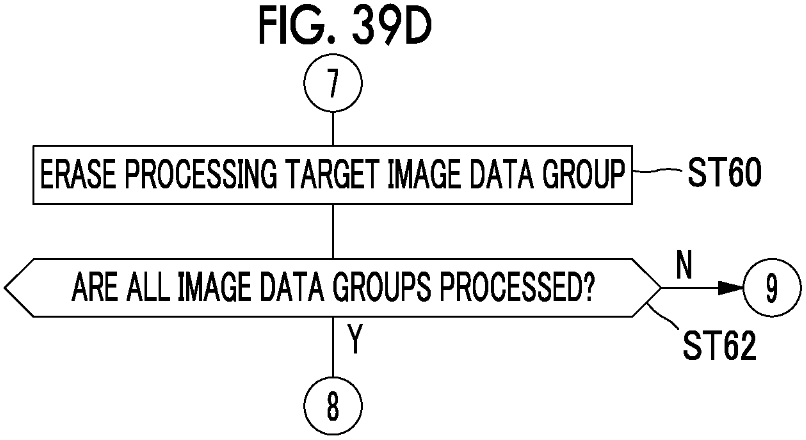
FIG. 39D is a continuation of the flowchart shown in FIG. 39C.

In step ST60 shown in FIG. 39D, the erasing unit 60F erases the processing target image data group from the storage 62, and then the dated image data list creation process proceeds to step ST62.

In this step ST60, the processing target image data group refers to the image data group determined by the determination unit 60P that the ratio calculated for the entire imaging position distribution region diagram is not equal to or larger than the predetermined ratio.

The image data group erased by the erasing unit 60F in this step ST60 is the image data group that does not satisfy the condition determined in step ST48. This means that the image data group erased by the erasing unit 60F is the image data group that is not similar to the other image data groups stored in the storage 62. In addition, the image data group has a one-to-one correspondence with the registered user 16. Therefore, by erasing the image data group by the erasing unit 60F in this step ST60, the image data group provided by the registered user 16 satisfying the condition that the image data groups are similar to each other (for example, geographical distributions of the imaging positions between the image data groups are similar to each other) is narrowed down as a creation target candidate for the dated image data list.

In step ST62, the determination unit 60P determines whether or not the processes of step ST40 to step ST48 are performed for all the image data groups stored in the storage 62. In step ST62, in a case in which the processes of step ST40 to step ST48 are not performed for all the image data groups stored in the storage 62, a negative determination is made, and the dated image data list creation process proceeds to step ST38 shown in FIG. 39C. In step ST62, in a case in which the processes of step ST40 to step ST48 are performed for all the image data groups stored in the storage 62, a positive determination is made, and the dated image data list creation process proceeds to step ST52 shown in FIG. 39C.

In step ST52 shown in FIG. 39C, the determination unit 60P determines whether or not two or more image data groups are stored in the storage 62. In step ST52, in a case in which the two or more image data groups are not stored in the storage 62, a negative determination is made, and the dated image data list creation process proceeds to step ST80 shown in FIG. 39E. In a case in which two or more image data groups are stored in the storage 62 in step ST52, a positive determination is made, and the dated image data list creation process proceeds to step ST54.

In step ST54, the erasing unit 60F erases the dated image data in which the imaging positions are distributed outside the overlapping region of the imaging position distribution region diagrams from the image data groups stored in the storage 62, and then the dated image data list creation process proceeds to step ST56.

In step ST56, the user ID extraction unit 60B extracts the user ID from all the image data groups stored in the storage 62, and then the dated image data list creation process proceeds to step ST58.

Figure 39E:
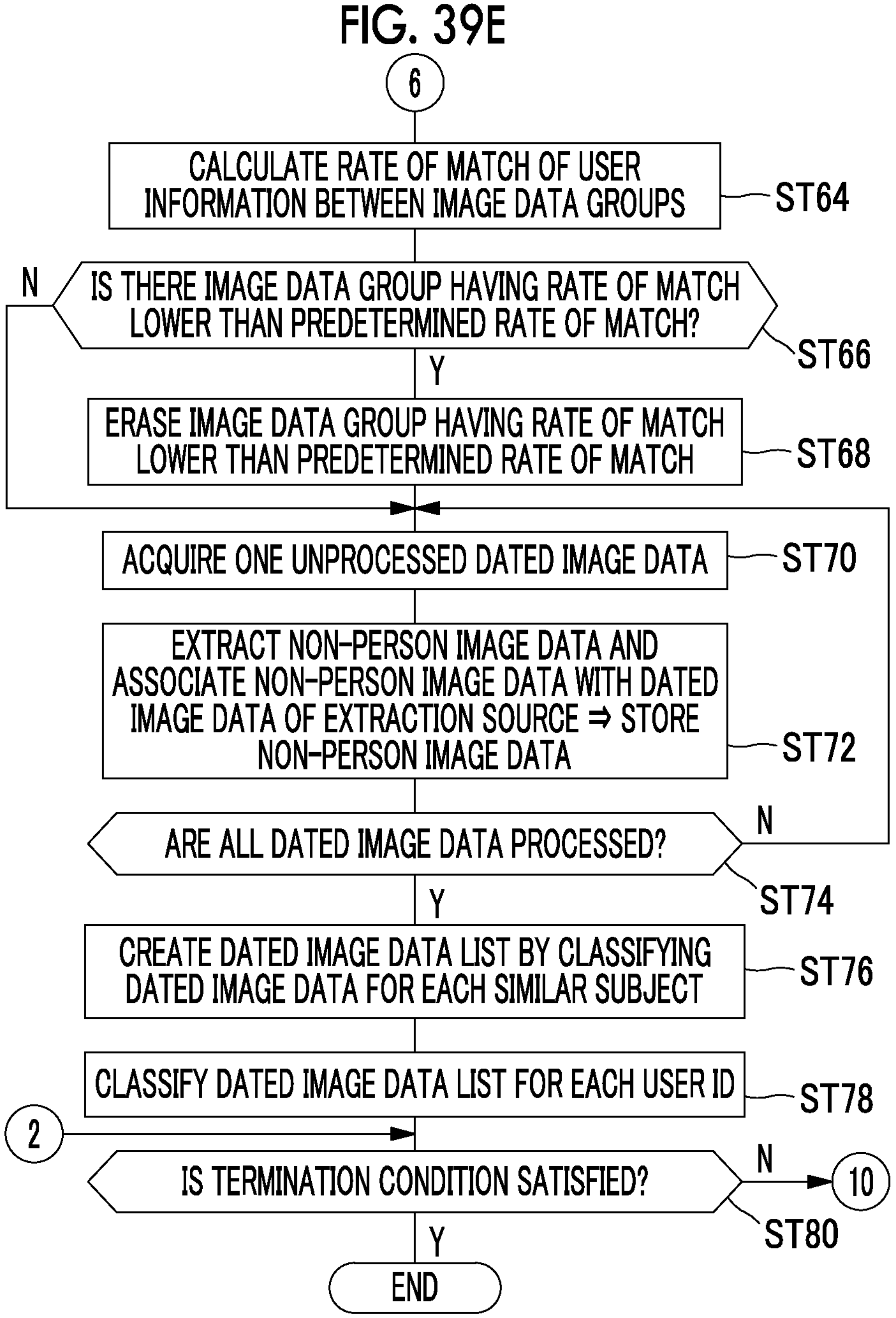
FIG. 39E is a continuation of the flowchart shown in FIG. 39C.

In step ST58, the user information acquisition unit 60J acquires the user information corresponding to the user ID extracted from all the image data groups in step ST56 from the storage 62, and then the dated image data list creation process proceeds to step ST64 shown in FIG. 39E.

In step ST64 shown in FIG. 39E, the user information rate-of-match calculation unit 60K calculates the rate of match of the user information between the image data groups using all the user information acquired in step ST58, and then the dated image data list creation process proceeds to step ST66.

In step ST66, the determination unit 60P determines whether or not the image data group in which the rate of match of the user information calculated in step ST64 is lower than the predetermined rate of match is present. In step ST66, in a case in which the image data group in which the rate of match of the user information calculated in step ST64 is lower than the predetermined rate of match is not present, a negative determination is made, and the dated image data list creation process proceeds to step ST70. In step ST66, in a case in which the image data group in which the rate of match of the user information calculated in step ST64 is lower than the predetermined rate of match is present, a positive determination is made, and the dated image data list creation process proceeds to step ST68.

In step ST68, the erasing unit 60F erases the image data group in which the rate of match of the user information calculated in step ST64 is lower than the predetermined rate of match from the storage 62, and then the dated image data list creation process proceeds to step ST70.

The image data group erased by the erasing unit 60F in this step ST68 is the image data group in which the rate of match of the user information calculated in step ST64 is lower than the predetermined rate of match. This means that the image data group erased by the erasing unit 60F is the image data group that is not similar to the other image data groups stored in the storage 62. In addition, the image data group has a one-to-one correspondence with the registered user 16. Therefore, by erasing the image data group by the erasing unit 60F in this step ST68, the image data group provided by the registered user 16 satisfying the condition that the image data groups are similar to each other is narrowed down as the creation target of the dated image data list.

In step ST70, the image data group acquisition unit 60D acquires the one unprocessed dated image data from the storage 62. In step ST70, the one unprocessed dated image data refers to the image data group in which the processes of step ST72 to step ST78 have not yet been performed. The process of step ST70 is executed, and then the dated image data list creation process proceeds to step ST72.

In step ST72, the non-person image data extraction unit 60L extracts the non-person image data from the dated image data acquired in step ST70, and associates the extracted non-person image data with the dated image data which is the extraction source. Moreover, the non-person image data extraction unit 60L stores the dated image data associated with the non-person image data in the storage 62 for each image data group, thereby returning the dated image data to the storage 62. The process of step ST72 is executed, and then the dated image data list creation process proceeds to step ST74.

In step ST74, the determination unit 60P determines whether or not the process of step ST72 is performed with respect to all the dated image data stored in the storage 62. In step ST74, in a case in which the process of step ST72 is not performed for all the dated image data stored in the storage 62, a negative determination is made, and the dated image data list creation process proceeds to step ST70. In step ST74, in a case in which the process of step ST72 is performed with respect to all the dated image data stored in the storage 62, a positive determination is made, and the dated image data list creation process proceeds to step ST76.

In step ST76, the image data list creation unit 60M acquires the dated image data with the person image data from the storage 62, and determines whether or not the person image data is similar between the dated image data with the person image data. In addition, the image data list creation unit 60M acquires the dated image data with the non-person image data from the storage 62, and determines whether or not the non-person image data is similar between the dated image data with the non-person image data. Moreover, the image data list creation unit 60M creates the dated image data list for each subject by classifying the dated image data for each subject indicated by each of all the dated image data stored in the storage 62, and then the dated image data list creation process proceeds to step ST78.

In step ST78, the image data list classification unit 60N associates the dated image data list with each of the plurality of users 16 by classifying the dated image data list created by the image data list creation unit 60M for each user ID, and then the dated image data list creation process proceeds to step ST80.

In step ST80, the determination unit 60P determines whether or not a condition for terminating the dated image data list creation process (hereinafter, also referred to as "image data list creation process termination condition") is satisfied. Examples of the image data list creation process termination condition include a condition that the server 14 is instructed to terminate the dated image data list creation process. The instruction to terminate the dated image data list creation process is received, for example, by the reception device 54. In a case in which the image data list creation process termination condition is not satisfied in step ST80, a negative determination is made, and the dated image data list creation process proceeds to step ST10 shown in FIG. 39A. In a case in which the image data list creation process termination condition is satisfied in step ST80, a positive determination is made, and the dated image data list creation process is terminated.

Then, the date addition process executed by the CPU 60 of the server 14 will be described with reference to FIG. 40. It should be noted that the flow of the date addition process shown in FIG. 40 is an example of an "information processing method" according to the technology of the present disclosure.

Figure 40:
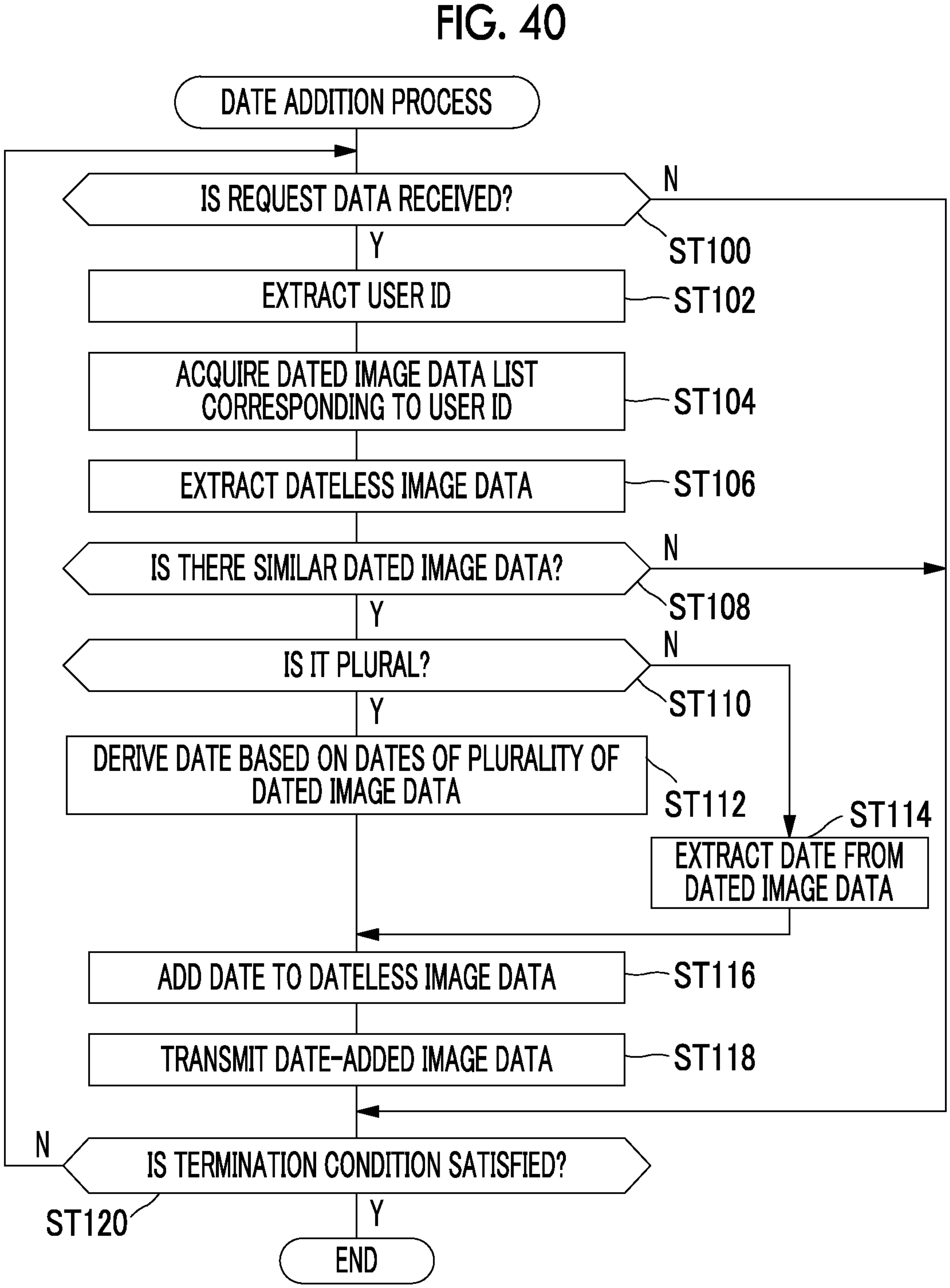
FIG. 40 is a flowchart showing an example of a flow of the date addition process according to the first embodiment.

In the date addition process shown in FIG. 40, first, in step ST100, the determination unit 60P determines whether or not the request data transmitted from the user device 12 is received by the communication I/F 52. In a case in which the request data transmitted from the user device 12 is not received by the communication I/F 52 in step ST100, a negative determination is made, and the date addition process proceeds to step ST120. In step ST100, in a case in which the request data transmitted from the user device 12 is received by the communication I/F 52, a positive determination is made, and the date addition process proceeds to step ST102.

In step ST102, the user ID extraction unit 60B extracts the user ID from the request data received by the communication I/F 52, and then the date addition process proceeds to step ST104.

In step ST104, the image data list acquisition unit 60Q acquires the dated image data list corresponding to the user ID extracted in step ST102 from the storage 62, and then the date addition process proceeds to step ST106.

In step ST106, the dateless image data extraction unit 60R extracts the dateless image data from the request data which is the extraction source from which the user ID is extracted in step ST102, and then the date addition process proceeds to step ST108.

In step ST108, the determination unit 60P determines whether or not the dated image data similar to the dateless image data extracted in step ST106 is present in the dated image data list acquired in step ST104. In step ST108, in a case in which the dated image data similar to the dateless image data extracted in step ST106 is not present in the dated image data list acquired in step ST104, a negative determination is made, and the date addition process proceeds to step ST120. In step ST108, in a case in which the dated image data similar to the dateless image data extracted in step ST106 is present in the dated image data list acquired in step ST104, a positive determination is made, and the date addition process proceeds to step ST110.

In step ST110, the determination unit 60P determines whether or not the dated image data similar to the dateless image data extracted in step ST106 is the plurality of frames. In step ST110, in a case in which the dated image data similar to the dateless image data extracted in step ST106 is a single frame, a negative determination is made, and the date addition process proceeds to step ST114. In step ST110, in a case in which the dated image data similar to the dateless image data extracted in step ST106 is the plurality of frames, a positive determination is made, and the date addition process proceeds to step ST112.

In step ST112, the date derivation unit 60S extracts the date from each of the plurality of dated image data similar to the dateless image data extracted in step ST106. Moreover, the date derivation unit 60S derives the date of the dateless image data based on the plurality of dates extracted from the plurality of dated image data, respectively, and then the date addition process proceeds to step ST116.

In step ST114, the date derivation unit 60S extracts the date from the dated image data similar to the dateless image data extracted in step ST106, and then the date addition process proceeds to step ST116.

In step ST116, the date addition unit 60T generates the date-added image data by adding the date derived in step ST112 or the date extracted in step ST114 to the dateless image data extracted in step ST106, and then the date addition process proceeds to step ST118.

In step ST118, the image data transmission unit 60U transmits the date-added image data generated in step ST116 to the user device 12 which is the transmission source of the request data via the communication I/F 52, and then the date addition process proceeds to step ST120.

In step ST120, the determination unit 60P determines whether or not a condition for terminating the date addition process (hereinafter, also referred to as "date addition process termination condition") is satisfied. Examples of the date addition process termination condition include a condition that the server 14 is instructed to terminate the date addition process. The instruction to terminate the date addition process is received, for example, by the reception device 54. In a case in which the date addition process termination condition is not satisfied in step ST120, a negative determination is made, and the date addition process proceeds to step ST100. In a case in which the date addition process termination condition is satisfied in step ST120, a positive determination is made, and the date addition process is terminated.

Then, the date addition request process executed by the CPU 42 of the user device 12 will be described with reference to FIG. 41. It should be noted that, here, it is premised that the request data has already been created by the request data creation unit 42F.

Figure 41:
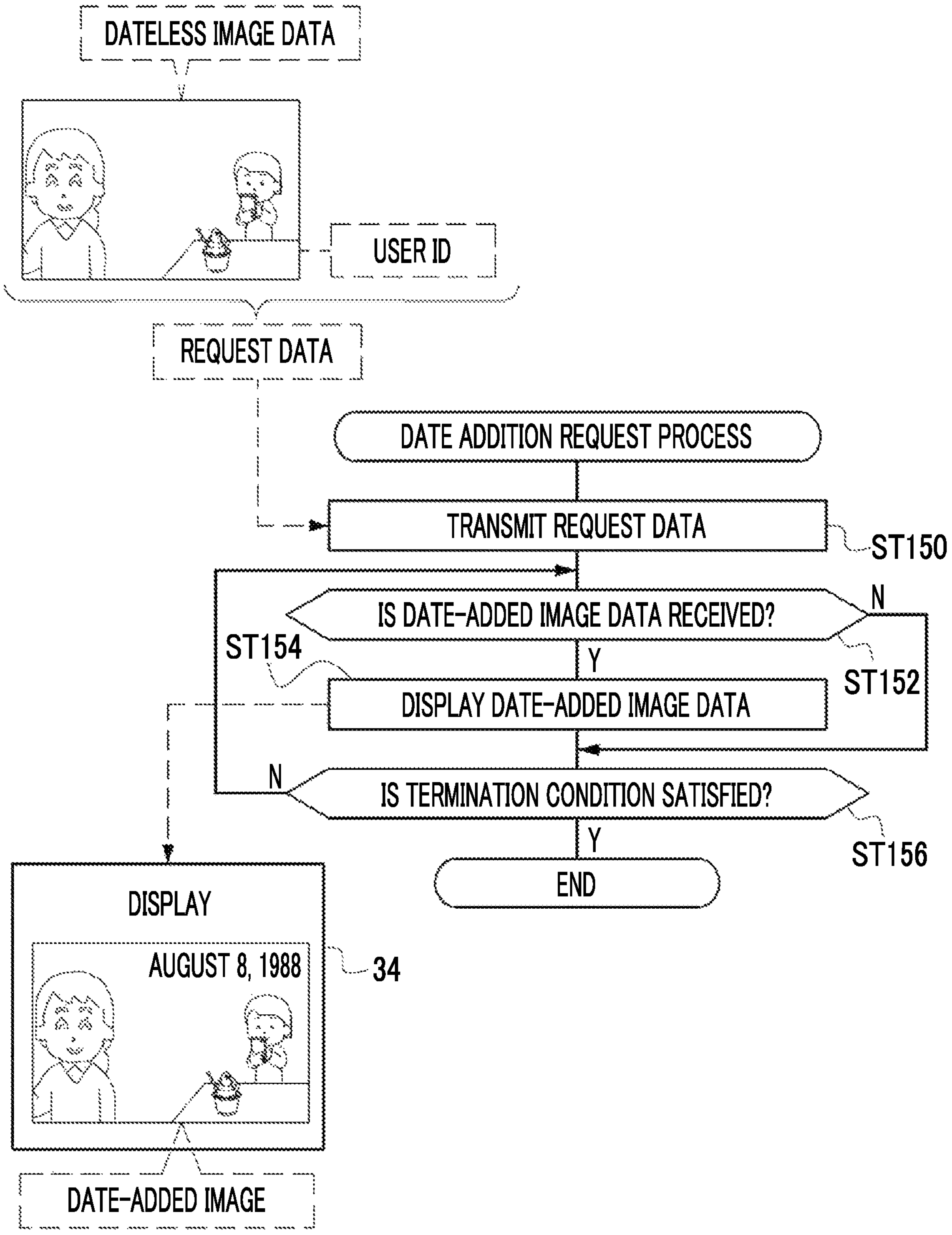
FIG. 41 is a flowchart showing an example of a flow of the date addition request process according to the first embodiment.

In the date addition request process shown in FIG. 41, first, in step ST150, the request data transmission unit 42G transmits the request data created by the request data creation unit 42F to the server 14 via the communication I/F 28, and then the date addition request process proceeds to step ST152.

In a case in which the request data is transmitted to the server 14 by executing the process of step ST150, as a result, the server 14 generates the date-added image data as described above, and transmits the generated date-added image data to the user device 12 which is the transmission source of the request data.

Then, in step ST152, the display control unit 42H determines whether or not the date-added image data is received by the communication I/F 28. In a case in which the date-added image data is not received by the communication I/F 28 in step ST152, a negative determination is made, and the date addition process proceeds to step ST156. In a case in which the date-added image data is received by the communication I/F 28 in step ST152, a positive determination is made, and the date addition process proceeds to step ST154.

In step ST154, the display control unit 42H displays the date-added image indicated by the date-added image data received by the communication I/F 28 on the display 34, and then the date addition request process proceeds to step ST156. By executing the process of this step ST154, the date-added image is displayed on the display 34, and as a result, the date derived by the date derivation unit 60S is presented to the specific user via the display 34. It should be noted that the display 34 is an example of a "presentation device" according to the technology of the present disclosure.

In step ST156, the determination unit 60P determines whether or not a condition for terminating the date addition request process (hereinafter, also referred to as "date addition request process termination condition") is satisfied.

Examples of the date addition request process termination condition include a condition that the user device 12 is instructed to terminate the date addition request process. The instruction to terminate the date addition request process is received, for example, by the reception device 32. In a case in which the date addition process request termination condition is not satisfied in step ST156, a negative determination is made, and the date addition request process proceeds to step ST150. In a case in which the date addition request process termination condition is satisfied in step ST156, a positive determination is made, and the date addition request process is terminated.

As described above, in the first embodiment, in the server 14, the CPU 60 classifies the plurality of dated image data to create the dated image data list, and the dated image data list is associated with the specific user. The plurality of dated image data are the image data of the plurality of users 16 including the specific user. The dated image data list is created for each subject by classifying the plurality of dated image data for each subject indicated by each of the plurality of dated image data. The specific user is associated with the dated image data list for the subject similar to the subject indicated by the dated image data of the specific user. In addition, the CPU 60 acquires the dated image data for the subject, which is similar to the subject indicated by the dateless image data provided by the specific user, from the dated image data list associated with the specific user. Moreover, the CPU 60 derives the date to be added to the dateless image data, based on the date added to the acquired dated image data.

Therefore, with the present configuration, an appropriate date can be added to the dateless image data as compared with a case in which the date to be added to the dateless image data is derived based only on the dated image data owned by the specific user.

In addition, in the first embodiment, in the server 14, the dated image data list is created by classifying the plurality of dated image data for each subject of which the aspect of the temporal change can be visually specified. Therefore, with the present configuration, the dated image data list for each visually distinguishable subject can be created as compared with a case in which the plurality of dated image data are classified for each subject of which the aspect of the temporal change cannot be visually specified.

In addition, in the first embodiment, the server 14 creates a list including the plurality of dated image data having different dates as the dated image data list. The date added to the dated image data is the imaging date. Therefore, with the present configuration, an appropriate date can be added to the dateless image data as compared with a case in which all the dates added to the plurality of dated image data included in the dated image data are the same date.

In addition, in the first embodiment, the plurality of users 16 are the user group satisfying the condition that has made the registration to agree to share the information including the dated image data. Therefore, with the present configuration, as compared with a case in which all the dated image data provided to the server 14 are used and processed regardless of whether or not the registration to agree to share the information including the dated image data has been made, it is possible to suppress the use of the dated image data provided to the server 14 by a person who does not want to share the information including the dated image data. That is, it is possible to contribute to the protection of personal information.

In addition, in the first embodiment, the image data group is associated with each of the plurality of users 16, and the plurality of users 16 are the user group satisfying the condition that the image data groups are similar to each other. Therefore, with the present configuration, as compared with a case in which the date is derived by also referring to the dated image data provided to the server 14 to the person who does not satisfy the condition that the image data groups are similar to each other between the users 16, it is possible to reduce the process load required to derive an appropriate date to be added to the dateless image data. In addition, only the image data group provided by the user group satisfying the condition that the image data groups are similar to each other is used, so that it is possible to contribute to the protection of personal information.

In addition, in the first embodiment, the plurality of users 16 are the user group satisfying the condition that the registered user information is similar. Therefore, with the present configuration, as compared with a case in which the date is derived by also using the dated image data provided to the server 14 to the person of which the registered user information is not similar, it is possible to reduce the process load required to derive an appropriate date to be added to the dateless image data. In addition, only the image data group provided by the user group satisfying the condition that the registered user information is similar is used, so that it is possible to contribute to the protection of personal information.

In addition, in the first embodiment, in the server 14, the dated image data, which is the creation target of the dated image data list, among the plurality of dated image data is limited to the image data obtained by being captured in the range determined based on the GPS information. Therefore, with the present configuration, as compared with a case in which the date is derived by also referring to the dated image data obtained by being captured outside the range determined based on the GPS information, it is possible to reduce the process load required to derive an appropriate date to be added to the dateless image data.

Further, in the first embodiment, the date-added image is displayed on the display 34. That is, the date added to the dateless image data is displayed on the display 34. Therefore, with the present configuration, it is possible to perceive the date added to the dateless image data.

It should be noted that, in the first embodiment, a form example is not described in which the dated image data list is updated, but the technology of the present disclosure is not limited to this. For example, the CPU 42 may update the dated image data list associated with the specific user in accordance with the instruction received by the reception device 32 or 54. In this case, the dated image data list need only be updated by reducing some of the plurality of dated image data from the dated image data list in accordance with the instruction received by the reception device 32 or 54, or by adding the latest dated image data uploaded from the user device 12 to a specific dated image data list. In addition, the specific dated image data list may be updated by adding the new dated image data (see FIG. 43) generated based on the date-added image data to the specific dated image data list.

As described above, the dated image data list associated with the specific user is updated in accordance with the instruction given from the outside, so that the content of the dated image data list can be made to the content reflecting the intention of the user 16.

In addition, in the first embodiment, the form example has been described in which the dated image data is uploaded from the user device 12 to the server 14, but the technology of the present disclosure is not limited to this. For example, the image data group associated with the plurality of users 16 may be stored in the storage 62 in advance. In addition, the server 14 may take in the image data group associated with the plurality of users 16 from another device (USB memory, memory card, or the like) via the external I/F 58. Also in this case, the image data group is stored in the storage 62 in association with the plurality of users 16.

In addition, in the first embodiment, the form example has been described in which the date added to the dateless image data is displayed on the display 34, but the technology of the present disclosure is not limited to this. For example, instead of the visible presentation of the date on the display 34, or together with the visible presentation of the date on the display 34, the speaker 38 (see FIG. 2) may output the voice indicating the date. In addition, the date may be printed on a recording medium (for example, paper) by a printer (not shown).

In addition, in the first embodiment, the form example has been described in which the dated image data creation process and the date addition request process are executed by the user device 12, and the dated image data list creation process and the date addition process are executed by the server 14, but the technology of the present disclosure is not limited. For example, the dated image data creation process, the date addition request process, the dated image data list creation process, and the date addition process may be executed by one device (for example, the user device 12, the server 14, or the personal computer). In addition, at least one of the dated image data creation process, the date addition request process, the dated image data list creation process, or the date addition process may be distributed and executed by a plurality of devices. For example, the dated image data list creation process and the date addition process may be executed by separate devices. In addition, for example, various processes may be executed by a plurality of servers including an image data storage server that stores the dated image data and the dateless image data provided from the plurality of users 16, an image analysis server that executes the image recognition process, and a list storage server that stores the dated image data list.

Second Embodiment

In the second embodiment, a form example will be described in which the dated image data list is updated. It should be noted that, in the second embodiment, the same components as the components described in the first embodiment will be designated by the same reference numeral, the description of the components will be omitted, and the different configurations and actions from the first embodiment will be described.

Figure 42:
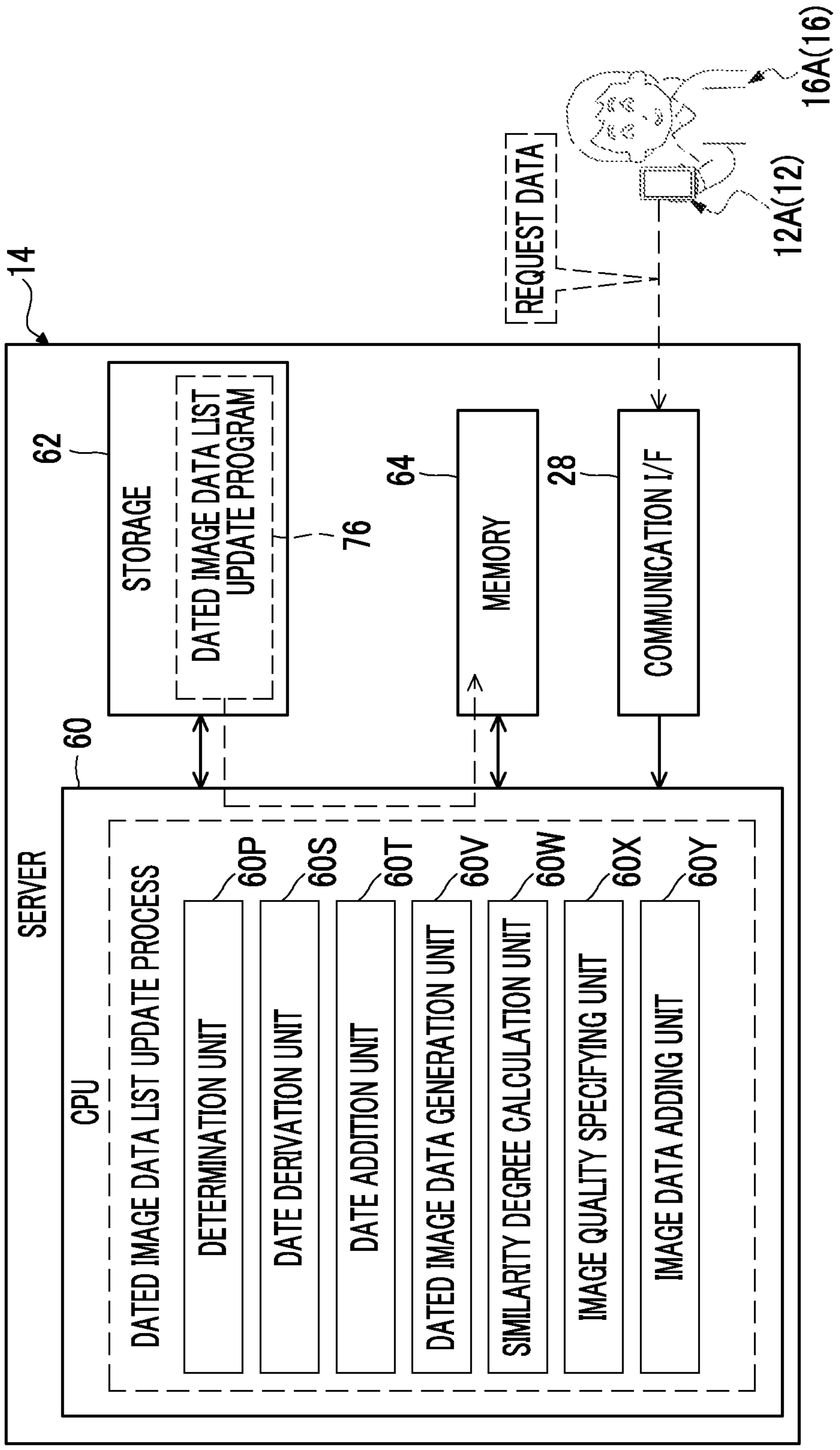
FIG. 42 is a block diagram showing an example of a main function of the CPU in a case in which a dated image data list update process is executed by the CPU of the server provided in the information processing system according to the second embodiment.

The update of the dated image data list is realized by executing a dated image data list update process (see FIG. 42) by the CPU 60 of the server 14. As an example, as shown in FIG. 42, a dated image data list update program 76 is stored in the storage 62. The CPU 60 reads out the dated image data list update program 76 from the storage 62. Moreover, the CPU 60 executes the dated image data list update program 76 read out from the storage 62 on the memory 64 to be operated as the determination unit 60P, the date derivation unit 60S, the date addition unit 60T, a dated image data generation unit 60V, a similarity degree calculation unit 60W, an image quality specifying unit 60X, and an image data adding unit 60Y. That is, the dated image data list update process is realized by the CPU 60 being operated as the determination unit 60P, the date derivation unit 60S, the date addition unit 60T, the dated image data generation unit 60V, the similarity degree calculation unit 60W, the image quality specifying unit 60X, and the image data adding unit 60Y.

By executing the dated image data list update process, the CPU 60 updates the dated image data list by adding the new image data provided as the new image data as the dated image data to the dated image data list in a case in which a first condition is satisfied. Here, the first condition refers to a condition that the image quality of the new image data is equal to or higher than a reference image quality.

In addition, by executing the dated image data list update process, the CPU 60 updates the dated image data list by adding the new image data to the dated image data list associated with the specific user in a case in which a second condition is satisfied. Here, the second condition is a condition that the subject indicated by the new image data newly provided as the dated image data and the subject indicated by the dated image data included in the dated image data list associated with the specific user are not similar to each other. It should be noted that the new image data is an example of "first new image data" and "second new image data" according to the technology of the present disclosure.

Figure 43:
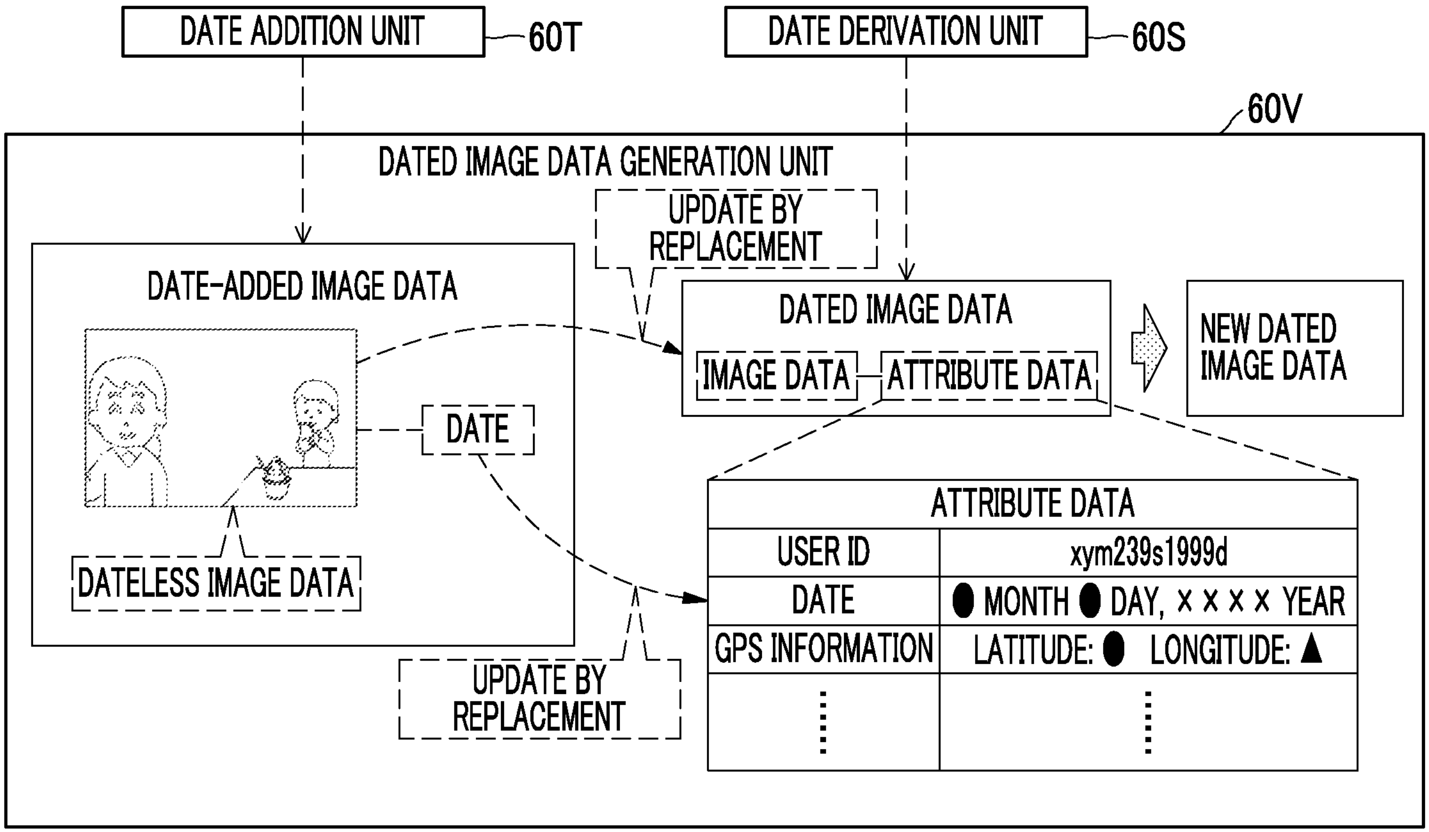
FIG. 43 is a block diagram showing an example of a process content in a case in which the CPU of the server provided in the information processing system according to the second embodiment is operated as the date addition unit, the date derivation unit, and a dated image data generation unit.

In the following, the form example in which the dated image data list is updated will be described in more detail. As an example, as shown in FIG. 43, the dated image data generation unit 60V generates the new dated image data based on the date-added image data generated by the date addition unit 60T and the dated image data used to derive the date included in the date-added image data. The new dated image data is an example of "first new image data" and "second new image data" according to the technology of the present disclosure, and is generated by the dated image data used to derive the date included in the date-added image data is updated based on the date-added image data. More specifically, the image data included in the date-added image data used to derive the date included in the dated image data is replaced with the dateless image data included in the date-added image data. In addition, the date of the attribute data (hereinafter, also referred to as "attribute data for the dateless image") included in the dated image data used to derive the date (date included in the date-added image data) added to the dateless image data by the date addition unit 60T is replaced with the date included in the date-added image data.

The data other than the date included in the attribute data for the dateless image is generated based on, for example, the user ID, which is the providing source of the dateless image data, and the attribute data of one or the plurality of dated image data, which is a derivation target of the date by the date derivation unit 60S.

More specifically, as the user ID included in the attribute data of the new dated image data, the user ID which is the providing source of the dateless image data is adopted. In addition, in a case in which there is one dated image data which is the derivation target of the date by the date derivation unit 60S, among the data included in the attribute data of the dated image data, the data of each item other than the user ID and the date (for example, the GPS information and the Exif information) is the data included in the attribute data of the dated image data. In a case in which there are the plurality of dated image data which is the derivation target of the date by the date derivation unit 60S, the data of each item other than the user ID and the date is the data based on the average value of the data included in the attribute data of the plurality of dated image data.

It should be noted that, here, although data based on the average value of the data included in the attribute data of the plurality of dated image data is described as an example, the technology of the present disclosure is not limited to this, and the data based on the mode value or the median value of the data included in the attribute data of the plurality of dated image data may be used. In addition, the data other than the user ID and the date included in the attribute data of the dateless image data having the highest similarity degree to the dateless image data may be used as a part of the attribute data included in the new dated image data.

Figure 44:
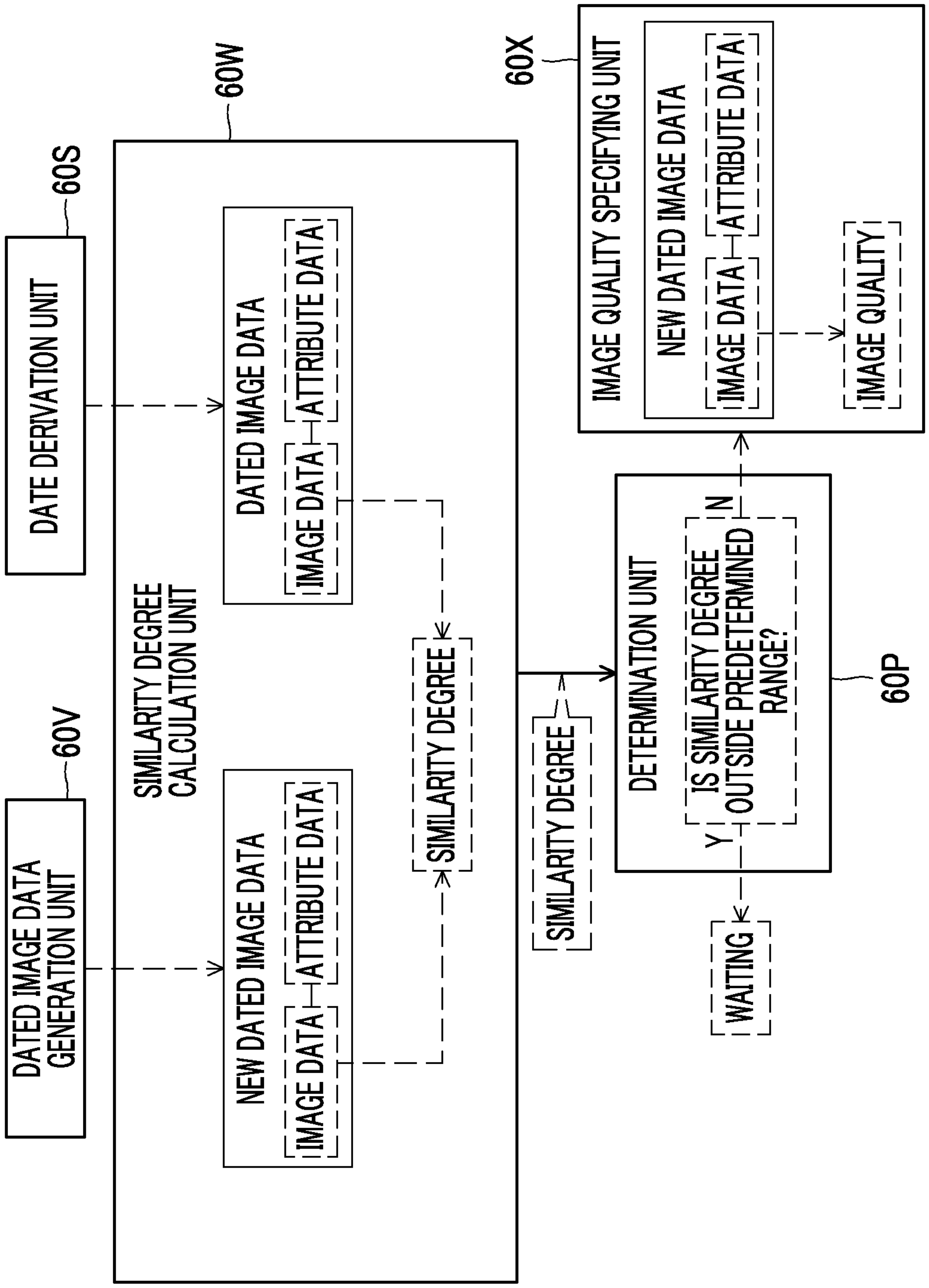
FIG. 44 is a block diagram showing an example of a process content in a case in which the CPU of the server provided in the information processing system according to the second embodiment is operated as the dated image data generation unit, the date derivation unit, a similarity degree calculation unit, the determination unit, and an image quality specifying unit.

As an example, as shown in FIG. 44, the similarity degree calculation unit 60W calculates the similarity degree between the new dated image data generated by the dated image data generation unit 60V and the dated image data which is the derivation target of the date by the date derivation unit 60S. The similarity degree is, for example, an average value of the similarity degree between the image data and the similarity degree between the attribute data.

The similarity degree between the image data refers to the similarity degree between the image data included in the new dated image data and the image data included in the dated image data which is the derivation target of the date by the date derivation unit 60S. The similarity degree between the attribute data refers to the similarity degree between the attribute data included in the new dated image data and the attribute data included in the dated image data which is the derivation target of the date by the date derivation unit 60S.

Different weight values may be added to the similarity degree between the image data and the similarity degree between the attribute data. The weight value may be a fixed value, or may be a variable value. Examples of the variable value in this case include a value that can be changed in accordance with the instruction received by the reception device 54, the number of frames of the dated image data which is the derivation target of the date by the date derivation unit 60S, a value that is determined in accordance with a degree of variation (for example, dispersion or standard deviation) in the dates added to the dated image data which is the derivation target of the date by the date derivation unit 60S, a value that is changed in accordance with the user 16 who provides the dateless image data, and/or a value that is changed periodically.

It should be noted that, in a case in which the dated image data, which is the derivation target of the date by the date derivation unit 60S, is the plurality of frames, for example, the similarity degree between composite image data obtained by adding and averaging the plurality of image data included in the dated image data of the plurality of frames, which are the derivation target of the date by the date derivation unit 60S, in pixel units, and the image data included in the new dated image data may be used as the similarity degree between the image data. In addition, in a case in which the dated image data which is the derivation target of the date by the date derivation unit 60S is the plurality of frames, the similarity degree between the image data included in the dated image data of one frame among the dated image data of the plurality of frames, and the image data included in the new dated image data may be used as the similarity degree between the image data.

The determination unit 60P determines whether or not the similarity degree calculated by the similarity degree calculation unit 60W is out of the predetermined range. The predetermined range in this case may be a fixed value, or may be a variable value. Examples of the variable value in this case include a value that can be changed in accordance with the instruction received by the reception device 54, the number of frames of the dated image data which is the derivation target of the date by the date derivation unit 60S, a value that is determined in accordance with a degree of variation (for example, dispersion or standard deviation) in the dates added to the dated image data which is the derivation target of the date by the date derivation unit 60S, a value that is changed in accordance with the user 16 who provides the dateless image data, and/or a value that is changed periodically.

In a case in which it is determined that the similarity degree calculated by the similarity degree calculation unit 60W is within the predetermined range, the determination unit 60P waits for the arrival of the next determination timing. In a case in which it is determined that the similarity degree calculated by the similarity degree calculation unit 60W is out of the predetermined range, the determination unit 60P instructs the image quality specifying unit 60X to specify the image quality of the image data.

The image quality specifying unit 60X specifies the image quality of the image data included in the new dated image data generated by the dated image data generation unit 60V in accordance with the instruction from the determination unit 60P. Here, the image quality refers to, for example, the resolution and an amount of noise. The image quality is lower as the resolution is lower, and the image quality is lower as the amount of noise is larger.

Figure 45:
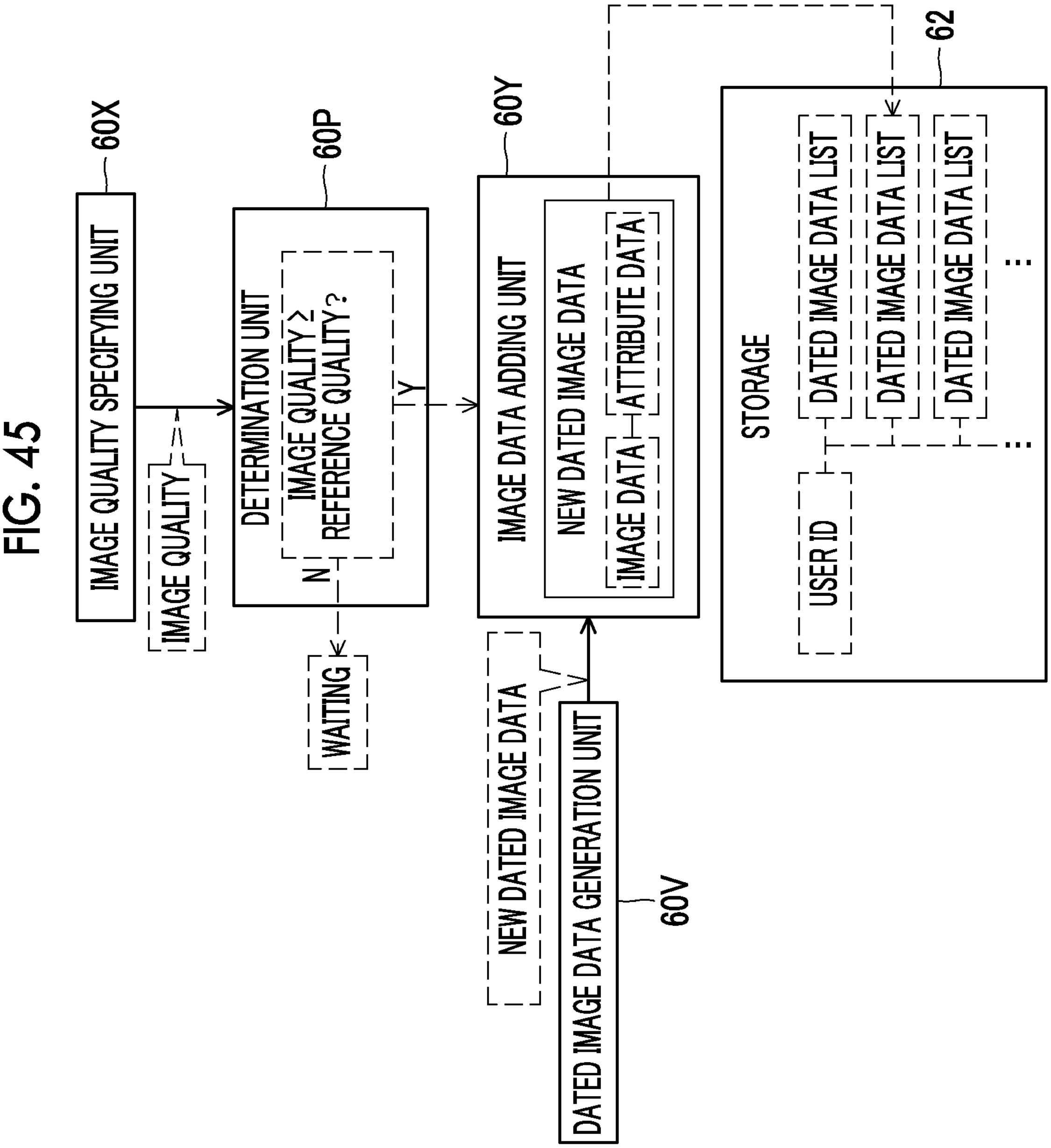
FIG. 45 is a block diagram showing an example of a process content in which the CPU of the server provided in the information processing system according to the second embodiment is operated as the image quality specifying unit, the determination unit, an image data adding unit, and the dated image data generation unit.

As an example, as shown in FIG. 45, the determination unit 60P determines whether or not the image quality specified by the image quality specifying unit 60X is equal to or higher than the reference image quality. Here, as the reference image quality, a fixed value is adopted. It should be noted that this is merely an example and a variable value may be adopted. Examples of the variable value in this case include a value that can be changed in accordance with the instruction received by the reception device 54, the number of frames of the dated image data which is the derivation target of the date by the date derivation unit 60S, a value that is determined in accordance with a degree of variation (for example, dispersion or standard deviation) in the dates added to the dated image data which is the derivation target of the date by the date derivation unit 60S, a value that is changed in accordance with the user 16 who provides the dateless image data, and/or a value that is changed periodically.

In a case in which it is determined that the image quality specified by the image quality specifying unit 60X is lower than the reference image quality, the determination unit 60P waits for the arrival of the next determination timing. In a case in which it is determined that the image quality specified by the image quality specifying unit 60X is equal to or higher than the reference image quality, the determination unit 60P instructs the image data adding unit 60Y to add the new dated image data to the storage 62.

The image data adding unit 60Y adds the new dated image data generated by the dated image data generation unit 60V to a specific dated image data list in the storage 62 in accordance with the instruction from the determination unit 60P. As a result, the specific dated image data list is updated. Here, the specific dated image data list refers to the dated image data list including the dated image data which is the derivation target of the date by the date derivation unit 60S.

Then, the dated image data list update process executed by the CPU 60 of the server 14 will be described with reference to FIG. 46.

Figure 46:
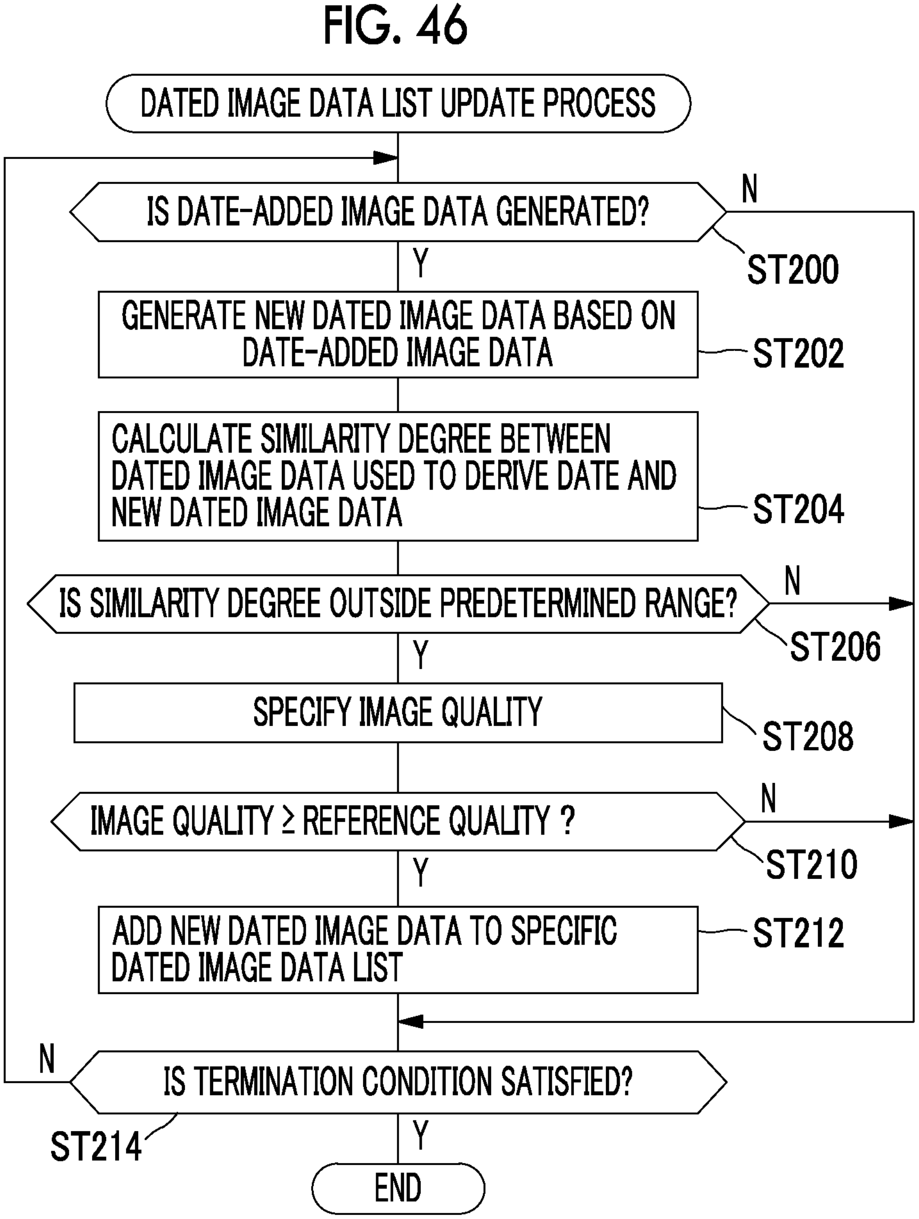
FIG. 46 is a flowchart showing an example of a flow of the dated image data list update process according to the second embodiment.

In the dated image data list update process shown in FIG. 46, first, in step ST200, the determination unit 60P determines whether or not the date-added image data is generated by the date addition unit 60T. In a case in which the date-added image data is not generated by the date addition unit 60T in step ST200, a negative determination is made, and the dated image data list update process proceeds to step ST202. In a case in which the date-added image data is generated by the date addition unit 60T in step ST200, a positive determination is made, and the dated image data list update process proceeds to step ST214.

In step ST202, the dated image data generation unit 60V generates the new dated image data based on the date-added image data generated by the date addition unit 60T and the dated image data used to derive the date included in the date-added image data, and then the dated image data list update process proceeds to step ST204.

In step ST204, the similarity degree calculation unit 60W calculates the similarity degree between the new dated image data generated in step ST202 and the dated image data which is the derivation target of the date by the date derivation unit 60S, and then the dated image data list update process proceeds to step ST206.

In step ST206, the determination unit 60P determines whether or not the similarity degree calculated in step ST204 is out of the predetermined range. In step ST206, in a case in which the similarity degree calculated in step ST204 is within the predetermined range, a negative determination is made, and the dated image data list update process proceeds to step ST214. In step ST206, in a case in which the similarity degree calculated in step ST204 is out of the predetermined range, a positive determination is made, and the dated image data list update process proceeds to step ST208.

In step ST208, the image quality specifying unit 60X specifies the image quality of the image data included in the new dated image data generated by the dated image data generation unit 60V, and then the dated image data list update process proceeds to step ST210.

In step ST210, the determination unit 60P determines whether or not the image quality specified in step ST208 is equal to or higher than the reference image quality. In step ST210, in a case in which the image quality specified in step ST208 is lower than the reference image quality, a negative determination is made, and the dated image data list update process proceeds to step ST214. In step ST210, in a case in which the image quality specified in step ST208 is equal to or higher than the reference image quality, a positive determination is made, and the dated image data list update process proceeds to step ST212.

In step ST212, the image data adding unit 60Y updates the specific dated image data list by adding the new dated image data generated by the dated image data generation unit 60V to the specific dated image data list, and then the dated image data list update process proceeds to step ST214.

In step ST214, the determination unit 60P determines whether or not a condition for terminating the dated image data list update process (hereinafter, also referred to as "list update process termination condition") is satisfied. Examples of the list update process termination condition include a condition that the server 14 is instructed to terminate the dated image data list update process. The instruction to terminate the dated image data list update process is received, for example, by the reception device 54. In a case in which the list update process termination condition is not satisfied in step ST214, a negative determination is made, and the dated image data list update process proceeds to step ST200. In a case in which the list update process termination condition is satisfied in step ST214, a positive determination is made, and the dated image data list update process is terminated.

Figure 47A:
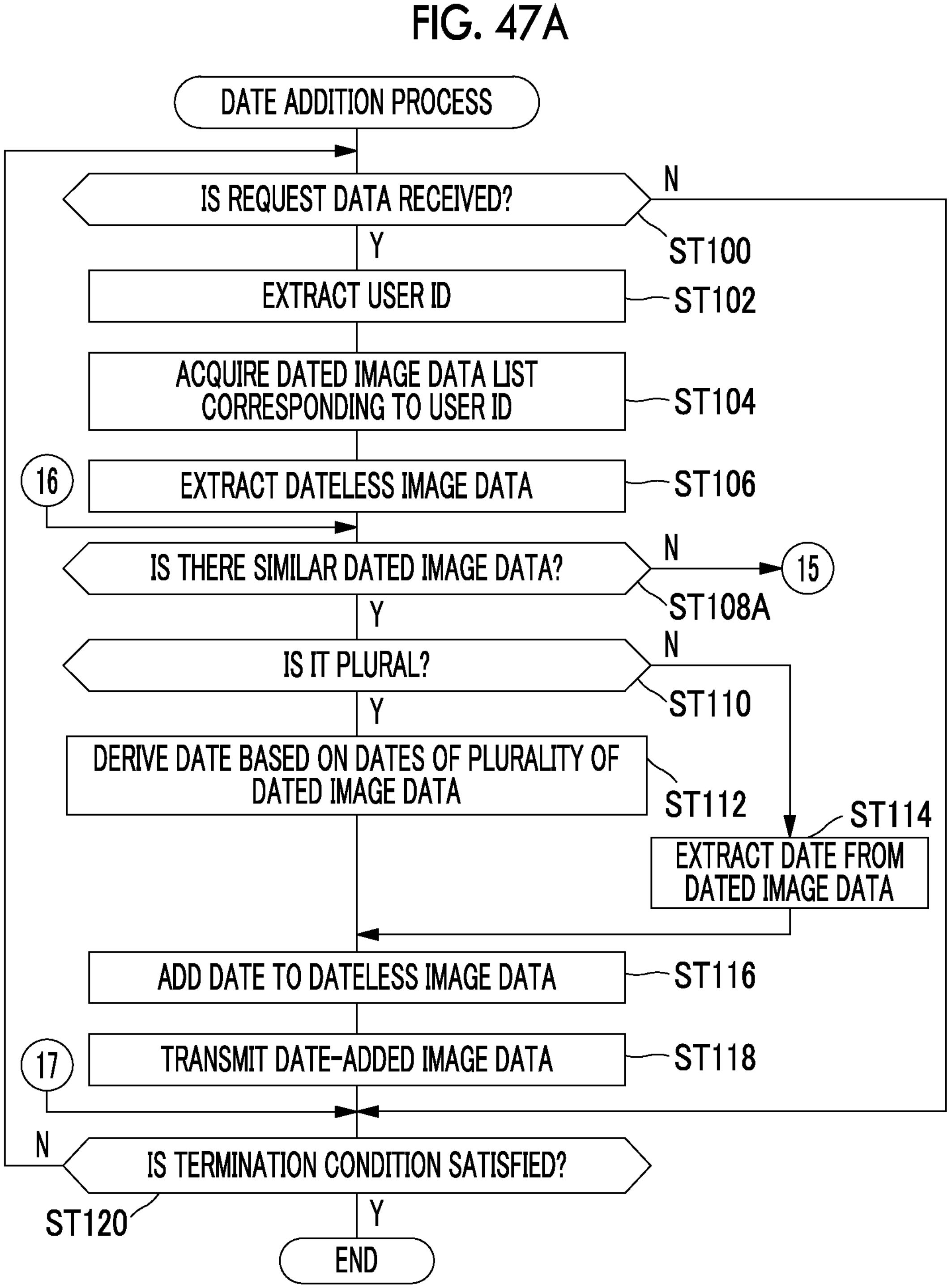
FIG. 47A is a flowchart showing an example of a flow of the date addition process according to the second embodiment.
Figure 47B:
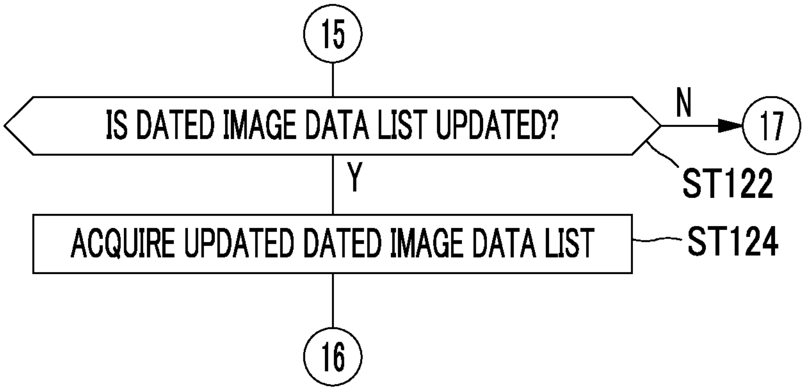
FIG. 47B is a continuation of the flowchart shown in FIG. 47A.

Then, the date addition process according to the second embodiment will be described with reference to FIGS. 47A and 47B. The flowcharts shown in FIGS. 47A and 47B are different from the flowcharts shown in FIG. 40 in that step ST108A is provided instead of step ST108, and step ST122 and step ST124 are further provided. It should be noted that, in FIG. 47A, the same steps as those in the flowchart shown in FIG. 40 are designated by the same step numbers, and the description thereof will be omitted.

In step ST108A shown in FIG. 47A, the determination unit 60P determines whether or not the dated image data similar to the dateless image data extracted in step ST106 is present in the dated image data list acquired in step ST104 or step ST124 (see FIG. 47B). In step ST108A, in a case in which the dated image data similar to the dateless image data extracted in step ST106 is present in the dated image data list acquired in step ST104 or step ST124, a positive determination is made, and the date addition process proceeds to step ST110. In step ST108A, in a case in which the dated image data similar to the dateless image data extracted in step ST106 is not present in the dated image data list acquired in step ST104 or step ST124, a negative determination is made, and the date addition process proceeds to step ST122 shown in FIG. 47B.

In step ST122 shown in FIG. 47B, the determination unit 60P determines whether or not the specific dated image data list is updated by executing the dated image data list update process. In a case in which the specific dated image data list is not updated in step ST122, a negative determination is made, and the date addition process proceeds to step ST120 shown in FIG. 47A. In a case in which the specific dated image data list is updated in step ST122, a positive determination is made, and the date addition process proceeds to step ST124.

In step ST124, the image data list acquisition unit 60Q acquires the dated image data list corresponding to the user ID extracted in step ST102 from the storage 62, and then the date addition process proceeds to step ST108A.

Moreover, the CPU 60 acquires the dated image data for the subject similar to the subject indicated by the dateless image data of the specific user by executing the processes of step ST108A to step ST114 shown in FIG. 47A. That is, the CPU 60 acquires the dated image data for the subject similar to the subject indicated by the dateless image data of the specific user from the updated dated image data list associated with the specific user, that is, the specific dated image data list, on a condition that the dated image data list associated with the specific user is updated by executing the date addition process according to the second embodiment.

It should be noted that, here, the form example has been described in which the dated image data for the subject similar to the subject indicated by the dateless image data of the specific user is acquired from the specific dated image data list by the image data list acquisition unit 60Q on a condition that the specific dated image data list is updated by executing the dated image data list update process, but the technology of the present disclosure is not limited to this. The dated image data may be newly provided to the server 14 from the user device 12, and the newly provided dated image data may be acquired by the image data list acquisition unit 60Q from the dated image data list updated by adding the newly provided dated image data to the dated image data list.

As described above, in the second embodiment, in the server 14, in a case in which the image quality of the new dated image data is equal to or higher than the reference image quality, the dated image data list is updated by adding the new dated image data to the dated image data list. Therefore, with the present configuration, as compared with a case in which the dated image data list is added to the new dated image data regardless of the image quality of the new dated image data, it is possible to suppress the addition of the dated image data that is not suitable for the image recognition process (for example, the dated image data in which the person and/or the non-person object cannot be recognized by executing the image recognition process) to the dated image data list.

In addition, in the second embodiment, in the server 14, in a case in which the subject indicated by the new dated image data and the subject indicated by the dated image data included in the dated image data list associated with the specific user are not similar to each other, the new dated image data is added to the specific dated image data list. Therefore, with the present configuration, as compared with a case in which the new dated image data is added to the specific dated image data list regardless of whether or not the subject indicated by the new dated image data and the subject indicated by the dated image data included in the dated image data list associated with the specific user are similar to each other, it is possible to suppress an increase in the data amount of the dated image data list.

In addition, in the second embodiment, in the server 14, the dated image data for the subject, which is similar to the subject indicated by the dateless image data provided by the specific user, is acquired from the specific dated image data list, on the condition that the specific dated image data list is updated. Therefore, with the present configuration, as compared with a case in which the dated image data for the subject, which is similar to the subject indicated by the dateless image data provided by the specific user, is not acquired from the specific dated image data list even though the specific dated image data list is updated, it is possible to realize immediate derivation of an appropriate date to be added to the dateless image data.

It should be noted that, in the second embodiment, the form example has been described in which the new dated image data is added to the specific dated image data list in a case in which the image quality specified by the image quality specifying unit 60X is equal to or higher than the reference image quality, but the technology of the present disclosure is not limited to this. For example, in a case in which the image quality of the new dated image data exceeds the image quality of the dated image data (hereinafter, also referred to as "similar image data") similar within a predetermined similar range among the plurality of dated image data in the specific dated image data list, the similar image data may be erased from the specific dated image data list and the new dated image data may be added.

Figure 48:
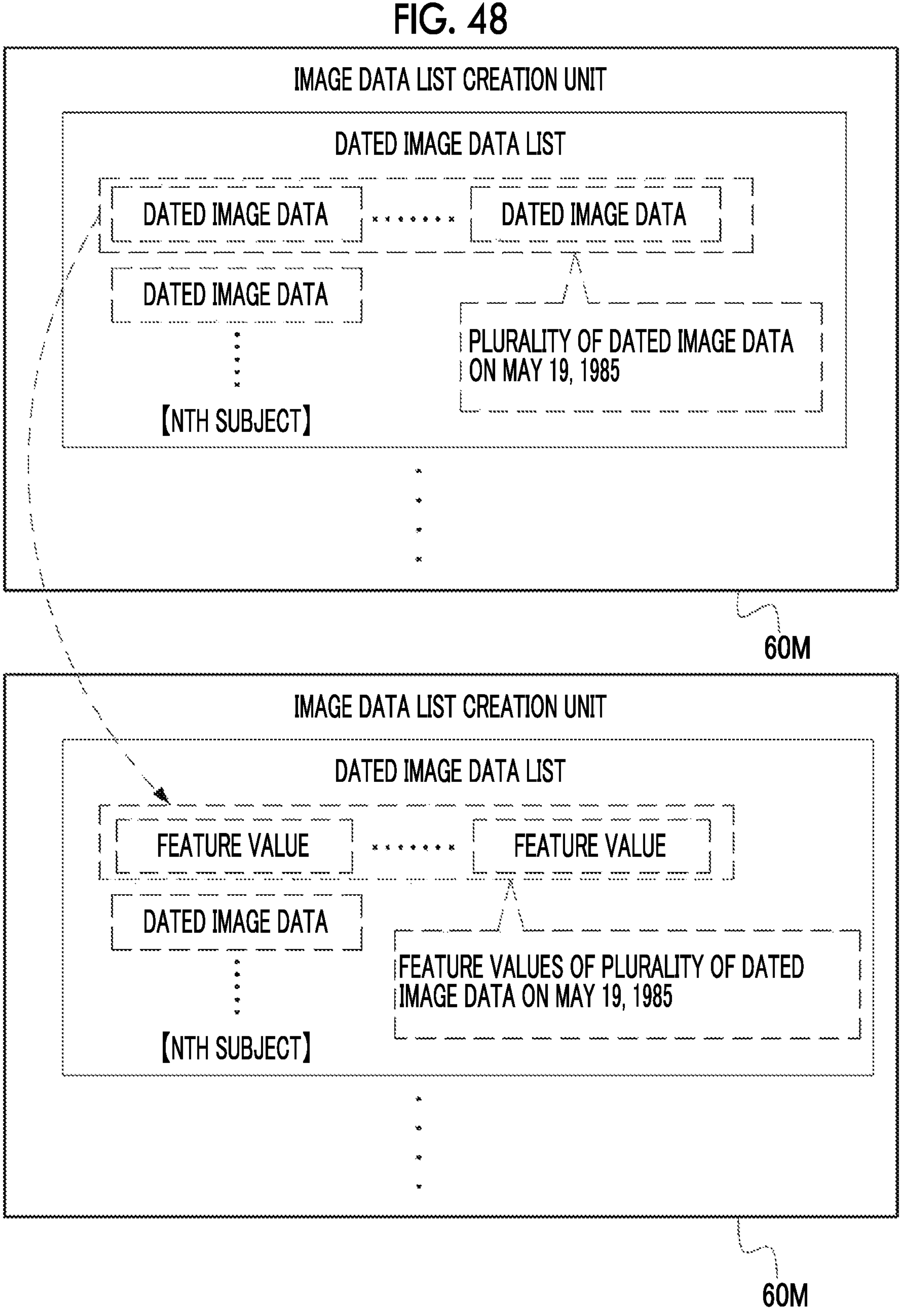
FIG. 48 is a block diagram showing a modification example of the image data list creation unit.

In addition, in each of the embodiments described above, although the form example has been described in which the plurality of dated image data are included in the dated image data list, as shown in FIG. 48 as an example, the image data list creation unit 60M may include feature data indicating a feature of the same-date image data group to which the same date is added among the plurality of dated image data in the dated image data list instead of the same-date image data group. In the example shown in FIG. 48, although the plurality of dated image data dated May 19, 1985 are shown as an example of the same-date image data group, the image data list creation unit 60M extracts the feature data from the plurality of dated image data dated May 19, 1985 and replaces the plurality of dated image data dated May 19, 1985 with the feature data.

Here, a first example of the feature data includes data that is predetermined as the minimum data for specifying the outline of the dated image data included in the same-date image data group (for example, spatial frequency, contrast value, and brightness of the image data included in each dated image data). A second example of the feature data includes the person image data and the non-person image data associated with the dated image data included in the same-date image data group. A third example of the feature data includes data that is predetermined as the minimum data for specifying the outline of the person image data and the non-person image data associated with the dated image data (for example, spatial frequency, contrast value, and brightness of the image data included in each dated image data).

As described above, instead of the same-date image data group, the feature data indicating the feature of the same-date image data group is included in the dated image data list, so that it is possible to reduce the data amount of the dated image data list as compared with a case in which the dated image data list is composed of only the plurality of dated image data.

In addition, in each of the embodiments described above, the form example has been described in which the dated image data list corresponding to the user ID is acquired by executing the date addition process (see step ST104 shown in FIG. 40), but priorities may be added to the plurality of dated image data lists, and the dated image data lists having higher priorities may be acquired in order.

Figure 49A:
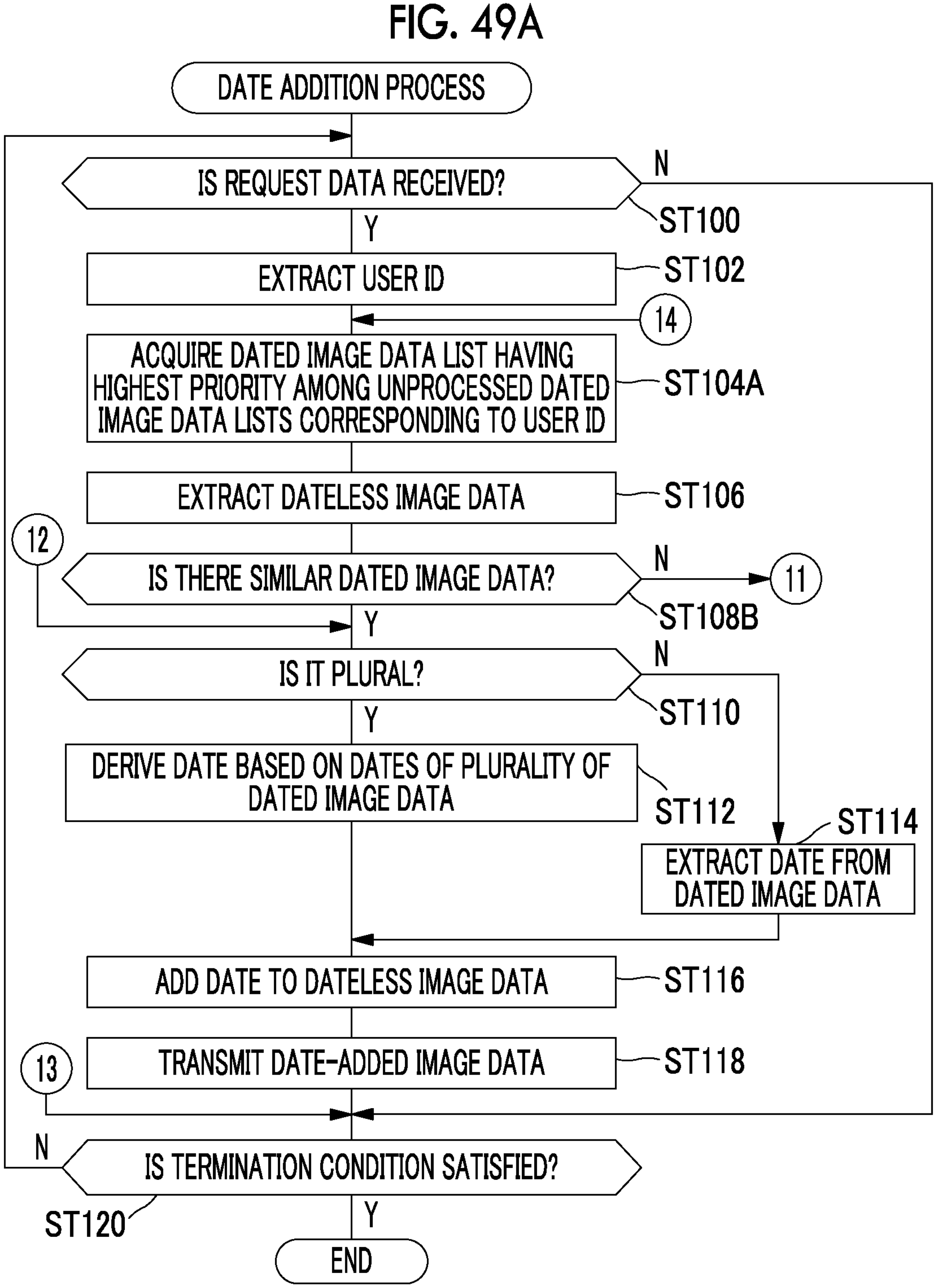
FIG. 49A is a flowchart showing a modification example of the flow of the date addition process.
Figure 49B:
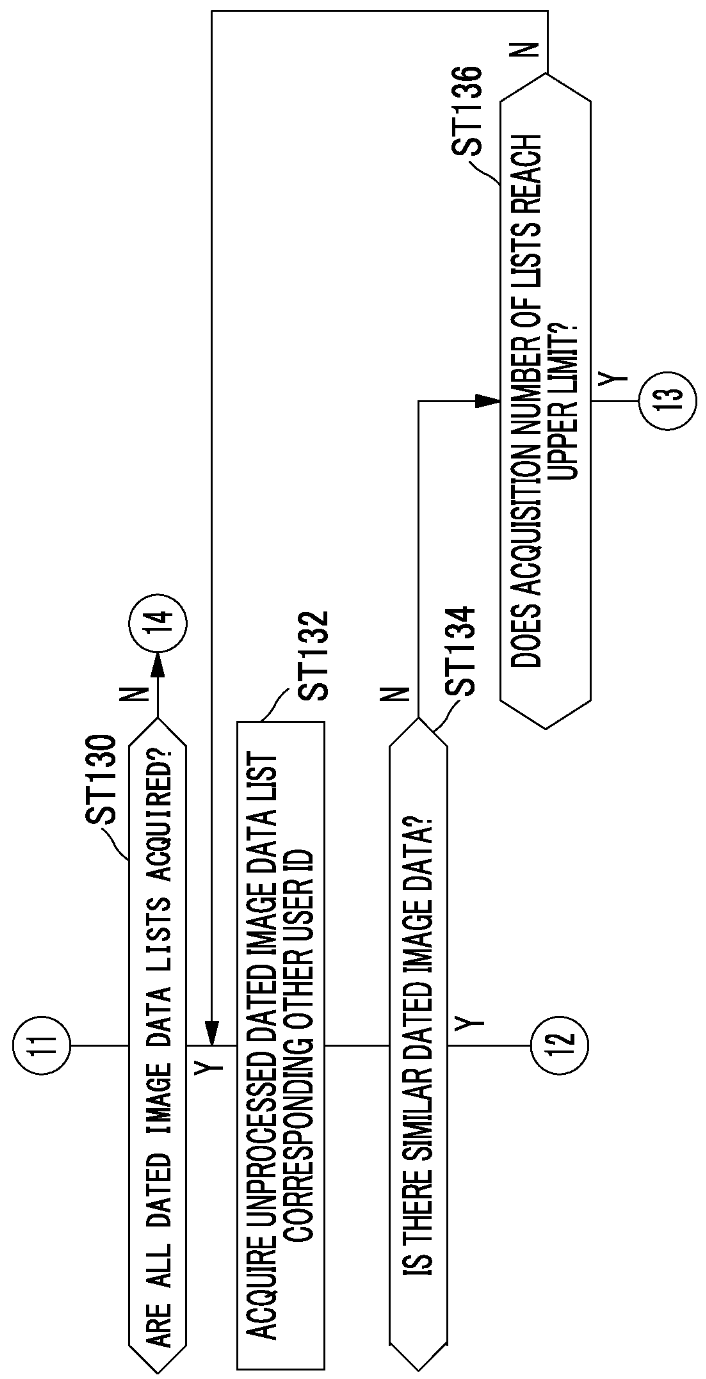
FIG. 49B is a continuation of the flowchart shown in FIG. 49A.

In this case, by executing the date addition process shown in FIGS. 49A and 49B, in a case in which a plurality of the dated image data lists are associated with the specific user, the CPU 60 acquires the dated image data for the subject, which is similar to the subject indicated by the dateless image data, in order from the dated image data list having a higher priority based on image data included for each dated image data list among the plurality of dated image data lists associated with the specific user.

In addition, in each of the embodiments described above, in a case in which the dated image data similar to the dateless image data is not present in the dated image data list relating to the specific user by executing the date addition process, the date is not added to the dateless image data, but the technology of the present disclosure is not limited to this. For example, in a case in which the dated image data similar to the dateless image data is not present in the dated image data list relating to the specific user, the dated image data similar to the dateless image data may be acquired from the dated image data list relating to the user 16 other than the specific user.

In this case, by executing the date addition process shown in FIGS. 49A and 49B, in a case in which the dated image data for the subject, which is similar to the subject indicated by the dateless image data, is not included in the dated image data list associated with the specific user, the CPU 60 acquires the dated image data for the subject, which is similar to the subject indicated by the dateless image data, from an image data group associated with at least one user other than the specific user among the plurality of users.

Here, a form example in which the priorities are added to the plurality of dated image data lists and the dated image data lists having higher priorities are acquired in order, and a form example in which the dated image data similar to the dateless image data is acquired from the dated image data list relating to the user 16 other than the specific user are described in more detail with reference to FIGS. 49A and 49B.

The flowcharts shown in FIGS. 49A and 49B are different from the flowchart shown in FIG. 40 in that step ST104A is provided instead of step ST104, step ST108B is provided instead of step ST108, and step ST130 to step ST136 are further provided. It should be noted that, in FIG. 49A, the same steps as those in the flowchart shown in FIG. 40 are designated by the same step numbers, and the description thereof will be omitted.

In step ST104A shown in FIG. 49A, the image data list acquisition unit 60Q acquires, from the storage 62, the dated image data list having the highest priority among the unprocessed dated image data lists corresponding to the user IDs extracted in step ST102. The highest priority means that the priority is highest. In addition, in this step ST104A, the unprocessed dated image data list refers to the dated image data list that has not yet been processed in step ST108B.

In step ST108B, the determination unit 60P determines whether or not the dated image data similar to the dateless image data extracted in step ST106 is present in the dated image data list acquired in step ST104A. In step ST108B, in a case in which the dated image data similar to the dateless image data extracted in step ST106 is present in the dated image data list acquired in step ST104A, a positive determination is made, and the date addition process proceeds to step ST110. In step ST108B, in a case in which the dated image data similar to the dateless image data extracted in step ST106 is not present in the dated image data list acquired in step ST104A, a negative determination is made, and the date addition process proceeds to step ST130 shown in FIG. 49B.

In step ST130, the determination unit 60P determines whether all the dated image data lists corresponding to the user IDs extracted in step ST102 are acquired in step ST104. In step ST130, in a case in which all the dated image data lists corresponding to the user IDs extracted in step ST102 are not acquired in step ST104, a negative determination is made, and the date addition process proceeds to step ST104A shown in FIG. 49A. In step ST130, in a case in which all the dated image data lists corresponding to the user IDs extracted in step ST102 are acquired in step ST104, a positive determination is made, and the date addition process proceeds to step ST132.

In step ST132, the image data list acquisition unit 60Q acquires the unprocessed dated image data list corresponding to the user ID other than the user ID extracted in step ST102 (hereinafter, also referred to as "other user ID") from the storage 62, and then the process proceeds to step ST134. It should be noted that, in this step ST132, the unprocessed dated image data list refers to the dated image data list that has not yet been used in the process of step ST134.

In step ST134, the determination unit 60P determines whether or not the dated image data similar to the dateless image data extracted in step ST106 is present in the dated image data list acquired in step ST132. In step ST134, in a case in which the dated image data similar to the dateless image data extracted in step ST106 is present in the dated image data list acquired in step ST132, a positive determination is made, and the date addition process proceeds to step ST110 shown in FIG. 49A. In step ST134, in a case in which the dated image data similar to the dateless image data extracted in step ST106 is not present in the dated image data list acquired in step ST132, a negative determination is made, and the date addition process proceeds to step ST136.

In step ST136, it is determined whether or not the number of times the dated image data list is acquired in step ST132 (hereinafter, also referred to as "acquisition number of lists") reaches an upper limit. The upper limit may be a fixed value, or may be a variable value. Examples of the variable value in this case include a value that can be changed in accordance with the instruction received by the reception device 54, the number of the dated image data lists corresponding to other user IDs, a value that is changed in accordance with the user 16 who provides the dateless image data, and/or a value that is changed periodically.

In a case in which the acquisition number of lists does not reached the upper limit in step ST136, a negative determination is made, and the date addition process proceeds to step ST132. In a case in which the acquisition number of lists reaches the upper limit in step ST136, a positive determination is made, and the date addition process proceeds to step ST120 shown in FIG. 49A.

Figure 50:
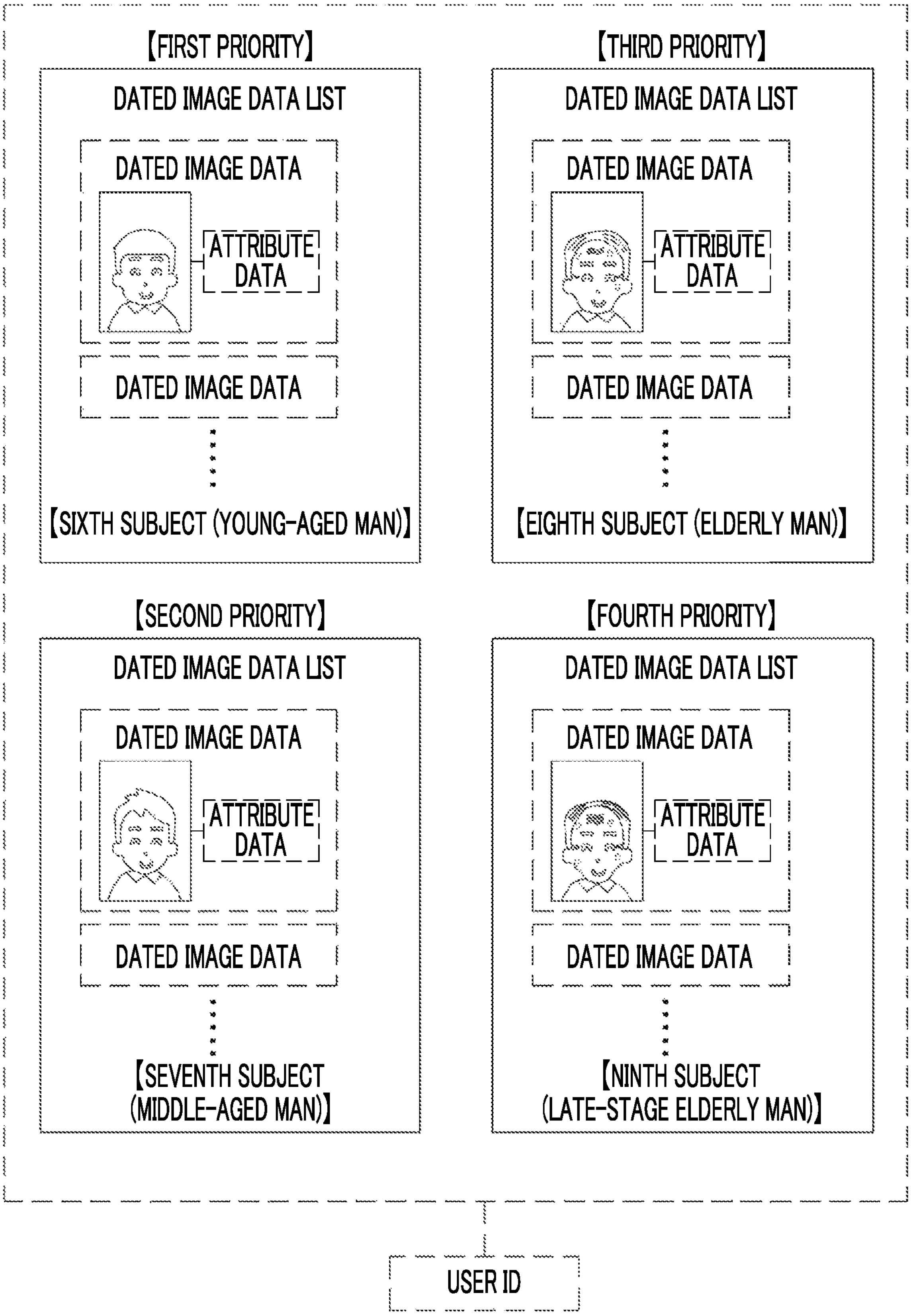
FIG. 50 is a conceptual diagram showing an example of a plurality of dated image data lists to which priorities are added.

FIG. 50 shows an example of the plurality of dated image data lists to which the priorities are added. In the example shown in FIG. 50, sixth to ninth subject image data lists associated with the user ID relating to the specific user are shown as the plurality of dated image data lists to which the priorities are added. The sixth subject image data list is a dated image data list consisting of the plurality of dated image data in which a sixth subject is reflected. The seventh subject image data list is a dated image data list consisting of the plurality of dated image data in which a seventh subject is reflected. The eighth subject image data list is a dated image data list consisting of the plurality of dated image data in which an eighth subject is reflected. The ninth subject image data list is a dated image data list consisting of the plurality of dated image data in which a ninth subject is reflected.

In the example shown in FIG. 50, a young-aged man is shown as an example of the sixth subject. In addition, in the example shown in FIG. 50, an example of a middle-aged man is shown as an example of the seventh subject. In addition, in the example shown in FIG. 50, an example of an elderly man is shown as an example of the eighth subject. In addition, in the example shown in FIG. 50, an example of a late-stage elderly man is shown as an example of the ninth subject.

The image data list creation unit 60M executes the image recognition process with respect to the person image data associated with the dated image data, and classifies the young-aged man, the middle-aged man, the elderly man, and the late-stage elderly man to create the sixth to ninth subject image data lists. In general, the physical aspects of the young-aged man, the middle-aged man, the elderly man, and the late-stage elderly man are different. The physical aspect refers to, for example, an aspect of the head (for example, at least one of a face or hair). In general, since persons change their face roundness, hair volume, and hair color with aging, the young-aged man, the middle-aged man, the elderly man, and the late-stage elderly man can be classified by executing the image recognition process based on these features.

The magnitude of the change in the appearance with aging of the young-aged man, the middle-aged man, the elderly man, and the late-stage elderly man is, generally, "young-aged man>middle-aged man>elderly man>late-stage elderly man" That is, the change in appearance with aging is greater as the age is younger. For example, as the age is younger, the contour of the face is more rounded, and a change amount of the roundness is larger than that of the elderly person.

Therefore, the dated image data in which the man of an age in which the change in the physical aspect with aging is relatively large is reflected as the subject has a higher possibility that the degree of variation in the reflected subject than the dated image data in which the man of an age in which the change in the physical aspect with aging is relatively small is reflected as the subject. This means that a possibility that the date to be added to the dateless image data can be accurately and quickly specified is higher in a case in which the date is obtained from the dated image data in which the man of the age in which the change in the physical aspect with aging is relatively large is reflected as the subject than a case in which the date is obtained from the dated image data in which the man of the age in which the change in the physical aspect with aging is relatively small is reflected as the subject. Therefore, in the example shown in FIG. 26, the first priority is added to the sixth subject image data list, the second priority is added to the seventh subject image data list, the third priority is added to the eighth subject image data list, and the fourth priority is added to the ninth subject image data list.

It should be noted that, in the example shown in FIG. 26, the form example is shown in which the dated image data list is created for each generation of man, but the technology of the present disclosure is not limited to this. For example, the dated image data list may be created for each generation of woman In addition, the generation may be set more finely, or the generation may be set more roughly.

In addition, the technology of the present disclosure is not limited to the form example in which the dated image data list is created for each generation, and for example, the dated image data list having a different priority for each characteristic of the user 16 may be created. Examples of the characteristic of the user 16 include a family structure, an address, a job, and a hobby. In addition, the dated image data list having a larger number of frames of the dated image data may have a higher priority. Further, the dated image data list having a larger number of frames of the dated image data to which different dates are added may have a higher priority.

By executing the date addition process shown in FIGS. 49A and 49B in this way, the dated image data for the subject, which is similar to the subject indicated by the dateless image data, is acquired in order from the dated image data list having a higher priority based on the dated image data included in each dated image data list among the plurality of dated image data lists. Therefore, with the present configuration, the date to be added to the dateless image data can be accurately and quickly specified as compared with a case in which the dated image data is acquired from the dated image data list regardless of the priority based on the dated image data included in the dated image data list.

In addition, by executing the date addition process shown in FIGS. 49A and 49B, the dated image data similar to the dateless image data is acquired from the dated image data list relating to the user 16 other than the specific user. Therefore, with the present configuration, it is possible to increase a possibility of adding an appropriate date to the dateless image data as compared with a case in which the dated image data, which is the derivation target of the date, is acquired only from the dated image data list relating to the specific user.

In addition, in each of the embodiments described above, the form example has been described in which the dated image data list in which the dated image data with the person image and the dated image data with the non-person image are mixed is created, but the technology of the present disclosure is not limited to this. For example, the dated image data may be roughly classified into the dated image data with the person image and the dated image data with the non-person image, and the image data list creation unit 60M may acquire only the dated image data with the non-person image to create the dated image data list using the acquired dated image data with the non-person image. With the present configuration, it is possible to prevent the date added to the dated image data with the person image from being added to the dateless image data.

In addition, in each of the embodiments described above, the form example has been described in which the dated image data which is the creation target of the dated image data list is limited based on the similarity degree of the person reflected in the image data as the subject, the similarity degree of the geographical distribution of the imaging positions, and the similarity degree of the user information, but the technology of the present disclosure is not limited to this. For example, by executing the dated image data list creation process shown in FIG. 51 as an example, the CPU 60 may limit the dated image data, which is the creation target of the dated image data list, among the plurality of dated image data to the image data in which a person having a specific relationship is reflected.

Here, the person having the specific relationship refers to a friend, a family member, a relative, an employee belonging to a specific organization, and the like. The person having the specific relationship may be registered in the server 14 via the user device 12 by each of the plurality of users 16. In addition, by performing the image recognition process on the image data group held by the plurality of user devices 12 by the CPU 42 and/or 60, the image data in which the person having the specific relationship is reflected as the subject may be specified, and the specified image data may be registered in the storage 62 of the server 14. In addition, in a case in which the number of frames of the dated image data in which the same person is reflected as the subject is equal to or larger than a certain number (for example, equal to or larger than 10) in the folder in the user device 12, the dated image data in which the same person is reflected as the subject in the folder may be registered in the server 14 as the image data in which the person having the specific relationship is reflected.

Figure 51:
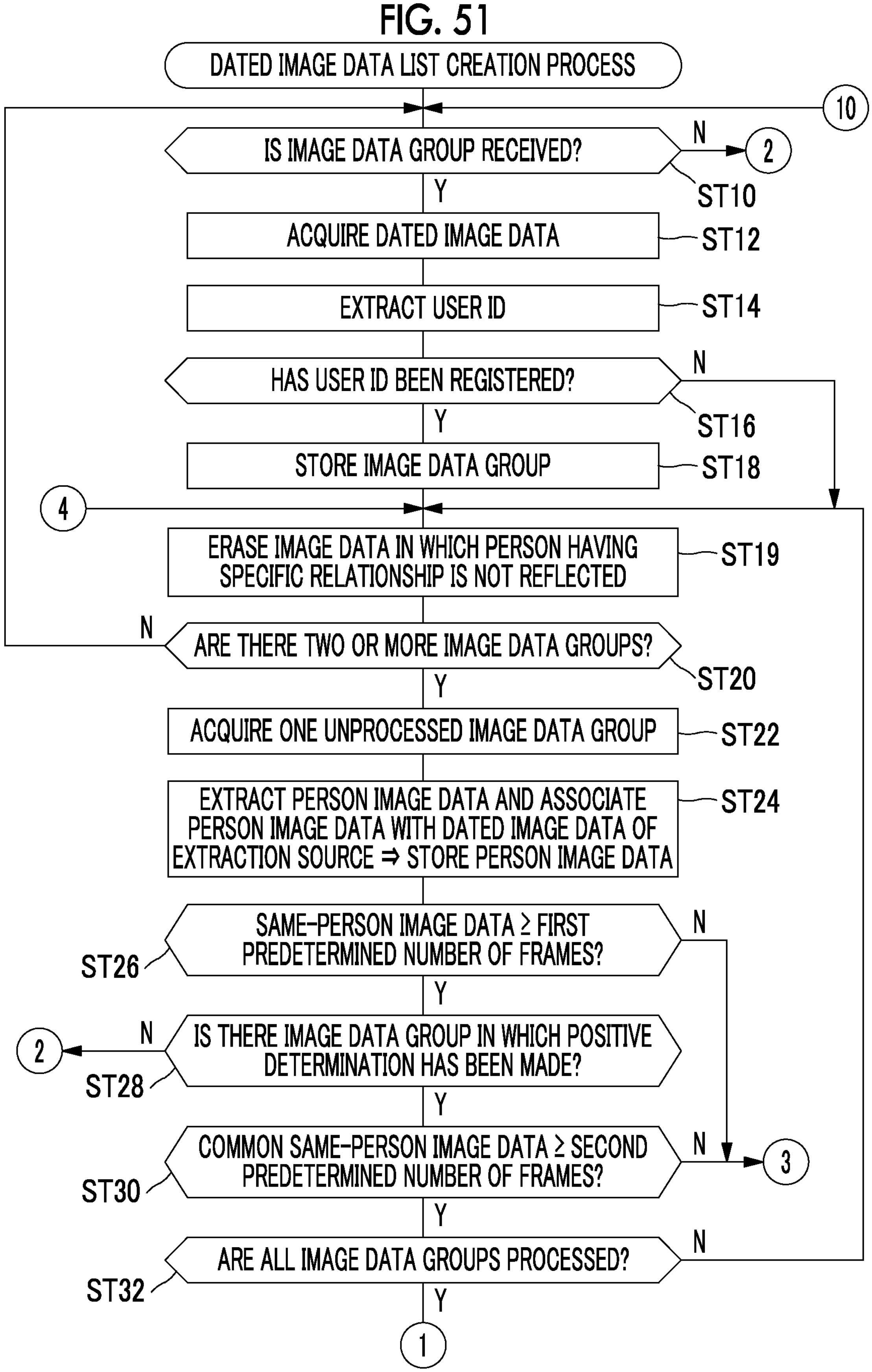
FIG. 51 is a flowchart showing a modification example of the flow of the dated image data list creation process.

The flowchart shown in FIG. 51 is different from the flowchart shown in FIG. 39A in that step ST19 is provided between step ST18 and step ST20. It should be noted that, in FIG. 51, the same steps as those in the flowchart shown in FIG. 39A are designated by the same step numbers, and the description thereof will be omitted.

In step ST19 shown in FIG. 51, the erasing unit 60F erases the dated image data in which the person having the specific relationship is not reflected as the subject from the image data group stored in the storage 62. As a result, among the plurality of dated image data, the dated image data which is the creation target of the dated image data list is limited to the image data in which the person having the specific relationship is reflected. Therefore, with the present configuration, an appropriate date can be quickly derived in a case in which the person having the specific relationship is reflected in the dateless image data as the subject as compared with a case in which the dated image data which is the creation target of the dated image data list is not limited to the image data in which the person having the specific relationship is reflected.

In addition, in each of the embodiments described above, the data including the user ID, the date, and the GPS information is described as an example of the attribute data included in the dated image data, but the technology of the present disclosure is not limited to this. For example, the generation specification information may be added to the plurality of dated image data, and the CPU 60 may limit the dated image data, which is the creation target of the dated image data list, among the plurality of dated image data by the generation specified by the generation specification information.

Figure 52:
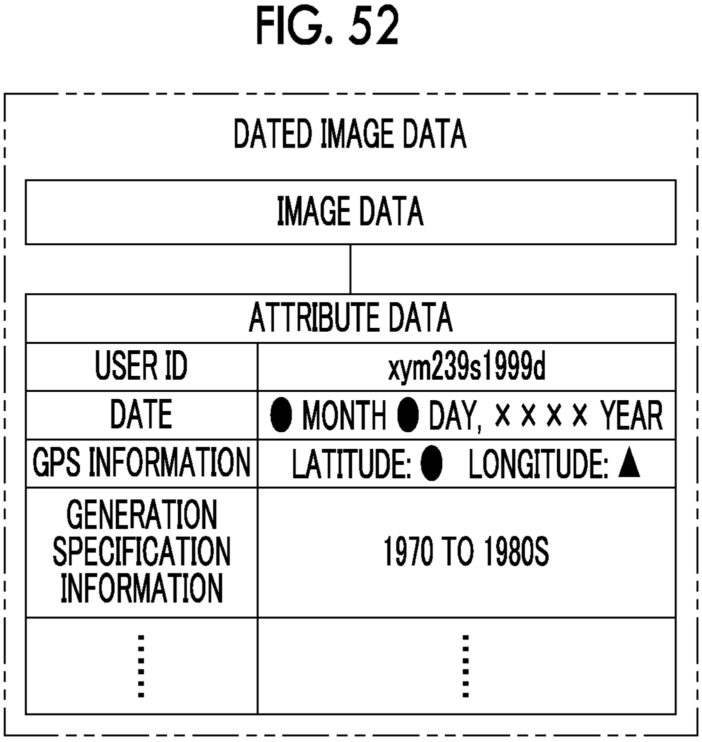
FIG. 52 is a conceptual diagram showing a modification example of attribute data included in the dated image data.
Figure 53:
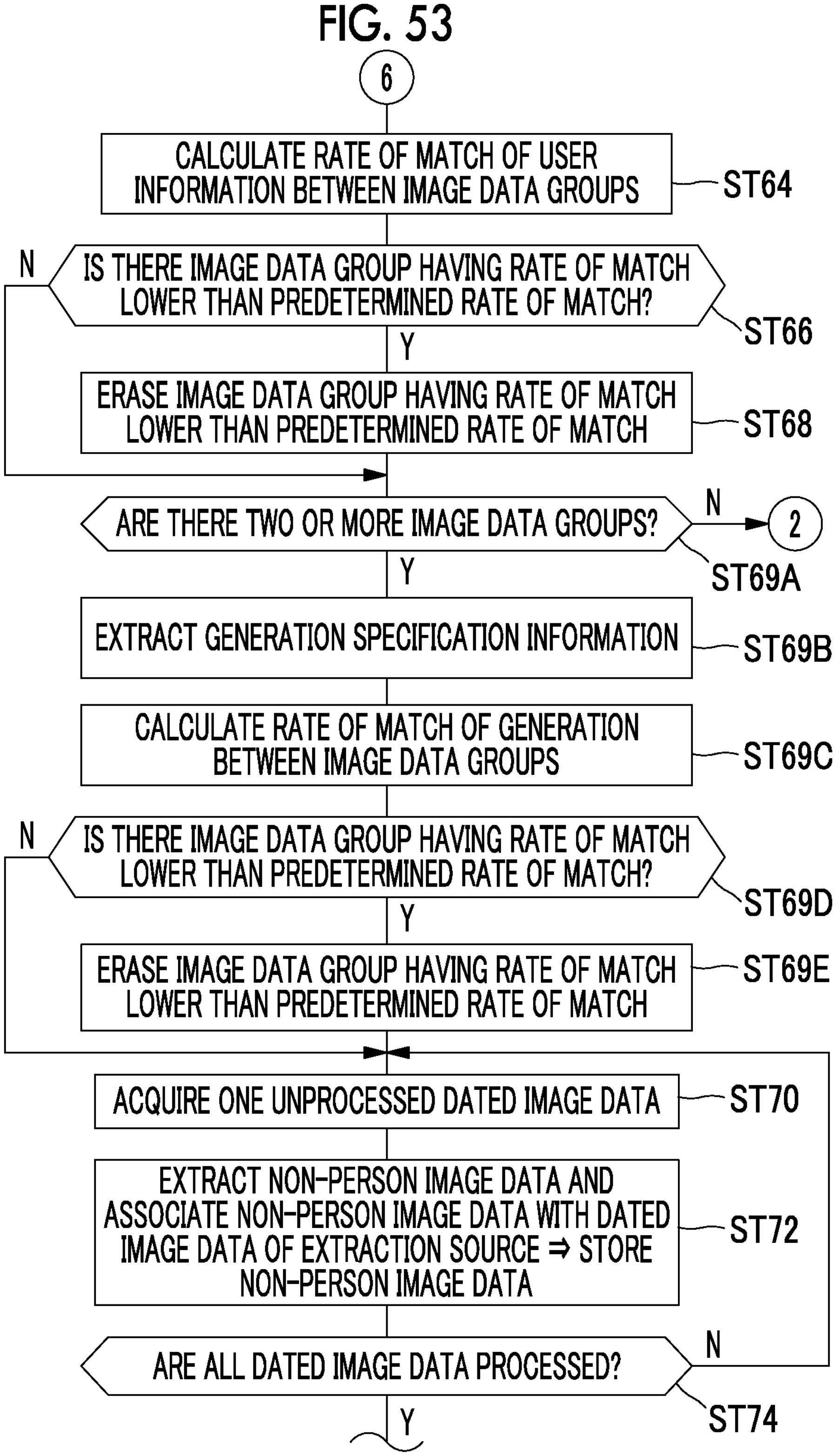
FIG. 53 is a modification example of the flowchart shown in FIG. 39E.

In this case, as shown in FIG. 52 as an example, the dated image data list creation process shown in FIG. 53 as an example need only be executed by including the generation specification information in the attribute data. The flowchart shown in FIG. 53 is different from the flowchart shown in FIG. 39E in that step ST69A to step ST69E are provided between step ST68 and step ST70. It should be noted that, in FIG. 53, the same steps as those in the flowchart shown in FIG. 39E are designated by the same step numbers, and the description thereof will be omitted.

In step ST69A shown in FIG. 53, the CPU 60 determines whether or not two or more image data groups are stored in the storage 62. In step ST69A, in a case in which the two or more image data groups are not stored in the storage 62, a negative determination is made, and the dated image data list creation process proceeds to step ST80 (see FIG. 39E). In step ST69A, in a case in which the two or more image data groups are stored in the storage 62, a positive determination is made, and the dated image data list creation process proceeds to step ST69B.

In step ST69B, the CPU 60 extracts the generation specification information from all the image data groups stored in the storage 62, and then the dated image data list creation process proceeds to step ST69C.

In step ST69C, the CPU 60 calculates the rate of match of the generation between the image data groups using all the generation specification information extracted in step ST69B, and then the dated image data list creation process proceeds to step ST69D. The rate of match of the generation refers to the rate of match between the generation specification information. For example, the rate of match between the generations from a year of 1970 to a year of 1980 is 100%, the rate of match between the generations from a year of 1970 to a year of 1980 and the generations from a year of 1975 to a year of 1985 is 50%, and the rate of match between the generations from a year of 1970 to a year of 1980 and the generations from a year of 1930 to a year of 1940 is 0%.

In step ST69D, the CPU 60 determines whether or not the image data group of which a rate of match of the generation is equal to or higher than a predetermined rate of match (for example, 50%) is stored in the storage 62. It should be noted that, in this step ST69D, a fixed value is adopted as the predetermined rate of match. It should be noted that this is merely an example, and the predetermined rate of match used in step ST69D may be a variable value. Examples of the variable value include a value that can be changed in accordance with the instruction received by the reception device 54, and a value that is changed periodically.

In step ST69D, in a case in which the image data group of which the rate of match of the generation is equal to or higher than the predetermined rate of match is not stored in the storage 62, a negative determination is made, and the dated image data list creation process proceeds to step ST70. In step ST69D, in a case in which the image data group of which the rate of match of the generation is equal to or higher than the predetermined rate of match is stored in the storage 62, a positive determination is made, and the dated image data list creation process proceeds to step ST69E.

In step ST69E, the CPU 60 erases the image data group of which the rate of match of the generation is lower than the predetermined rate of match from the storage 62, and then the dated image data list creation process proceeds to step ST70.

By executing the processes of step ST69A to step ST69E in this way, among the plurality of dated image data, the dated image data which is the creation target of the dated image data list limited by the generation specified by the generation specification information. Therefore, with the present configuration, it is possible to increase a possibility that an appropriate date is added to the dateless image data as compared with a case in which the dated image data which is the creation target of the dated image data list is not limited by the generation.

Figure 54:
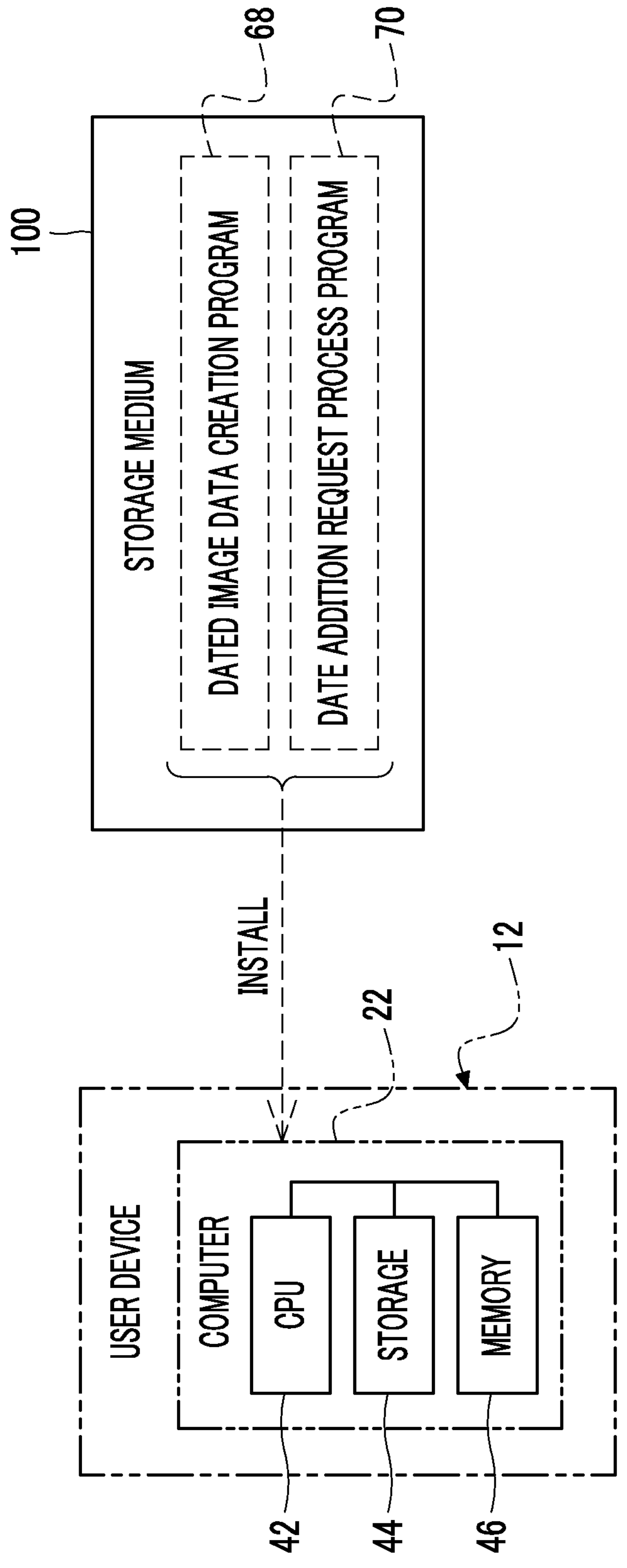
FIG. 54 is a block diagram showing an example of an aspect in which a dated image data creation program and a date addition request process program are installed in a computer in the user device from a storage medium that stores the dated image data creation program and the date addition request process program.

In addition, in each of the embodiments described above, the form example has been described in which the dated image data creation program 68 and the date addition request process program 70 (hereinafter, referred to as "terminal side program" without designating reference numeral in a case in which the distinction between these programs is not necessary) are stored in the storage 44, but the technology of the present disclosure is not limited to this. As shown in FIG. 54, for example, the terminal side program may be stored in the storage medium 100. The storage medium 100 is a non-transitory storage medium. Examples of the storage medium 100 include any portable storage medium, such as an SSD or a USB memory.

The terminal side program stored in the storage medium 100 is installed in the computer 22. The CPU 42 executes the dated image data creation process in accordance with the dated image data creation program 68, and executes the date addition request process in accordance with the date addition request process program 70. It should be noted that, in the following, for convenience of description, the dated image data creation process and the date addition request process are referred to as "terminal side process" in a case in which the distinction is not necessary.

In addition, the terminal side program may be stored in a storage unit of another computer, a server, or the like connected to the computer 22 via a communication network (not shown), and the terminal side program may be downloaded in response to a request of the user device 12 and installed in the computer 22.

It should be noted that, the entire terminal side program does not have to be stored in a storage unit of another computer, a server, or the like connected to the computer 22, or the storage 44, and a part of the terminal side programs may be stored.

In the example shown in FIG. 54, the CPU 42 is a single CPU, but may be a plurality of CPUs. In addition, a GPU may be applied instead of the CPU 42 or together with the CPU 42.

In the example shown in FIG. 54, although the computer 22 has been described as an example, the technology of the present disclosure is not limited to this, and a device including an ASIC, an FPGA, and/or a PLD may be applied instead of the computer 22. In addition, instead of the computer 22, a hardware configuration and a software configuration may be used in combination.

As the hardware resource for executing the terminal side process described in each of the embodiments described above, the following various processors can be used. Examples of the processor include software, that is, a CPU, which is a general-purpose processor that functions as the hardware resource for executing the terminal side process by executing the program. In addition, examples of the processor include a dedicated electric circuit which is a processor having a circuit configuration designed to be dedicated to executing a specific process, such as an FPGA, a PLD, or an ASIC. A memory is built in or connected to any processor, and each processor executes the terminal side process by using the memory.

The hardware resource for executing the terminal side process may be composed of one of those various processors or may be composed of a combination of two or more processors of the same type or different types (for example, a combination of a plurality of FPGAs or a combination of a CPU and an FPGA). In addition, the hardware resource for executing the terminal side process may be one processor.

As an example of configuring with one processor, first, there is a form in which one processor is composed of a combination of one or more CPUs and software, and this processor functions as the hardware resource for executing the terminal side process. Secondly, as represented by SoC, there is a form in which a processor that realizes the functions of the entire system including a plurality of hardware resources for executing the terminal side process with one IC chip is used. As described above, the terminal side process is realized by using one or more of the various processors described above as the hardware resource.

Further, as the hardware structure of these various processors, more specifically, it is possible to use an electric circuit in which circuit elements, such as semiconductor elements, are combined. In addition, the terminal side process is merely an example. Therefore, it is needless to say that unnecessary steps may be deleted, new steps may be added, or the process order may be changed within a range that does not deviate from the gist.

Figure 55:
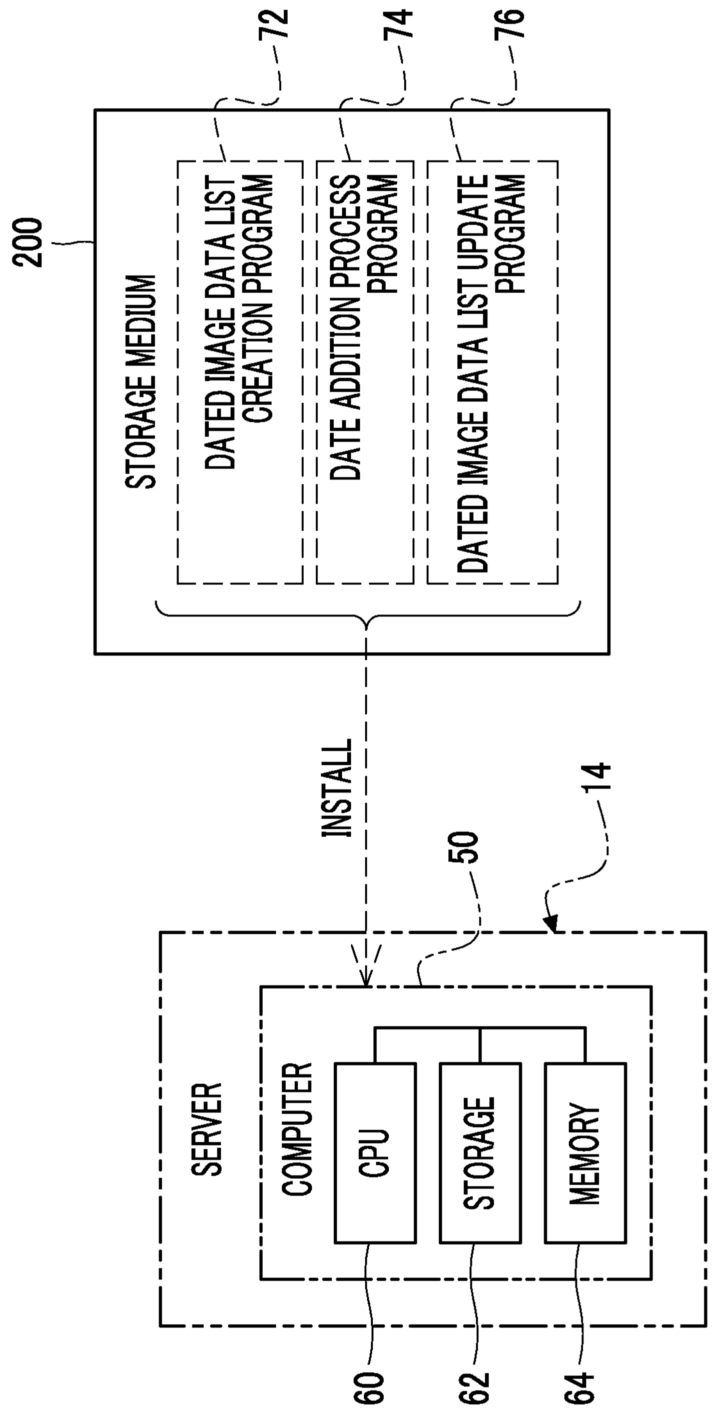
FIG. 55 is a block diagram showing an example of an aspect in which a dated image data list creation program, a date addition process program, and a dated image data list update program are installed in the computer in the server from a storage medium that stores the dated image data list creation program, the date addition process program, and the dated image data list update program.

In addition, in each of the embodiments described above, the form example has been described in which the dated image data list creation program 72, the date addition process program 74, and the dated image data list update program 76 (hereinafter, referred to as "server side program" without designating reference numerals in a case in which the distinction between these programs is not necessary) are stored in the storage 62, but the technology of the present disclosure is not limited to this. As shown in FIG. 55, for example, the server side program may be stored in a storage medium 200. The storage medium 200 is a non-transitory storage medium. Examples of the storage medium 200 include any portable storage medium, such as an SSD or a USB memory. It should be noted that the server side program is an example of a "program" according to the technology of the present disclosure.

The server side program stored in the storage medium 200 is installed in the computer 50. The CPU 60 executes the dated image data list creation process in accordance with the dated image data list creation program 72, executes the date addition process in accordance with the date addition process program 74, and executes the dated image data list update process in accordance with the dated image data list update program 76. It should be noted that, in the following, for convenience of description, the dated image data creation process and the date addition request process are referred to as "server side process" in a case in which the distinction is not necessary.

In addition, the server side program may be stored in a storage unit of another computer, a server, or the like connected to the computer 50 via a communication network (not shown), and the server side program may be downloaded in response to a request of the server 14 and installed in the computer 50.

It should be noted that, the entire server side program does not have to be stored in a storage unit of another computer, a server, or the like connected to the computer 50, or the storage 62, and a part of the server side programs may be stored.

In the example shown in FIG. 55, the CPU 60 is a single CPU, but may be a plurality of CPUs. In addition, a GPU may be applied instead of the CPU 60 or together with the CPU 60.

In the example shown in FIG. 55, although the computer 50 has been described as an example, the technology of the present disclosure is not limited to this, and a device including an ASIC, an FPGA, and/or a PLD may be applied instead of the computer 50. In addition, instead of the computer 50, a hardware configuration and a software configuration may be used in combination.

As the hardware resource for executing the server side process described in each of the embodiments described above, the following various processors can be used. Examples of the processor include software, that is, a CPU, which is a general-purpose processor that functions as the hardware resource for executing the server side process by executing the program. In addition, examples of the processor include a dedicated electric circuit which is a processor having a circuit configuration designed to be dedicated to executing a specific process, such as an FPGA, a PLD, or an ASIC. A memory is built in or connected to any processor, and each processor executes the server side process by using the memory.

The hardware resource for executing the server side process may be composed of one of those various processors or may be composed of a combination of two or more processors of the same type or different types (for example, a combination of a plurality of FPGAs or a combination of a CPU and an FPGA). In addition, the hardware resource for executing the server side process may be one processor.

As an example of configuring with one processor, first, there is a form in which one processor is composed of a combination of one or more CPUs and software, and this processor functions as the hardware resource for executing the server side process. Secondly, as represented by SoC, there is a form in which a processor that realizes the functions of the entire system including a plurality of hardware resources for executing the server side process with one IC chip is used. As described above, the server side process is realized by using one or more of the various processors described above as the hardware resource.

Further, as the hardware structure of these various processors, more specifically, it is possible to use an electric circuit in which circuit elements, such as semiconductor elements, are combined. In addition, the server side process described above is merely an example. Therefore, it is needless to say that unnecessary steps may be deleted, new steps may be added, or the process order may be changed within a range that does not deviate from the gist.

The above described contents and shown contents are the detailed description of the parts according to the technology of the present disclosure, and are merely examples of the technology of the present disclosure. For example, the above descriptions of the configurations, the functions, the actions, and the effects are the descriptions of examples of the configurations, the functions, the actions, and the effects of the parts according to the technology of the present disclosure. Accordingly, it is needless to say that unnecessary parts may be deleted, new elements may be added, or replacements may be made with respect to the above described contents and shown contents within a range that does not deviate from the gist of the technology of the present disclosure. In addition, in order to avoid complications and facilitate understanding of the parts according to the technology of the present disclosure, in the above described contents and shown contents, the descriptions of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

Regarding the embodiments described above, the following supplementary notes will be further disclosed.

(Supplementary Note 1)

An information processing apparatus comprising a processor, and a memory built in or connected to the processor, in which the processor creates a dated image data list by classifying a plurality of dated image data to which dates are added, associates the dated image data list with a specific user, acquires the dated image data for a subject, which is similar to a subject indicated by dateless image data of the specific user, from the dated image data list associated with the specific user, and derives a date to be added to the dateless image data, based on the date added to the acquired dated image data, the plurality of dated image data are image data of a plurality of users including the specific user, the dated image data list is created for each subject by classifying the plurality of dated image data for each subject indicated by each of the plurality of dated image data, and the dated image data list for a subject, which is similar to a subject indicated by the dated image data of the specific user, is associated with the specific user.

(Supplementary Note 2)

The information processing apparatus according to Supplementary Note 1, in which the dated image data list is created by classifying the plurality of dated image data for each subject of which an aspect of a temporal change is able to be visually specified.

(Supplementary Note 3)

The information processing apparatus according to Supplementary Note 1 or 2, in which the dates added to the plurality of dated image data are imaging dates, and the dated image data list includes the plurality of dated image data having different imaging dates.

(Supplementary Note 4)

The information processing apparatus according to any one of Supplementary Notes 1 to 3, in which the plurality of users are a user group that satisfies a condition that registration to agree to share information including the dated image data has been made.

(Supplementary Note 5)

The information processing apparatus according to any one of Supplementary Notes 1 to 4, in which an image data group is associated with each of the plurality of users, and the plurality of users are a user group that satisfies a condition that the image data groups are similar to each other.

(Supplementary Note 6)

The information processing apparatus according to any one of Supplementary Notes 1 to 5, in which the plurality of users are a user group that satisfies a condition that registered user information is similar.

(Supplementary Note 7)

The information processing apparatus according to any one of Supplementary Notes 1 to 6, in which the dated image data is roughly classified into person inclusion image data in which a person is reflected as the subject, and person non-inclusion image data in which only a non-person object is reflected as the subject, and the processor acquires only the person non-inclusion image data as the dated image data, and creates the dated image data list using the acquired person non-inclusion image data.

(Supplementary Note 8)

The information processing apparatus according to any one of Supplementary Notes 1 to 7, in which the processor limits the dated image data, which is a creation target of the dated image data list, among the plurality of dated image data to image data in which a person having a specific relationship is reflected.

(Supplementary Note 9)

The information processing apparatus according to any one of Supplementary Notes 1 to 8, in which the plurality of dated image data includes image data to which position specification information for specifying an imaging position is added, and the processor limits the dated image data, which is a creation target of the dated image data list, among the plurality of dated image data to image data obtained by being captured in a range determined based on the position specification information.

(Supplementary Note 10)

The information processing apparatus according to any one of Supplementary Notes 1 to 9, in which generation specification information for specifying a generation of the user is added to the plurality of dated image data, and the processor limits the dated image data, which is a creation target of the dated image data list, among the plurality of dated image data by the generation specified by the generation specification information.

(Supplementary Note 11)

The information processing apparatus according to any one of Supplementary Notes 1 to 10, in which, in a case in which the dated image data for the subject, which is similar to the subject indicated by the dateless image data, is not included in the dated image data list associated with the specific user, the processor acquires the dated image data for the subject, which is similar to the subject indicated by the dateless image data, from an image data group associated with at least one user other than the specific user among the plurality of users.

(Supplementary Note 12)

The information processing apparatus according to any one of Supplementary Notes 1 to 11, in which, on a condition that first new image data is provided as new image data as the dated image data and an image quality of the first new image data is equal to or higher than a reference image quality, the processor updates the dated image data list by adding the first new image data to the dated image data list.

(Supplementary Note 13)

The information processing apparatus according to any one of Supplementary Notes 1 to 12, in which, in a case in which a subject indicated by second new image data newly provided as the dated image data and the subject indicated by the dated image data included in the dated image data list associated with the specific user are not similar to each other, the processor updates the dated image data list by adding the second new image data to the dated image data list associated with the specific user.

(Supplementary Note 14)

The information processing apparatus according to Supplementary Note 12 or 13, in which, on a condition that the dated image data list associated with the specific user is updated, the processor acquires the dated image data for the subject, which is similar to the subject indicated by the dateless image data of the specific user, from the updated dated image data list associated with the specific user.

(Supplementary Note 15)

The information processing apparatus according to any one of Supplementary Notes 1 to 14, in which the processor includes feature data indicating a feature of a same-date image data group to which the same date is added among the plurality of dated image data in the dated image data list instead of the same-date image data group.

(Supplementary Note 16)

The information processing apparatus according to any one of Supplementary Notes 1 to 15, in which, in a case in which a plurality of the dated image data lists are associated with the specific user, the processor acquires the dated image data for the subject, which is similar to the subject indicated by the dateless image data, in order from the dated image data list having a higher priority based on image data included for each date imaged data list among the plurality of dated image data lists associated with the specific user.

(Supplementary Note 17)

The information processing apparatus according to any one of Supplementary Notes 1 to 16, in which the processor presents the derived date to a presentation device.

(Supplementary Note 18)

The information processing apparatus according to any one of Supplementary Notes 1 to 17, in which the processor updates the dated image data list associated with the specific user in accordance with an instruction received by a reception device.

(Supplementary Note 19)

The information processing apparatus according to any one of Supplementary Notes 1 to 18, in which the processor creates the dated image data list for each subject by classifying the plurality of dated image data for each subject of a person including a physical aspect appearing with aging.

(Supplementary Note 20)

The information processing apparatus according to Supplementary Note 19, in which the physical aspect includes an aspect of a head including at least one of a face or hair.

(Supplementary Note 21)

The information processing apparatus according to any one of Supplementary Notes 1 to 20, in which, in a case in which a plurality of the dated image data lists are associated with the specific user, the processor acquires the dated image data for the subject, which is similar to the subject indicated by the dateless image data, in order from the dated image data list in which the number of frames of the dated image data is large among the plurality of dated image data lists associated with the specific user.

(Supplementary Note 22)

The information processing apparatus according to Supplementary Note 21, in which the number of the dated image data is the number of the dated image data to which different dates are added.

(Supplementary Note 23)

The information processing apparatus according to any one of Supplementary Notes 1 to 22, in which an image data group is associated with each of the plurality of users, and the plurality of users are a user group that satisfies a condition that the image data groups are similar to each other, and the condition that the image data groups are similar to each other includes a condition that a plurality of image data to which the same person is allocated is included in the image data group by a predetermined number or more.

(Supplementary Note 24)

The information processing apparatus according to Supplementary Note 23, in which position specification information for specifying an imaging position is added to the image data group, and the condition that the image data groups are similar to each other includes a condition that a distribution determined based on the position specification information as geographical distribution of the imaging positions is similar between the image data groups.

(Supplementary Note 25)

An information processing method including creating a dated image data list by classifying a plurality of dated image data to which dates are added, associating the dated image data list with a specific user, acquiring the dated image data for a subject, which is similar to a subject indicated by dateless image data of the specific user, from the dated image data list associated with the specific user, and deriving a date to be added to the dateless image data, based on the date added to the acquired dated image data, in which the plurality of dated image data are image data of a plurality of users including the specific user, the dated image data list is created for each subject by classifying the plurality of dated image data for each subject indicated by each of the plurality of dated image data, and the dated image data list for a subject, which is similar to a subject indicated by the dated image data of the specific user, is associated with the specific user.

(Supplementary Note 26)

A program causing a computer to execute a process including creating a dated image data list by classifying a plurality of dated image data to which dates are added, associating the dated image data list with a specific user, acquiring the dated image data for a subject, which is similar to a subject indicated by dateless image data of the specific user, from the dated image data list associated with the specific user, and deriving a date to be added to the dateless image data, based on the date added to the acquired dated image data, in which the plurality of dated image data are image data of a plurality of users including the specific user, the dated image data list is created for each subject by classifying the plurality of dated image data for each subject indicated by each of the plurality of dated image data, and the dated image data list for a subject, which is similar to a subject indicated by the dated image data of the specific user, is associated with the specific user.

What is claimed is:

1. An information processing apparatus comprising:

a processor; and a memory built in or connected to the processor, wherein the processor creates a dated image data list by classifying a plurality of dated image data to which dates are added, associates the dated image data list with each of a plurality of users including a specific user, acquires the dated image data for a subject, which is similar to a subject indicated by dateless image data of the specific user, from the dated image data list associated with the specific user, and derives a date to be added to the dateless image data, based on the date added to the acquired dated image data, the plurality of dated image data are image data of the plurality of users including the specific user, the dated image data list is created for each subject by classifying the plurality of dated image data for each subject indicated by each of the plurality of dated image data, the dated image data list for a subject, which is similar to a subject indicated by the dated image data of the specific user, is associated with the specific user, the plurality of users provide the plurality of dated image data to the information processing apparatus, and in a case in which a plurality of the dated image data lists are associated with the specific user, the processor acquires the dated image data for the subject, which is similar to the subject indicated by the dateless image data, in order from the dated image data list having a higher priority based on image data included for each dated image data list among the plurality of dated image data lists associated with the specific user.

2. The information processing apparatus according to claim 1, wherein the dated image data list is created by classifying the plurality of dated image data for each subject of which an aspect of a temporal change is able to be visually specified.

3. The information processing apparatus according to claim 1, wherein the dates added to the plurality of dated image data are imaging dates, and the dated image data list includes the plurality of dated image data having different imaging dates.

4. The information processing apparatus according to claim 1, wherein the plurality of users are a user group that satisfies a condition that registration to agree to share information including the dated image data has been made.

5. The information processing apparatus according to claim 1, wherein each user among the plurality of users is associated with a respective image data group, and the plurality of users are a user group that satisfies a condition that the respective image data groups of the users are similar to each other.

6. The information processing apparatus according to claim 1, wherein the plurality of users are a user group that satisfies a condition that registered user information is similar.

7. The information processing apparatus according to claim 1, wherein the processor limits the dated image data, which is a creation target of the dated image data list, among the plurality of dated image data to image data in which a person having a specific relationship is reflected.

8. The information processing apparatus according to claim 1, wherein the plurality of dated image data includes image data to which position specification information for specifying an imaging position is added, and the processor limits the dated image data, which is a creation target of the dated image data list, among the plurality of dated image data to image data obtained by being captured in a range determined based on the position specification information.

9. The information processing apparatus according to claim 1, wherein generation specification information for specifying a generation of the user is added to the plurality of dated image data, and the processor limits the dated image data, which is a creation target of the dated image data list, among the plurality of date image data by the generation specified by the generation specification information.

10. The information processing apparatus according to claim 1, wherein, in a case in which the dated image data for the subject, which is similar to the subject indicated by the dateless image data, is not included in the dated image data list associated with the specific user, the processor acquires the dated image data for the subject, which is similar to the subject indicated by the dateless image data, from an image data group associated with at least one user other than the specific user among the plurality of users.

11. The information processing apparatus according to claim 1, wherein, on a condition that first new image data is provided as new image data as the dated image data and an image quality of the first new image data is equal to or higher than a reference image quality, the processor updates the dated image data list by adding the first new image data to the dated image data list.

12. The information processing apparatus according to claim 11, wherein, on a condition that the dated image data list associated with the specific user is updated, the processor acquires the dated image data for the subject, which is similar to the subject indicated by the dateless image data of the specific user, from the updated dated image data list associated with the specific user.

13. The information processing apparatus according to claim 1, wherein the processor replaces a same-date image data group, to which the same date is added, with feature data indicating a feature of the same-date image data group, and stores the feature data in the dated image data list.

14. The information processing apparatus according to claim 1, wherein the processor presents the derived date to a presentation device.

15. The information processing apparatus according to claim 1, wherein the processor updates the dated image data list associated with the specific user in accordance with an instruction received by a reception device.

16. An information processing apparatus comprising:

a processor; and a memory built in or connected to the processor, wherein the processor creates a dated image data list by classifying a plurality of dated image data to which dates are added, associates the dated image data list with a specific user, acquires the dated image data for a subject, which is similar to a subject indicated by dateless image data of the specific user, from the dated image data list associated with the specific user, and derives a date to be added to the dateless image data, based on the date added to the acquired dated image data, the plurality of dated image data are image data of a plurality of users including the specific user, the dated image data list is created for each subject by classifying the plurality of dated image data for each subject indicated by each of the plurality of dated image data, the dated image data list for a subject, which is similar to a subject indicated by the dated image data of the specific user, is associated with the specific user, the dated image data is roughly classified into person inclusion image data in which a person is reflected as the subject, and person non-inclusion image data in which only a non-person object is reflected as the subject, and the processor acquires only the person non-inclusion image data as the dated image data, and creates the dated image data list using the acquired person non-inclusion image data.

17. An information processing apparatus comprising:

a processor; and a memory built in or connected to the processor, wherein the processor creates a dated image data list by classifying a plurality of dated image data to which dates are added, associates the dated image data list with a specific user, acquires the dated image data for a subject, which is similar to a subject indicated by dateless image data of the specific user, from the dated image data list associated with the specific user, and derives a date to be added to the dateless image data, based on the date added to the acquired dated image data, the plurality of dated image data are image data of a plurality of users including the specific user, the dated image data list is created for each subject by classifying the plurality of dated image data for each subject indicated by each of the plurality of dated image data, the dated image data list for a subject, which is similar to a subject indicated by the dated image data of the specific user, is associated with the specific user, and in a case in which a subject indicated by second new image data newly provided as the dated image data and the subject indicated by the dated image data included in the dated image data list associated with the specific user are not similar to each other, the processor updates the dated image data list by adding the second new image data to the dated image data list associated with the specific user.

18. An information processing method comprising:

creating a dated image data list by classifying a plurality of dated image data to which dates are added;

associating the dated image data list with each of a plurality of users including a specific user;

acquiring the dated image data for a subject, which is similar to a subject indicated by dateless image data of the specific user, from the dated image data list associated with the specific user; and deriving a date to be added to the dateless image data, based on the date added to the acquired dated image data, wherein the plurality of dated image data are image data of the plurality of users including the specific user, the dated image data list is created for each subject by classifying the plurality of dated image data for each subject indicated by each of the plurality of dated image data, the dated image data list for a subject, which is similar to a subject indicated by the dated image data of the specific user, is associated with the specific user, the plurality of users provide the plurality of dated image data, and in a case in which a plurality of the dated image data lists are associated with the specific user, the method comprises acquiring the dated image data for the subject, which is similar to the subject indicated by the dateless image data, in order from the dated image data list having a higher priority based on image data included for each dated image data list among the plurality of dated image data lists associated with the specific user.

19. A non-transitory computer-readable storage medium storing a program executable by a computer to perform a process comprising:

creating a dated image data list by classifying a plurality of dated image data to which dates are added;

associating the dated image data list with each of a plurality of users including a specific user;

acquiring the dated image data for a subject, which is similar to a subject indicated by dateless image data of the specific user, from the dated image data list associated with the specific user; and deriving a date to be added to the dateless image data, based on the date added to the acquired dated image data, wherein the plurality of dated image data are image data of the plurality of users including the specific user, the dated image data list is created for each subject by classifying the plurality of dated image data for each subject indicated by each of the plurality of dated image data, the dated image data list for a subject, which is similar to a subject indicated by the dated image data of the specific user, is associated with the specific user, the plurality of users provide the plurality of dated image data, and in a case in which a plurality of the dated image data lists are associated with the specific user, the process comprises acquiring the dated image data for the subject, which is similar to the subject indicated by the dateless image data, in order from the dated image data list having a higher priority based on image data included for each dated image data list among the plurality of dated image data lists associated with the specific user.

* * * * *